(12) United States Patent
Blackburn et al.

(10) Patent No.: US 12,449,416 B2
(45) Date of Patent: Oct. 21, 2025

(54) IDENTIFICATION OF HEALTH STATUS IN THE ELDERLY USING IMMUNOLOGICAL BIOMARKERS

(71) Applicants: Sengenics Corporation Pte Ltd, Singapore (SG); Agency for Science, Technology and Research, Singapore (SG)

(72) Inventors: Jonathan Michael Blackburn, Singapore (SG); Arif Anwar, Kuala Lumpur (MY); Nurul H. Rutt, Singapore (SG); Anis Larbi, Singapore (SG); Olivier Nicolas Felix Cexus, Singapore (SG); Bernett Lee, Singapore (SG); Jesus Felix Bayta Valenzuela, Singapore (SG); Christopher Monterola, Singapore (SG); Victor Tong, Singapore (SG)

(73) Assignees: Sengenics Corporation Pte Ltd (SG); Agency for Science, Technology and Research (SG)

(*) Notice: Subject to any disclaimer, the term of this patent is extended or adjusted under 35 U.S.C. 154(b) by 777 days.

(21) Appl. No.: 17/763,572

(22) PCT Filed: Sep. 23, 2020

(86) PCT No.: PCT/SG2020/050540
§ 371 (c)(1),
(2) Date: Mar. 24, 2022

(87) PCT Pub. No.: WO2021/061048
PCT Pub. Date: Apr. 1, 2021

(65) Prior Publication Data
US 2023/0228741 A1  Jul. 20, 2023

(30) Foreign Application Priority Data
Sep. 25, 2019 (SG) .......................... 10201908922U

(51) Int. Cl.
*G01N 33/50* (2006.01)
*G01N 33/564* (2006.01)
*G01N 33/68* (2006.01)

(52) U.S. Cl.
CPC ....... *G01N 33/5091* (2013.01); *G01N 33/564* (2013.01); *G01N 33/6875* (2013.01); *G01N 2333/70596* (2013.01); *G01N 2800/00* (2013.01)

(58) Field of Classification Search
CPC ............ G01N 33/5091; G01N 33/564; G01N 33/6875; G01N 2333/70596
See application file for complete search history.

(56) References Cited

U.S. PATENT DOCUMENTS

| | | | |
|---|---|---|---|
| 8,999,897 B2 | 4/2015 | Samaddar et al. | |
| 2008/0305476 A1* | 12/2008 | Robertson | G01N 33/574 435/7.1 |
| 2011/0207613 A1 | 8/2011 | Ebner et al. | |
| 2013/0157888 A1 | 6/2013 | Nagele | |
| 2015/0198600 A1* | 7/2015 | Nagele | G01N 33/57484 506/18 |
| 2017/0015738 A1* | 1/2017 | Pedersen | A61P 25/28 |
| 2018/0224455 A1 | 8/2018 | Chinnaiyan et al. | |
| 2018/0292390 A1* | 10/2018 | Venkataraman | G01N 33/5008 |

FOREIGN PATENT DOCUMENTS

| | | |
|---|---|---|
| WO | WO-03/064656 | 8/2003 |
| WO | WO-2011/114139 | 9/2011 |
| WO | WO-2011/142900 | 11/2011 |
| WO | WO-2011/160096 | 12/2011 |
| WO | WO-2012/156313 | 11/2012 |
| WO | WO-2018/187228 | 10/2018 |
| WO | WO-2019/008412 | 1/2019 |
| ZA | 2009005150 | * 5/2009 |

OTHER PUBLICATIONS

Hueber et al. (Arthritis & Rheumatism 2005 52:2645-2655) (Year: 2005).*
Hueber et al. (Arthritis & Rheumatism 2005 52:2645-2655) (Year: 2005) (Year: 2005).*
CN103869086; English Translation (Year: 2014).*
CN102539740; English Translation (Year: 2012).*
Minich (Experimental and Clinical Endocrinology and Diabetes 1999 107:555-560) (Year: 1999).*
Lewis (J. Autoimmunity 2018 91:1-12) (Year: 2018).*
Akintola A.A. et al., A simple and versatile method for frequent 24 h blood sample collection in healthy older adults. MethodsX, Dec. 26, 2014, vol. 2, pp. 33-38 [Retrieved on Nov. 24, 2020] <DOI: 10.1016/J.MEX.2014.12.003> Method details.
Andersen-Ranberg K. et al., High prevalence of autoantibodies among Danish centenarians. Clin Exp Immunol, Oct. 2004, vol. 138, No. 1, pp. 158-163 [Retrieved on Nov. 24, 2020] <DOI: 10.1111/J.1365-2249.2004.02575.X> Materials and Methods, Results, Fig. 1.

(Continued)

*Primary Examiner* — Changhwa J Cheu
(74) *Attorney, Agent, or Firm* — Harness, Dickey & Pierce, P.L.C.

(57) ABSTRACT

A method for determining the health status of an elderly individual by testing the sample extracted from the individual for the presence of biomarkers, the bio markers being autoantibodies to antigens comprising MAPK13, CD96, FKBP3, PPM1A, PHLDA1, GLRX3, FEN1 and AURKA, wherein the antigens may further comprise one or more of UBE2I, AAK1, YARS, ASPSCR1, CASP10, FHOD2, TCL1A and MAP4, wherein PHLDA1 and CD96 correspond to healthy, AURKA, FEN1, CASP10 and AAK1 correspond to intermediate health, and UBE2I, YARS, ASPSCR1, FHOD2, TCL1A, MAP4, MAPK13, FKBP3, PPM1A and GLRX3 correspond to unhealthy.

12 Claims, 7 Drawing Sheets
Specification includes a Sequence Listing.

(56) References Cited

OTHER PUBLICATIONS

Marangon K. et al., Diet, antioxidant status, and smoking habits in French men. Am J Clin Nutr, Feb. 1, 1998, vol. 67, No. 2, pp. 231-239 [Retrieved on Nov. 24, 2020] <DOI: 10.1093/AJCN/67.2.231> Subjects and Methods.

Njemini R. et al., The prevalence of autoantibodies in an elderly sub-Saharan African population. Clin Exp Immunol, Jan. 2002, vol. 127, No. 1, pp. 99-106 [Retrieved on Nov. 24, 2020] <DOI: 10.1046/J. 1365-2249.2002.01713.X> Participants and Methods, Results.

International Search Report and Written Opinion of the International Searching Authority issued in PCT/SG2020/050540, mailed Nov. 25, 2020; ISA/SG (10 pages).

\* cited by examiner

Figure 5D

| | Comorb4 | NADL | w0_sf1 | Frailty | MMSEtot | GDStot |
|---|---|---|---|---|---|---|
| Healthy (114) | 0-3 | 0 | 1-3 | 0-1 | 24-30 | 0-2 |
| | 0 (34) | 0 (114) | 1 (4) | 0 (74) | 27-30 (99) | 0 (86) |
| | 1 (48) | | 2 (27) | 1 (40) | 24-26 (15) | 1 (23) |
| | 2 (29) | | 3 (83) | | | 2 (5) |
| | 3 (3) | | | | | |
| Male (42) | Diabetes – 0 (114) | | | | | |
| Female (72) | HBP – 0/1 (55/59) | | | | | |
| Age: 60-82 | Chol_2grp – 0/1 (73/41) | | | | | |
| Ave: 66.44 | | | | | | |
| Intermediate (109) | 0-7 | 0-2, 9, ND | 2-4, ND | 0-4, ND | 11-30, ND | 0-5, ND |
| | 0 (6) | 0 (105) | 2 (23) | 0 (40) | 27-30 (63) | 0 (60) |
| | 1 (24) | 1 (1) | 3 (56) | 1 (23) | 25-26 (7) | 1 (28) |
| | 2 (36) | 2 (1) | 4 (23) | 2 (15) | ≤23 (38) | 2 (11) |
| | 3 (16) | 9 (1) | ND (7) | 3 (19) | ND (1) | 3 (7) |
| | 4 (12) | ND (1) | | 4 (3) | | 4 (2) |
| | 5 (5) | | | ND (9) | | 5 (1) |
| | 6 (3) | | | | | ND (1) |
| | 7 (7) | | | | | |
| Male (49) | | | | | | |
| Female (60) | | | | | | |
| Age: 60-89 | | | | | | |
| Ave: 69.39 | | | | | | |
| Unhealthy (113) | 2-8 | 0-3 | 3-5 | 1-5 | 11-30 | 0-14 |
| | 2 (9) | 0 (109) | 3 (65) | 1 (59) | 27-30 (91) | 0-4 (108) |
| | 3 (42) | 1 (2) | 4 (45) | 2 (33) | 24-26 (13) | ≥5 (5) |
| | 4 (34) | 2 (1) | 5 (3) | 3 (17) | ≤23 (9) | |
| | 5 (17) | 3 (1) | | 4 (3) | | |
| | 6 (8) | | | 5 (1) | | |
| | 7 (2) | | | | | |
| | 8 (1) | | | | | |
| Male (42) | | | | | | |
| Female (71) | | | | | | |
| Age: 60-86 | | | | | | |
| Ave: 70.09 | | | | | | |

SEQUENCE LISTING

<160> NUMBER OF SEQ ID NOS: 32

<210> SEQ ID NO 1
<211> LENGTH: 1422
<212> TYPE: DNA
<213> ORGANISM: Artificial Sequence
<220> FEATURE:
<223> OTHER INFORMATION: A synthetic gene insert was assembled from
      synthetic oligonucleotides and/or PCR products

<400> SEQUENCE: 1

```
atgaagaagt ttttcgactc ccggcgagag cagggcggct ctggcctggg ctccggctcc      60
agcggaggag ggggcagcac ctcgggcctg ggcagtggcc acatcggaag agtcttcggc     120
atcgggcgac agcaggtcac agtggacgag gtgttggcgg aagtggatt tgctattgta     180 tttctggtga ggacaagcaa tgggatgaaa tgtgccttga acgcatgtt tgtcaacaat     240 gagcatgatc tccaggtgtg caagagagaa atccagataa tgagggatct ttcagggcac     300
aagaatattg tgggttacat tgattctagt atcaacaacg tgagtagcgg tgatgtatgg     360
gaagtgctca ttctgatgga cttttgtaga ggtggccagg tggtaaacct gatgaaccag     420
cgcctgcaaa caggctttac agagaatgaa gtgctccaga tattttgtga tacctgtgaa     480
gctgttgccc gcctgcatca gtgcaaaact cctattatcc accgggacct gaaggttgaa     540
aacatcctct tgcatgaccg aggccactat gtcctgtgtg actttggaag cgccaccaac     600
aaattccaga atccacaaac tgagggagtc aatgcagtag aagatgagat taagaaatac     660
acaacgctgt cctatcgagc accagaaatg gtcaacctgt acagtggcaa atcatcact     720 acgaaggcag acatttgggc tcttggatgt ttgttgtata aattatgcta cttcactttg     780
ccatttgggg aaagtcaggt ggcaatttgt gatggaaact tcacaattcc tgataattct     840
cgatattctc aagacatgca ctgcctaatt aggtatatgt tggaaccaga ccctgacaaa     900
```

```
aggccggata tttaccaggt gtcctacttc tcatttaagc tactcaagaa agagtgccca    960
attccaaatg tacagaactc tcccattcct gcaaagcttc ctgaaccagt gaaagccagt   1020
gaggcagctg caaaaaagac ccagccaaag ccagactga cagatcccat tcccaccaca   1080
gagacttcaa ttgcaccccg ccagaggcct aaagctgggc agactcagcc gaacccagga   1140
atccttccca tccagccagc gctgacaccc ggaagaggg ccactgttca gccccacct    1200 caggctgcag gatccagcaa tcagcctggc cttttagcca gtgttcccca accaaaaccc   1260
caagccccac ccagccagcc tctgccgcaa actcaggcca agcagccaca ggctcctccc   1320
actccacagc agacgccttc tactcaggcc cagggtctgc ccgctcaggc ccaggccaca   1380
ccccagcacc agcagcatac aataaaactt agtatgaaac tt                    1422
```

<210> SEQ ID NO 2
<211> LENGTH: 1659
<212> TYPE: DNA
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 2

```
atggcggccc cggcaggcgg cggaggctcc gcggtgtcgg tgctggcccc gaacggccgg     60
cgccacacgg tgaaggtgac gccgagcacc gtgctgcttc aggttctgga ggacacgtgc    120
cggcggcagg acttcaaccc ctgtgaatat gatctgaagt ttcagaggag cgtgctcgac    180 cttctctctcc agtggagatt tgccaacctg cccaacaatg ccaagctgga gatggtgccc    240
gcttcccgga gccgtgaggg gcctgagaac atggttcgca tcgctttgca gctggacgat    300
ggctcgaggt tgcaggactc tttctgttca ggccagaccc tctgggagct tctcagccat    360
tttccacaga tcagggagtg cctgcagcac cccggcgggg ccaccccagt ctgcgtgtac    420
acgagggatg aggtgacggg tgaagctgcc ctgcggggca cgacgctgca gtcgctgggc    480
ctgaccgggg gcagcgccac catcaggttt gtcatgaagt gctacgaccc cgtgggcaag    540
accccaggaa gcctgggctc gtcagcgtcg gctggccagg cagccgccag cgctccactt    600
cccttggaat ctggggagct cagccgcggc gacttgagcc gtccggagga cgcggacacc    660
tcagggccct gctgcgagca cactcaggag aagcagagca aagggcaccc gcagctgcc    720 cccttgttc ctttctcggg tgggggacag agacaggggg gccctcctgg gcccacgagg    780
cctctgacat catcttcagc taagttgccg aagtccctct ccagccctgg aggcccctcc    840
aagccaaaga agtccaagtc gggccaggat cccagcagg agcaggagca ggagcgggag    900
cgggatcccc agcaggagca ggagcgggag cggcccgtgg accgggagcc cgtgaccgg    960 gagccggtgg tgtgccaccc cgacctggag gagcggctgc aggcctggcc agcggagctg   1020
cctgatgagt tctttgagct gacgtggac gacgtgagaa gacgcttggc ccagctcaag   1080
agtgagcgga gcgccctgga agaagccccc ttggtgacca aggccttcag ggaggcgcag   1140
ataaaggaga agctggagcg ctacccaaag gtggctctga gggtcctgtt cccgaccgc   1200 tacgtcctac agggcttctt ccgcccagc gagacagtgg gggacttgcg agacttcgtg   1260
aggagccacc tggggaaccc cgagctgtca ttttacctgt tcatcacccc tccaaaaaca   1320
gtcctggacg accacacgca gaccctctttt caggcgaacc tcttcccggc cgctctggtg   1380
cacttgggag ccgaggagcc ggcaggtgtc tacctggagc ctggcctgct ggagcatgcc   1440
atctccccat ctgcggccga cgtgctggtg gccaggtaca tgtccagggc cgccgggtcc   1500
```

```
ccttccccat tgccagcccc tgaccctgca cctaagtctg agccagctgc tgaggagggg    1560
gcgctggtcc ccctgagcc catcccaggg acggcccagc ccgtgaagag gagcctgggc    1620
aaggtgccca gtggctgaa gctgccggcc agcaagagg                           1659
```

<210> SEQ ID NO 3
<211> LENGTH: 1209
<212> TYPE: DNA
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 3

```
atggaccgat ctaaagaaaa ctgcatttca ggacctgtta aggctacagc tccagttgga     60
ggtccaaaac gtgttctcgt gactcagcaa tttccttgtc agaatccatt acctgtaaat    120
agtggccagg ctcagcgggt cttgtgtcct tcaaattctt cccagcgcgt tcctttgcaa    180
gcacaaaagc ttgtctccag tcacaagccg gttcagaatc agaagcagaa gcaattgcag    240
gcaaccagtg tacctcatcc tgtctccagg ccactgaata cacccaaaa gagcaagcag     300 cccctgccat cggcacctga aaataatcct gaggaggaac tggcatcaaa acagaaaaat    360
gaagaatcaa aaagaggca gtgggctttg gaagactttg aaattggtcg ccctctgggt    420
aaaggaaagt ttggtaatgt ttatttggca agagaaaagc aaagcaagtt tattctggct    480
cttaaagtgt tatttaaagc tcagctggag aaagccggag tggagcatca gctcagaaga    540
gaagtagaaa tacagtccca ccttcggcat cctaatattc ttagactgta tggttatttc    600
catgatgcta ccagagtcta cctaattctg aatatgcac cacttggaac agtttataga     660
gaacttcaga aactttcaaa gtttgatgag cagagaactg ctactatat aacagaattg     720 gcaaatgccc tgtcttactg tcattcgaag agagttattc atagagacat taagccagag    780
aacttacttc ttggatcagc tggagagctt aaaattgcag attttgggtg gtcagtacat    840
gctccatctt ccaggaggac cactctctgt ggcaccctgg actacctgcc ccctgaaatg    900
attgaaggtc ggatgcatga tgagaaggtg atctctgga gccttggagt tctttgctat     960 gaattttag ttgggaagcc tccttttgag gcaaacacat accaagagac ctacaaaaga    1020
atatcacggg ttgaattcac attccctgac tttgtaacag agggagccag ggacctcatt    1080
tcaagactgt tgaagcataa tcccagccag aggccaatgc tcagagaagt acttgaacac    1140
ccctggatca cagcaaattc atcaaaacca tcaaattgcc aaaacaaaga atcagctagc    1200
aaacagtct                                                           1209
```

<210> SEQ ID NO 4
<211> LENGTH: 1566
<212> TYPE: DNA
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 4

```
atgaaatctc aaggtcaaca ttggtattcc agttcagata aaaactgtaa agtgagcttt     60
cgtgagaagc ttctgattat tgattcaaac ctgggggtcc aagatgtgga gaacctcaag    120
tttctctgca taggattggt ccccaacaag aagctggaga gtccagctc agcctcagat     180 gttttttgaac atctcttggc agaggatctg ctgagtgagg aagacccttt cttcctggca    240
```

```
gaactcctct atatcatacg gcagaagaag ctgctgcagc acctcaactg taccaaagag    300
gaagtggagc gactgctgcc cacccgacaa agggtttctc tgtttagaaa cctgctctac    360
gaactgtcag aaggcattga ctcagagaac ttaaaggaca tgatcttcct tctgaaagac    420
tcgcttccca aaactgaaat gacctcccta agtttcctgg catttctaga gaaacaaggt    480
aaaatagatg aagataatct gacatgcctg gaggacctct gcaaaacagt tgtacctaaa    540
cttttgagaa acatagagaa atacaaaaga gagaaagcta tccagatagt gacacctcct    600
gtagacaagg aagccgagtc gtatcaagga gaggaagaac tagtttccca aacagatgtt    660
aagacattct tggaagcctt accgcaggag tcctggcaaa ataagcatgc aggtagtaat    720
ggtaacagag ccacaaatgg tgcaccaagc ctggtctcca gggggatgca aggagcatct    780
gctaacactc taaactctga aaccagcaca agagggcag ctgtgtacag gatgaatcgg     840
aaccacagag gcctctgtgt cattgtcaac aaccacagct ttacctccct gaaggacaga    900
caaggaaccc ataaagatgc tgagatcctg agtcatgtgt tccagtggct tgggttcaca    960
gtgcatatac acaataatgt gacgaaagtg gaaatggaga tggtcctgca gaagcagaag   1020
tgcaatccag cccatgccga cggggactgc ttcgtgttct gtattctgac ccatgggaga   1080
tttggagctg tctactcttc ggatgaggcc ctcattccca ttcgggagat catgtctcac   1140
ttcacagccc tgcagtgccc tagactggct gaaaaaccta aactcttttt catccaggcc   1200
tgccaaggtg aagagataca gccttccgta tccatcgaag cagatgctct gaaccctgag   1260
caggcaccca cttccctgca ggacagtatt cctgccgagg ctgacttcct acttggtctg   1320
gccactgtcc caggctatgt atcctttcgg catgtggagg aaggcagctg gtatattcag   1380
tctctgtgta atcatctgaa gaaattggtc ccaagacatg aagacatctt atccatcctc   1440
actgctgtca acgatgatgt gagtcgaaga gtggacaaac agggaacaaa gaaacagatg   1500
ccccagcctg ctttcacact aaggaaaaaa ctagtattcc ctgtgcccct ggatgcactt   1560
tcatta                                                              1566

<210> SEQ ID NO 5
<211> LENGTH: 1206
<212> TYPE: DNA
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 5
atggagaaaa aatggaaata ctgtgctgtc tattacatca tccagataca ttttgtcaag     60
ggagtttggg aaaaaacagt caacacagaa gaaaatgttt atgctacact tggctctgat    120
gtcaacctga cctgccaaac acagacagta ggcttcttcg tgcagatgca atggccaag    180 gtcaccaata agatagacct gattgctgtc tatcatcccc aatacggctt ctactgtgcc    240
tatgggagac cctgtgagtc acttgtgact ttcacagaaa ctcctgagaa tgggtcaaaa    300
tggactctgc acttaaggaa tatgtcttgt tcagtcagtg aaggtacga gtgtatgctt    360 gttctgtatc cagagggcat tcagactaaa atctacaacc ttctcattca gacacacgtt    420
acagcagatg aatggaacag caaccatacg atagaaatag agataaatca gactctggaa    480
ataccatgct ttcaaaatag ctcctcaaaa atttcatctg agttcaccta tgcatggtcg    540
gtggaggata atgaactca ggaaacactt atctcccaaa atcacctcat cagcaattcc    600
acattactta aagatagagt caagcttggt acagactaca gactccacct ctctccagtc    660
```

| | |
|---|---|
| caaatcttcg atgatgggcg aagttctct tgccacatta gagtcggtcc taacaaaatc | 720 |
| ttgaggagct ccaccacagt caaggttttt gctaaaccag aaatccctgt gattgtggaa | 780 |
| aataactcca cggatgtctt ggtagagaga agattcacct gcttactaaa gaatgtattt | 840 |
| cccaaagcaa atatcacatg gtttatagat ggaagttttc ttcatgatga aaaagaagga | 900 |
| atatatatta ctaatgaaga gagaaaaggc aaagatggat ttttggaact gaagtctgtt | 960 |
| ttaacaaggg tacatagtaa taaaccagcc caatcagaca acttgaccat ttggtgtatg | 1020 |
| gctctgtctc cagtcccagg aaataaagtg tggaacatct catcagaaaa gatcactttt | 1080 |
| ctcttaggtt ctgaaatttc ctcaacagac cctccactga gtgttacaga atctacccctt | 1140 |
| gacacccaac cttctccagc cagcagtgta tctcctgcaa gtaagaatgt tttcacactg | 1200 |
| agctat | 1206 |

<210> SEQ ID NO 6
<211> LENGTH: 1140
<212> TYPE: DNA
<213> ORGANISM: Artificial Sequence
<220> FEATURE:
<223> OTHER INFORMATION: A synthetic gene insert was assembled from
    synthetic oligonucleotides and/or PCR products.

<400> SEQUENCE: 6

| | |
|---|---|
| atgggaattc aaggcctggc caaactaatt gctgatgtgg cccccagtgc catccgggag | 60 |
| aatgacatca gagctacttt ggccgtaag gtggccattg atgcctctat gagcatttat | 120 |
| cagttcctga ttgctgttcg ccagggtggg gatgtgctgc agaatgagga gggtgagacc | 180 |
| accagccacc tgatgggcat gttctaccgc accattcgca tgatggagaa cggcatcaag | 240 |
| cccgtgtatg tctttgatgg caagccgcca cagctcaagt caggcgagct ggccaaacgc | 300 |
| agtgagcggc gggctgaggc agagaagcag ctgcagcagg ctcaggctgc tggggccgag | 360 |
| caggaggtgg aaaaattcac taagcggctg gtgaaggtca ctaagcagca caatgatgag | 420 |
| tgcaaacatc tgctgagcct catgggcatc ccttatcttg atgcacccag tgaggcagag | 480 |
| gccagctgtg ctgccctggt gaaggctggc aaagtctatg ctgcggctac cgaggacatg | 540 |
| gactgcctca ccttcggcag ccctgtgcta atgcgacacc tgactgccag tgaagccaaa | 600 |
| aagctgccaa tccaggaatt ccacctgagc cggattctgc aggagctggg cctgaaccag | 660 |
| gaacagtttg tggatctgtg catcctgcta ggcagtgact actgtgagag tatccggggt | 720 |
| attgggccca gcgggctgt ggacctcatc cagaagcaca agagcatcga ggagatcgtg | 780 |
| cggcgacttg accccaacaa gtaccctgtg ccagaaaatt ggctccacaa ggaggctcac | 840 |
| cagctcttct tggaacctga ggtgctggac ccagagtctg tggagctgaa gtggagcgag | 900 |
| ccaaatgaag aagagctgat caagttcatg tgtggtgaaa agcagttctc tgaggagcga | 960 |
| atccgcagtg gggtcaagag gctgagtaag agccgccaag gcagcaccca gggccgcctg | 1020 |
| gatgatttct tcaaggtgac cggctcactc tcttcagcta agcgcaagga gccagaaccc | 1080 |
| aagggatcca ctaagaagaa ggcaaagact ggggcagcag ggaagtttaa aaggggaaaa | 1140 |

<210> SEQ ID NO 7
<211> LENGTH: 672
<212> TYPE: DNA
<213> ORGANISM: Artificial Sequence
<220> FEATURE:
<223> OTHER INFORMATION: A synthetic gene insert was assembled from
    synthetic oligonucleotides and/or PCR products.

<400> SEQUENCE: 7

```
atggcggcgg ccgttccaca gcgggcgtgg accgtggagc agctgcgcag tgagcagctg      60
cccaagaagg acattatcaa gtttctgcag gaacacggtt cagattcgtt tcttgcagaa     120
cataaattat taggaaacat taaaaatgtg gccaagacag ctaacaagga ccacttggtt     180
acagcctata accatctttt tgaaactaag cgttttaagg gtactgaaag tataagtaaa     240
gtgtctgagc aagtaaaaaa tgtgaagctt aatgaagata acccaaaga aaccaagtct      300 gaagagaccc tggatgaggg tccaccaaaa tatactaaat ctgttctgaa aagggagat      360 aaaaccaact tcccaaaaa gggagatgtt gttcactgct ggtatacagg aacactacaa      420
gatgggactg ttttgatac taatattcaa acaagtgcaa agaagaagaa aaatgccaag      480
cctttaagtt ttaaggtcgg agtaggcaaa gttatcagag gatgggatga agctctcttg     540
actatgagta aggagaaaa ggctcgactg gagattgaac cagaatgggc ttacggaaag      600
aaaggacagc ctgatgccaa aattccacca aatgcaaaac tcacttttga agtggaatta     660
gtggatattg at                                                        672

<210> SEQ ID NO 8
<211> LENGTH: 534
<212> TYPE: DNA
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 8
atggacttga ccaagagaga gtacaccatg catgaccata cacgctgct gaaggagttc       60 atcctcaaca tgaggggaa gctgaagaag ctgcaggatg atgccaagat cgcacaggat      120
gcctttgatg atgttgtgaa gtatttgga gaaaacccca agacaacacc accctctgtc      180
ttctttcctg tctttgtccg gtttgtgaaa gcatataagc aagcagaaga ggaaaatgag     240
ctgaggaaaa agcaggaaca agctctcatg gaaaaactcc tagagcaaga agctctgatg     300
gagcagcagg atccaaagtc tccttctcat aaatcaaaga ggcagcagca agagttaatt    360
gcagaattaa gaagacgaca agttaaagat aacagacatg tatatgaggg aaaagatggt    420
gccattgaag atattatcac agccttaaag aagaataata tcactaaatt tccaaatgtt    480
cactcgaggg taaggatttc ttctagcaca ccggtggtgg aggatacaca gagc          534

<210> SEQ ID NO 9
<211> LENGTH: 1005
<212> TYPE: DNA
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 9
atggcggcgg ggcggctga ggcagctgta gcggccgtgg aggaggtcgg ctcagccggg       60
cagtttgagg agctgctgcg cctcaaagcc aagtccctcc ttgtggtcca tttctgggca    120
ccatgggctc cacagtgtgc acagatgaac gaagttatgg cagagttagc taaagaactc    180
cctcaagttt catttgtgaa gttggaagct gaaggtgttc ctgaagtatc tgaaaaatat    240
gaaattagct ctgttcccac ttttctgttt tcaagaatt ctcagaaaat cgaccgatta     300
gatggtgcac atgccccaga gttgaccaaa aaagttcagc acatgcatc tagtggctcc     360 ttcctaccca gcgctaatga acatcttaaa gaagatctca accttcgctt gaagaaattg    420
```

```
actcatgctg ccccctgcat gctgtttatg aaaggaactc ctcaagaacc acgctgtggt    480
ttcagcaagc agatggtgga aattcttcac aaacataata ttcagtttag cagttttgat    540
atcttctcag atgaagaggt tcgacaggga ctcaaagcct attccagttg gcctacctat    600
cctcagctct atgtttctgg agagctcata ggaggacttg atataattaa ggagctagaa    660
gcatctgaag aactagatac aatttgtccc aaagctccca aattagagga aaggctcaaa    720
gtgctgacaa ataaagcttc tgtgatgctc tttatgaaag aaacaaaaca ggaagcaaaa    780
tgtggattca gcaaacaaat tctggaaata ctaaatagta ctggtgttga atatgaaaca    840
ttcgatatat tggaggatga agaagttcgg caaggattaa agcttactc aaattggcca     900 acataccctc agctgtatgt gaaaggggag ctggtgggag gattggatat tgtgaaggaa    960
ctgaaagaaa atggtgaatt gctgcctata ctgagaggag aaaat                   1005
```

<210> SEQ ID NO 10
<211> LENGTH: 2898
<212> TYPE: DNA
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 10

```
atggccaacc ttcaggagca cctgagctgc tcctcttctc cacacttacc cttcagtgaa     60
agcaaaacct tcaatggact acaagatgag ctcacagcta gtgggaacca cccttctccc    120
aagctgctcg aggaccagca ggaaaagggg atggtacgaa cagagctaat cgagagcgtg    180
cacagccccg tcaccacaac agtgttgacg agcgtaagtg aggattccag ggaccagttt    240
gagaacagcg ttcttcagct aagggaacac gatgaatcag agacggcggt gtctcagggg    300
aacagcaaca cggtggacgg agagagcaca agcggaactc aagacataaa gattcagttc    360
agcaggtcag gcagtggcag tggtgggttt cttgaaggac tatttggatg cttaaggcct    420
gtatggaata tcattgggaa ggcatattcc actgattaca aattgcagca gcaagatact    480
tgggaagtgc catttgagga gatctcagag ctgcagtggc tgggtagtgg agcccaagga    540
gcggtcttct tgggcaagtt ccgggcgaaa gaggtggcca tcaagaaagt gagagaacag    600
aatgagacgg atatcaagca tttgaggaag ttgaagcacc ctaacatcat cgcattcaag    660
ggtgtttgta ctcaggcccc atgttattgt attatcatgg aatactgtgc ccatggacaa    720
ctctacgagg tcttacgagc tggcaggaag atcacacctc gattgctagt agactggtcc    780
acaggaattg caagtggaat gaattatttg cacctccata aaattattca tcgtgatctc    840
aaatcaccta tgttttagt gacccacaca gatgcggtaa aatttcaga ttttggtaca    900 tctaaggaac tcagtgacaa aagtaccaag atgtcatttg ctggcacggt cgcatggatg    960
gcgccagagg tgatacggaa tgaacctgtc tctgaaaaag ttgatatatg gtcttttgga   1020
gtggtgcttt gggagctgct gacaggagag atcccttaca agatgtaga ttcttcagcc   1080 attatctggg gtgttggaag caacagcctc caccttccag ttccttccac ttgccctgat   1140
ggattcaaaa tccttatgaa acagacgtgg cagagtaaac ctcgaaaccg accttctttt   1200
cggcagacac tcatgcattt agacattgcc tctgcagatg tacttgccac cccacaagaa   1260
acttacttca gtctcaggc tgaatggaga gaagaagtga aaaacattt tgagaagatc   1320 aaaagtgaag gaacttgtat acaccggtta gatgaagaac tgattcgaag cgcagagaa   1380 gagctcaggc atgcgctgga tattcgtgaa cactatgagc ggaagcttga gcgggcgaat   1440
```

| | |
|---|---|
| aatttataca tggaattgag tgccatcatg ctgcagctag aaatgcggga gaaggagctc | 1500 |
| attaagcgtg agcaagcagt ggaaaagaag tatcctggga cctacaaacg acaccctgtt | 1560 |
| cgtcctatca tccatcccaa tgccatggag aaactcatga aaaggaaagg agtgcctcac | 1620 |
| aaatctggga tgcagaccaa acggccagac ttgttgagat cagaagggat ccccaccaca | 1680 |
| gaagtggctc ccactgcatc cccttttgtcc ggaagtccca aatgtccac ttctagcagc | 1740 |
| aagagccgat atcgaagcaa accacgccac cgccgaggga atagcagagg cagccatagt | 1800 |
| gactttgccg caatcttgaa aaaccagcca gcccaggaaa attcacccca tcccacttac | 1860 |
| ctgcaccaag ctcaatccca ataccctttct cttcatcacc ataattctct gcagcagcaa | 1920 |
| taccagcagc cccctcctgc catgtcccag agtcaccatc ccagactcaa tatgcacgga | 1980 |
| caggacatag caacctgcgc caacaacctg aggtatttcg cccagcagc agccctgcgg | 2040 |
| agcccactca gcaaccatgc tcagagacag ctgcccggct cgagccctga cctcatctcc | 2100 |
| acagccatgg ctgcagactg ctggagaagt tctgagcctg acaagggcca agctggtccc | 2160 |
| tggggctgtt gccaggctga cgcttatgac ccctgccttc agtgcaggcc agaacagtat | 2220 |
| gggtccttag acatacccctc tgctgagcca gtggggagga gccctgacct ttccaagtca | 2280 |
| ccagcacata atcctctctt ggaaaacgcc cagagttctg agaaaacgga gaaaatgaa | 2340 |
| ttcagcggct gtaggtctga gtcatccctc ggcacctctc atctcggcac ccctccagcg | 2400 |
| ctacctcgaa aaacaaggcc tctgcagaag agtggagatg actcctcaga agaggaagaa | 2460 |
| ggggaagtag atagtgaagt tgaatttcca cgaagacaga ggccccatcg ctgtatcagc | 2520 |
| agctgccagt catattcaac ctttagctct gagaatttct ctgtgtctga tggagaagag | 2580 |
| ggaaatacca gtgaccactc aaacagtcct gatgagttag ctgataaact tgaagaccgc | 2640 |
| ttggcagaga agctagacga cctgctgtcc cagacgccag agattcccat tgacatatcc | 2700 |
| tcacactcgg atgggctctc tgacaaggag tgtgccgtgc gccgtgtgaa gactcagatg | 2760 |
| tctctgggca agctgtgtgt ggaggaacgt ggctatgaga accccatgca gtttgaagaa | 2820 |
| tcggactgtg actcttcaga tggggagtgt tctgatgcca cagttaggac caataaacac | 2880 |
| tacagctctg ctacctgg | 2898 |

<210> SEQ ID NO 11
<211> LENGTH: 2937
<212> TYPE: DNA
<213> ORGANISM: Artificial Sequence
<220> FEATURE:
<223> OTHER INFORMATION: A synthetic gene insert was assembled from
    synthetic oligonucleotides and/or PCR products.

<400> SEQUENCE: 11

| | |
|---|---|
| atggctgacc tcagtcttgc agatgcatta acagaaccat ctccagacat tgagggagag | 60 |
| ataaagcggg acttcattgc cacactagag gcagaggcct tgatgatgt tgtgggagaa | 120 |
| actgttggaa aaacagacta tattcctctc ctggatgttg atgagaaaac cgggaactca | 180 |
| gagtcaaaga gaaaccgtg ctcagaaact agccagattg aagatactcc atcttctaaa | 240 |
| ccaacactcc tagccaatgg tggtcatgga gtagaaggga gcgatactac agggtctcca | 300 |
| actgaattcc ttgaagagaa aatggcctac aggaatacc aaatagcca gaactggcca | 360 |
| gaagatacca acttttgttt ccaacctgag caagtggtcg atcctatcca gactgatccc | 420 |
| tttaagatgt accatgatga tgacctggca gatttggtct ttccctccag tgcgacagct | 480 |
| gatacttcaa tatttgcagg acaaaatgat cccttgaaaa acagttacgg tatgtctccc | 540 |

```
tgcaacacag ctgttgtacc tcaggggtgg tctgtggaag ccttaaactc tccacactca    600
gagtcctttg tttccccaga ggctgttgca gaacctcctc agccaacggc agttcccttaa   660 gagctagcca aggagataga aatggcatca gaagagaggc caccagcaca agcattggaa    720
ataatgatgg gactgaagac tactgacatg gcaccatcta agaaacaga gatggccctc     780 gccaaggaca tggcactagc tacaaaaacc gaggtggcat tggctaaaga tatggaatca    840
cccaccaaat tagatgtgac actggccaag gacatgcagc catccatgga atcagatatg    900
gccctagtca aggacatgga actacccaca gaaaagaag tggccctggt taaggatgtc     960
agatggccca cagaaacaga tgtatcttca gccaagaatg tggtactgcc cacagaaaca   1020
gaggtagccc cagccaagga tgtgacactg ttgaaagaaa cagagagggc atctcctata   1080
aaaatggact tagccccttc caaggacatg ggaccaccca agaaaacaa gaaagaaaca   1140 gagagggcat ctcctataaa aatggacttg gctccttcca aggacatggg accacccaaa   1200
gaaaacaaga tagtcccagc caaggatttg gtattactct cagaaataga ggtggcacag   1260
gctaatgaca ttatatcatc cacagaaata tcctctgctg agaaggtggc tttgtcctca   1320
gaaacagagg tagccctggc cagggacatg acactgcccc cggaaaccaa cgtgatcttg   1380
accaaggata aagcactacc tttagaagca gaggtggccc cagtcaagga catggctcaa   1440
ctcccagaaa cagaaatagc cccggccaag gatgtggctc cgtccacagt aaaagaagtg   1500
ggcttgttga aggacatgtc tccactatca gaaacagaaa tggctctggg caaggatgtg   1560
actccacctc cagaaacaga agtagttctc atcaagaacg tatgtctgcc tccagaaatg   1620
gaggtggccc tgactgagga tcaggtccca gccctcaaaa cagaagctcc caccaccatt   1680
ggtgggttga ataaaaaacc catgagcctt gcttcaggct tagtgccagc tgccccaccc   1740
aaacgccctg ccgtcgcctc tgccaggcct tccatcttac cttcaaaaga cgtgaagcca   1800
aagcccattg cagatgcaaa ggctcctgag aagcgggcct caccatccaa gccagcttct   1860
gccccagcct ccagatctgg gtccaagagc actcagactt tgcaaaaaac cacaacagct   1920
gctgctgttg cctcaactgg cccaagcagt aggagcccct ccacgctcct gcccaagaag   1980
cccactgcca ttaagactga gggaaaaacct gcagaagtca agaagatgac tgcaaagtct   2040
gtaccagctg acttgagtcg cccaaagagc acctccacca gttccatgaa gaaaaccacc   2100
actctcagtg ggacagcccc cgctgcaggg gtggttccca gccgagtcaa ggccacaccc   2160
atgccctccc ggccctccac aactcctttc atagacaaga gcccacctc ggccaaaccc   2220 agctccacca ccccccggct cagccgcctg gcaccaaata cttctgctcc tgatctgaag   2280
aatgtccgct ccaaggttgg ctccacggaa acatcaagc atcagcctgg aggaggccgg   2340
gccaaagtag agaaaaaaac agaggcagct gctacaaccc gaaagcctga atctaatgca   2400
gtcactaaaa cagccggccc aattgcaagt gcacagaaac aacctgcggg gaaagtccag   2460
atagtctcca aaaagtgag ctacagccat attcagtcca agtgtggttc caaggacaat   2520
attaagcatg tccctggagg tggtaatgtt cagattcaga acaagaaagt ggacatctct   2580
aaggtctcct ccaagtgtgg gtctaaggct aacatcaagc acaagcctgg tggaggagat   2640
gtcaagattg aaagtcagaa gttgaacttc aaggagaagg cccaggccaa ggtgggatcc   2700
ctcgataatg tgggccacct acctgcagga ggtgctgtga agactgaggg cggtggcagc   2760
gaggctcctc tgtgtccggg tcccctgct ggggaggagc cggccatctc tgaggcagcg   2820
cctgaagctg gcgcccccac ttcagccagt ggcctcaatg gccaccccac cctgtcaggg   2880
ggtggtgacc aaagggaggc ccagaccttg gacagccaga tccaggagac aagcatc     2937
```

<210> SEQ ID NO 12
<211> LENGTH: 777
<212> TYPE: DNA
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 12

```
atgctggaga gtagcggctg caaagcgctg aaggagggcg tgctggagaa gcgcagcgac         60
gggttgttgc agctctggaa gaaaaagtgt tgcatcctca ccgaggaagg gctgctgctt        120
atcccgccca agcagctgca acaccagcag cagcagcaac agcagcagca gcagcagcaa        180
caacagcccg gcaggggcc ggccgagccg tcccaaccca gtggcccgc tgtcgccagc         240
ctcgagccgc cggtcaagct caaggaactg cacttctcca acatgaagac cgtggactgt        300
gtggagcgca gggcaagta catgtacttc actgtggtga tggcagaggg caaggagatc        360
gactttcggt gcccgcaaga ccagggctgg aacgccgaga tcacgctgca gatggtgcag        420
tacaagaatc gtcaggccat cctggcggtc aaatccacgc ggcagaagca gcagcacctg        480
gtccagcagc agccccctc gcagccgcag ccgcagccgc agctccagcc ccaaccccag         540
cctcagcctc agccgcaacc ccagcccaa tcacaacccc agcctcagcc ccaacccaag        600
cctcagcccc agcagctcca cccgtatccg catccacatc cacatccaca ctctcatcct        660
cactcgcacc cacaccctca cccgcacccg catccgcacc aaataccgca cccacaccca        720
cagccgcact cgcagccgca cgggcaccgg cttctccgca gcacctccaa ctctgcc           777
```

<210> SEQ ID NO 13
<211> LENGTH: 1146
<212> TYPE: DNA
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 13

```
atgggagcat ttttagacaa gccaaagatg gaaaagcata tgcccaggg gcagggtaat         60
gggttgcgat atgggctaag cagcatgcaa ggctggcgtg ttgaaatgga ggatgcacat        120
acggctgtga tcggtttgcc aagtggactt gaatcgtggt cattctttgc tgtgtatgat        180
gggcatgctg ttctcaggt tgccaaatac tgctgtgagc atttgttaga tcacatcacc         240
aataaccagg attttaaagg gtctgcagga gcaccttctg tggaaaatgt aaagaatgga        300
atcagaacag gttttctgga gattgatgaa cacatgagag ttatgtcaga gaagaaacat        360
ggtgcagata gaagtgggtc aacagctgta ggtgtcttaa tttctcccca acatacttat        420
ttcattaact gtggagactc aagaggttta ctttgtagga acaggaaagt tcatttcttc        480
acacaagatc acaaaccaag taatccgctg gagaaagaac gaattcagaa tgcaggtggc        540
tctgtaatga ttcagcgtgt gaatggctct ctggctgtat cgagggccct tggggatttt        600
gattacaaat gtgtccatgg aaaaggtcct actgagcagc ttgtctcacc agagcctgaa        660
gtccatgata ttgaaagatc tgaagaagat gatcagttca ttatccttgc atgtgatggt        720
atctgggatg ttatgggaaa tgaagagctc tgtgattttg taagatccag acttgaagtc        780
actgatgacc ttgagaaagt ttgcaatgaa gtagtcgaca cctgtttgta taagggaagt        840
cgagacaaca tgagtgtgat tttgatctgt tttccaaatg cacccaaagt atcgccagaa        900
```

```
gcagtgaaga aggaggcaga gttggacaag tacctggaat gcagagtaga agaaatcata    960
aagaagcagg gggaaggcgt ccccgactta gtccatgtga tgcgcacatt agcgagtgag   1020
aacatcccca gcctcccacc aggggggtgaa ttggcaagca agaggaatgt tattgaagcc   1080
gtttacaata gactgaatcc ttacaaaaat gacgacactg actctacatc aacagatgat   1140
atgtgg                                                              1146

<210> SEQ ID NO 14
<211> LENGTH: 342
<212> TYPE: DNA
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 14
atggccgagt gcccgacact cggggaggca gtcaccgacc acccggaccg cctgtgggcc     60
tgggagaagt tcgtgtattt ggacgagaag cagcacgcct ggctgccctt aaccatcgag    120
ataaaggata ggttacagtt acgggtgctc ttgcgtcggg aagacgtcgt cctggggagg    180
cctatgaccc ccacccagat aggcccaagc ctgctgccta tcatgtggca gctctaccct    240
gatggacgat accgatcctc agactccagt ttctggcgct tagtgtacca catcaagatt    300
gacggcgtgg aggacatgct tctcgagctg ctgccagatg ac                      342

<210> SEQ ID NO 15
<211> LENGTH: 474
<212> TYPE: DNA
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 15
atgtcgggga tcgccctcag cagactcgcc caggagagga aagcatggag gaaagaccac     60
ccatttggtt tcgtggctgt cccaacaaaa aatcccgatg gcacgatgaa cctcatgaac    120
tgggagtgcg ccattccagg aaagaaaggg actccgtggg aaggaggctt gtttaaacta    180
cggatgcttt tcaaagatga ttatccatct tcgccaccaa aatgtaaatt cgaaccacca    240
ttatttcacc cgaatgtgta cccttcgggg acagtgtgcc tgtccatctt agaggaggac    300
aaggactgga ggccagccat cacaatcaaa cagatcctat taggaataca ggaacttcta    360
aatgaaccaa atatccaaga cccagctcaa gcagaggcct acacgattta ctgccaaaac    420
agagtggagt acgagaaaag ggtccgagca caagccaaga gtttgcgcc ctca          474

<210> SEQ ID NO 16
<211> LENGTH: 1585
<212> TYPE: DNA
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 16
atgggggacg ctcccagccc tgaagagaaa ctgcaccctta tcacccggaa cctgcaggag     60
gttctggggg aagagaagct gaaggagata ctgaaggagc gggaacttaa aatttactgg    120
ggaacggcaa ccacgggcaa accacatgtg gcttactttg tgcccatgtc aaagattgca    180
gacttcttaa aggcagggtg tgaggtaaca attctgtttg cggacctcca cgcataccctg    240
```

```
gataacatga aagccccatg ggaacttcta gaactccgag tcagttacta tgagaatgtg       300
atcaaagcaa tgctggagag cattggtgtg cccttggaga agctcaagtt catcaaaggc       360
actgattacc agctcagcaa agagtacaca ctagatgtgt acagactctc ctccgtggtc       420
acacagcacg attccaagaa ggctggagct gaggtggtaa agcaggtgga gcaccctttg       480
ctgagtggcc tcttataccc cggactgcag gctttggatg aagagtattt aaaagtagat       540
gcccaatttg gaggcattga tcagagaaag attttcacct ttgcagagaa gtacctccct       600
gcacttggct attcaaaacg ggtccatctg atgaatccta tggttccagg attaacaggc       660
agcaaaatga gctcttcaga gaggagtcca agattgatc tccttgatcg aaggaggat        720 gtgaagaaaa aactgaagaa ggccttctgt gagccaggaa atgtggagaa caatggggtt       780
ctgtccttca tcaagcatgt cctttttccc cttaagtccg agtttgtgat cctacgagat       840
gagaaatggg gtgaaacaa aacctacaca gcttacgtgg acctggaaaa ggactttgct        900
gctgaggttg tacatcctgg agacctgaag aattctgttg aagtcgcact gaacaagttg       960
ctggatccaa tccgggaaaa gtttaatacc cctgccctga aaaaactggc cagcgctgcc      1020
tacccagatc cctcaaagca gaagccaatg gccaaaggcc ctgccaagaa ttcagaacca      1080
gaggaggtca tcccatcccg gctggatatc cgtgtgggga aaatcatcac tgtggagaag      1140
cacccagatg cagacagcct gtatgtagag aagattgacg tgggggaagc tgaaccacgg      1200
actgtggtga gcggcctggt acagttcgtg cccaaggagg aactgcagga caggctggta      1260
gtggtgctgt gcaacctgaa accccagaag atgagaggag tcgagtccca aggcatgctt      1320
ctgtgtgctt ctatagaagg gataaaccgc caggttgaac tctctggaccc tccggcaggc      1380 tctgctcctg gtgagcacgt gtttgtgaag ggctatgaaa agggccaacc agatgaggag      1440
ctcaagccca agaagaaagt cttcgagaag ttgcaggctg acttcaaaat ttctgaggag      1500
tgcatcgcac agtggaagca aaccaacttc atgaccaagc tgggctccat ttcctgtaaa      1560
tcgctgaaag gggggaacat tagcc                                            1585
```

<210> SEQ ID NO 17
<211> LENGTH: 961
<212> TYPE: PRT
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 17

Met Lys Lys Phe Phe Asp Ser Arg Arg Glu Gln Gly Gly Ser Gly Leu
1               5                   10                  15

Gly Ser Gly Ser Ser Gly Gly Gly Ser Thr Ser Gly Leu Gly Ser
            20                  25                  30

Gly Tyr Ile Gly Arg Val Phe Gly Ile Gly Arg Gln Gln Val Thr Val
        35                  40                  45

Asp Glu Val Leu Ala Glu Gly Gly Phe Ala Ile Val Phe Leu Val Arg
    50                  55                  60

Thr Ser Asn Gly Met Lys Cys Ala Leu Lys Arg Met Phe Val Asn Asn
65                  70                  75                  80

Glu His Asp Leu Gln Val Cys Lys Arg Glu Ile Gln Ile Met Arg Asp
                85                  90                  95

Leu Ser Gly His Lys Asn Ile Val Gly Tyr Ile Asp Ser Ser Ile Asn
            100                 105                 110

Asn Val Ser Ser Gly Asp Val Trp Glu Val Leu Ile Leu Met Asp Phe

```
            115                 120                 125
Cys Arg Gly Gly Gln Val Val Asn Leu Met Asn Gln Arg Leu Gln Thr
        130                 135                 140
Gly Phe Thr Glu Asn Glu Val Leu Gln Ile Phe Cys Asp Thr Cys Glu
145                 150                 155                 160
Ala Val Ala Arg Leu His Gln Cys Lys Thr Pro Ile Ile His Arg Asp
                165                 170                 175
Leu Lys Val Glu Asn Ile Leu Leu His Asp Arg Gly His Tyr Val Leu
            180                 185                 190
Cys Asp Phe Gly Ser Ala Thr Asn Lys Phe Gln Asn Pro Gln Thr Glu
        195                 200                 205
Gly Val Asn Ala Val Glu Asp Glu Ile Lys Lys Tyr Thr Thr Leu Ser
210                 215                 220
Tyr Arg Ala Pro Glu Met Val Asn Leu Tyr Ser Gly Lys Ile Ile Thr
225                 230                 235                 240
Thr Lys Ala Asp Ile Trp Ala Leu Gly Cys Leu Leu Tyr Lys Leu Cys
                245                 250                 255
Tyr Phe Thr Leu Pro Phe Gly Glu Ser Gln Val Ala Ile Cys Asp Gly
            260                 265                 270
Asn Phe Thr Ile Pro Asp Asn Ser Arg Tyr Ser Gln Asp Met His Cys
        275                 280                 285
Leu Ile Arg Tyr Met Leu Glu Pro Asp Pro Asp Lys Arg Pro Asp Ile
        290                 295                 300
Tyr Gln Val Ser Tyr Phe Ser Phe Lys Leu Leu Lys Lys Glu Cys Pro
305                 310                 315                 320
Ile Pro Asn Val Gln Asn Ser Pro Ile Pro Ala Lys Leu Pro Glu Pro
                325                 330                 335
Val Lys Ala Ser Glu Ala Ala Ala Lys Lys Thr Gln Pro Lys Ala Arg
            340                 345                 350
Leu Thr Asp Pro Ile Pro Thr Thr Glu Thr Ser Ile Ala Pro Arg Gln
        355                 360                 365
Arg Pro Lys Ala Gly Gln Thr Gln Pro Asn Pro Gly Ile Leu Pro Ile
        370                 375                 380
Gln Pro Ala Leu Thr Pro Arg Lys Arg Ala Thr Val Gln Pro Pro Pro
385                 390                 395                 400
Gln Ala Ala Gly Ser Ser Asn Gln Pro Gly Leu Leu Ala Ser Val Pro
                405                 410                 415
Gln Pro Lys Pro Gln Ala Pro Pro Ser Gln Pro Leu Pro Gln Thr Gln
            420                 425                 430
Ala Lys Gln Pro Gln Ala Pro Pro Thr Pro Gln Gln Thr Pro Ser Thr
        435                 440                 445
Gln Ala Gln Gly Leu Pro Ala Gln Ala Gln Ala Thr Pro Gln His Gln
        450                 455                 460
Gln Gln Leu Phe Leu Lys Gln Gln Gln Gln Gln Gln Pro Pro Pro Pro
        465                 470                 475                 480
Ala Gln Gln Gln Pro Ala Gly Thr Phe Tyr Gln Gln Gln Gln Ala Gln
                485                 490                 495
Thr Gln Gln Phe Gln Ala Val His Pro Ala Thr Gln Lys Pro Ala Ile
            500                 505                 510
Ala Gln Phe Pro Val Val Ser Gln Gly Gly Ser Gln Gln Gln Leu Met
        515                 520                 525
Gln Asn Phe Tyr Gln Gln Gln Gln Gln Gln Gln Gln Gln Gln Gln Gln
        530                 535                 540
```

-continued

```
Gln Gln Leu Ala Thr Ala Leu His Gln Gln Leu Met Thr Gln Gln
545                 550                 555                 560

Ala Ala Leu Gln Gln Lys Pro Thr Met Ala Gly Gln Gln Pro Gln
                565                 570                 575

Pro Gln Pro Ala Ala Pro Gln Pro Ala Pro Ala Gln Glu Pro Ala
            580                 585                 590

Ile Gln Ala Pro Val Arg Gln Gln Pro Lys Val Gln Thr Thr Pro Pro
        595                 600                 605

Pro Ala Val Gln Gly Gln Lys Val Gly Ser Leu Thr Pro Pro Ser Ser
610                 615                 620

Pro Lys Thr Gln Arg Ala Gly His Arg Arg Ile Leu Ser Asp Val Thr
625                 630                 635                 640

His Ser Ala Val Phe Gly Val Pro Ala Ser Lys Ser Thr Gln Leu Leu
                645                 650                 655

Gln Ala Ala Ala Ala Glu Ala Ser Leu Asn Lys Ser Lys Ser Ala Thr
            660                 665                 670

Thr Thr Pro Ser Gly Ser Pro Arg Thr Ser Gln Gln Asn Val Tyr Asn
        675                 680                 685

Pro Ser Glu Gly Ser Thr Trp Asn Pro Phe Asp Asp Asn Phe Ser
690                 695                 700

Lys Leu Thr Ala Glu Glu Leu Leu Asn Lys Asp Phe Ala Lys Leu Gly
705                 710                 715                 720

Glu Gly Lys His Pro Glu Lys Leu Gly Gly Ser Ala Glu Ser Leu Ile
                725                 730                 735

Pro Gly Phe Gln Ser Thr Gln Gly Asp Ala Phe Ala Thr Ser Phe
            740                 745                 750

Ser Ala Gly Thr Ala Glu Lys Arg Lys Gly Gly Gln Thr Val Asp Ser
        755                 760                 765

Gly Leu Pro Leu Leu Ser Val Ser Asp Pro Phe Ile Pro Leu Gln Val
770                 775                 780

Pro Asp Ala Pro Glu Lys Leu Ile Glu Gly Leu Lys Ser Pro Asp Thr
785                 790                 795                 800

Ser Leu Leu Leu Pro Asp Leu Leu Pro Met Thr Asp Pro Phe Gly Ser
                805                 810                 815

Thr Ser Asp Ala Val Ile Glu Lys Ala Asp Val Ala Val Glu Ser Leu
            820                 825                 830

Ile Pro Gly Leu Glu Pro Pro Val Pro Gln Arg Leu Pro Ser Gln Thr
        835                 840                 845

Glu Ser Val Thr Ser Asn Arg Thr Asp Ser Leu Thr Gly Glu Asp Ser
850                 855                 860

Leu Leu Asp Cys Ser Leu Leu Ser Asn Pro Thr Thr Asp Leu Leu Glu
865                 870                 875                 880

Glu Phe Ala Pro Thr Ala Ile Ser Ala Pro Val His Lys Ala Ala Glu
                885                 890                 895

Asp Ser Asn Leu Ile Ser Gly Phe Asp Val Pro Glu Gly Ser Asp Lys
            900                 905                 910

Val Ala Glu Asp Glu Phe Asp Pro Ile Pro Val Leu Ile Thr Lys Asn
        915                 920                 925

Pro Gln Gly Gly His Ser Arg Asn Ser Ser Gly Ser Ser Glu Ser Ser
930                 935                 940

Leu Pro Asn Leu Ala Arg Ser Leu Leu Leu Val Asp Gln Leu Ile Asp
945                 950                 955                 960
```

Leu

<210> SEQ ID NO 18
<211> LENGTH: 553
<212> TYPE: PRT
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 18

Met Ala Ala Pro Ala Gly Gly Gly Ser Ala Val Ser Val Leu Ala
1               5                   10                  15

Pro Asn Gly Arg Arg His Thr Val Lys Val Thr Pro Ser Thr Val Leu
            20                  25                  30

Leu Gln Val Leu Glu Asp Thr Cys Arg Arg Gln Asp Phe Asn Pro Cys
        35                  40                  45

Glu Tyr Asp Leu Lys Phe Gln Arg Ser Val Leu Asp Leu Ser Leu Gln
    50                  55                  60

Trp Arg Phe Ala Asn Leu Pro Asn Asn Ala Lys Leu Glu Met Val Pro
65                  70                  75                  80

Ala Ser Arg Ser Arg Glu Gly Pro Glu Asn Met Val Arg Ile Ala Leu
                85                  90                  95

Gln Leu Asp Asp Gly Ser Arg Leu Gln Asp Ser Phe Cys Ser Gly Gln
            100                 105                 110

Thr Leu Trp Glu Leu Leu Ser His Phe Pro Gln Ile Arg Glu Cys Leu
        115                 120                 125

Gln His Pro Gly Gly Ala Thr Pro Val Cys Val Tyr Thr Arg Asp Glu
    130                 135                 140

Val Thr Gly Glu Ala Ala Leu Arg Gly Thr Thr Leu Gln Ser Leu Gly
145                 150                 155                 160

Leu Thr Gly Gly Ser Ala Thr Ile Arg Phe Val Met Lys Cys Tyr Asp
                165                 170                 175

Pro Val Gly Lys Thr Pro Gly Ser Leu Gly Ser Ser Ala Ser Ala Gly
            180                 185                 190

Gln Ala Ala Ala Ser Ala Pro Leu Pro Leu Glu Ser Gly Glu Leu Ser
        195                 200                 205

Arg Gly Asp Leu Ser Arg Pro Glu Asp Ala Asp Thr Ser Gly Pro Cys
    210                 215                 220

Cys Glu His Thr Gln Glu Lys Gln Ser Thr Arg Ala Pro Ala Ala Ala
225                 230                 235                 240

Pro Phe Val Pro Phe Ser Gly Gly Gly Gln Arg Leu Gly Gly Pro Pro
                245                 250                 255

Gly Pro Thr Arg Pro Leu Thr Ser Ser Ser Ala Lys Leu Pro Lys Ser
            260                 265                 270

Leu Ser Ser Pro Gly Gly Pro Ser Lys Pro Lys Ser Lys Ser Gly
        275                 280                 285

Gln Asp Pro Gln Gln Glu Gln Glu Gln Arg Glu Arg Asp Pro Gln
    290                 295                 300

Gln Glu Gln Glu Arg Glu Arg Pro Val Asp Arg Glu Pro Val Asp Arg
305                 310                 315                 320

Glu Pro Val Val Cys His Pro Asp Leu Glu Glu Arg Leu Gln Ala Trp
                325                 330                 335

Pro Ala Glu Leu Pro Asp Glu Phe Phe Glu Leu Thr Val Asp Asp Val
            340                 345                 350

```
Arg Arg Arg Leu Ala Gln Leu Lys Ser Glu Arg Lys Arg Leu Glu Glu
            355                 360                 365

Ala Pro Leu Val Thr Lys Ala Phe Arg Glu Ala Gln Ile Lys Glu Lys
370                 375                 380

Leu Glu Arg Tyr Pro Lys Val Ala Leu Arg Val Leu Phe Pro Asp Arg
385                 390                 395                 400

Tyr Val Leu Gln Gly Phe Phe Arg Pro Ser Glu Thr Val Gly Asp Leu
                405                 410                 415

Arg Asp Phe Val Arg Ser His Leu Gly Asn Pro Glu Leu Ser Phe Tyr
            420                 425                 430

Leu Phe Ile Thr Pro Pro Lys Thr Val Leu Asp Asp His Thr Gln Thr
        435                 440                 445

Leu Phe Gln Ala Asn Leu Phe Pro Ala Ala Leu Val His Leu Gly Ala
    450                 455                 460

Glu Glu Pro Ala Gly Val Tyr Leu Glu Pro Gly Leu Leu Glu His Ala
465                 470                 475                 480

Ile Ser Pro Ser Ala Ala Asp Val Leu Val Ala Arg Tyr Met Ser Arg
                485                 490                 495

Ala Ala Gly Ser Pro Ser Pro Leu Pro Ala Pro Asp Pro Ala Pro Lys
            500                 505                 510

Ser Glu Pro Ala Ala Glu Gly Ala Leu Val Pro Pro Glu Pro Ile
        515                 520                 525

Pro Gly Thr Ala Gln Pro Val Lys Arg Ser Leu Gly Lys Val Pro Lys
    530                 535                 540

Trp Leu Lys Leu Pro Ala Ser Lys Arg
545                 550

<210> SEQ ID NO 19
<211> LENGTH: 403
<212> TYPE: PRT
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 19

Met Asp Arg Ser Lys Glu Asn Cys Ile Ser Gly Pro Val Lys Ala Thr
1               5                   10                  15

Ala Pro Val Gly Gly Pro Lys Arg Val Leu Val Thr Gln Gln Phe Pro
            20                  25                  30

Cys Gln Asn Pro Leu Pro Val Asn Ser Gly Gln Ala Gln Arg Val Leu
        35                  40                  45

Cys Pro Ser Asn Ser Ser Gln Arg Val Pro Leu Gln Ala Gln Lys Leu
    50                  55                  60

Val Ser Ser His Lys Pro Val Gln Asn Gln Gln Lys Gln Leu Gln
65                  70                  75                  80

Ala Thr Ser Val Pro His Pro Val Ser Arg Pro Leu Asn Asn Thr Gln
                85                  90                  95

Lys Ser Lys Gln Pro Leu Pro Ser Ala Pro Glu Asn Asn Pro Glu Glu
            100                 105                 110

Glu Leu Ala Ser Lys Gln Lys Asn Glu Glu Ser Lys Lys Arg Gln Trp
        115                 120                 125

Ala Leu Glu Asp Phe Glu Ile Gly Arg Pro Leu Gly Lys Gly Lys Phe
    130                 135                 140

Gly Asn Val Tyr Leu Ala Arg Glu Lys Gln Ser Lys Phe Ile Leu Ala
145                 150                 155                 160
```

```
Leu Lys Val Leu Phe Lys Ala Gln Leu Glu Lys Ala Gly Val Glu His
                165                 170                 175

Gln Leu Arg Arg Glu Val Glu Ile Gln Ser His Leu Arg His Pro Asn
            180                 185                 190

Ile Leu Arg Leu Tyr Gly Tyr Phe His Asp Ala Thr Arg Val Tyr Leu
        195                 200                 205

Ile Leu Glu Tyr Ala Pro Leu Gly Thr Val Tyr Arg Glu Leu Gln Lys
    210                 215                 220

Leu Ser Lys Phe Asp Glu Gln Arg Thr Ala Thr Tyr Ile Thr Glu Leu
225                 230                 235                 240

Ala Asn Ala Leu Ser Tyr Cys His Ser Lys Arg Val Ile His Arg Asp
                245                 250                 255

Ile Lys Pro Glu Asn Leu Leu Leu Gly Ser Ala Gly Glu Leu Lys Ile
            260                 265                 270

Ala Asp Phe Gly Trp Ser Val His Ala Pro Ser Ser Arg Arg Thr Thr
        275                 280                 285

Leu Cys Gly Thr Leu Asp Tyr Leu Pro Pro Glu Met Ile Glu Gly Arg
    290                 295                 300

Met His Asp Glu Lys Val Asp Leu Trp Ser Leu Gly Val Leu Cys Tyr
305                 310                 315                 320

Glu Phe Leu Val Gly Lys Pro Pro Phe Glu Ala Asn Thr Tyr Gln Glu
                325                 330                 335

Thr Tyr Lys Arg Ile Ser Arg Val Glu Phe Thr Phe Pro Asp Phe Val
            340                 345                 350

Thr Glu Gly Ala Arg Asp Leu Ile Ser Arg Leu Leu Lys His Asn Pro
        355                 360                 365

Ser Gln Arg Pro Met Leu Arg Glu Val Leu Glu His Pro Trp Ile Thr
    370                 375                 380

Ala Asn Ser Ser Lys Pro Ser Asn Cys Gln Asn Lys Glu Ser Ala Ser
385                 390                 395                 400

Lys Gln Ser

<210> SEQ ID NO 20
<211> LENGTH: 521
<212> TYPE: PRT
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 20

Met Lys Ser Gln Gly Gln His Trp Tyr Ser Ser Ser Asp Lys Asn Cys
1               5                   10                  15

Lys Val Ser Phe Arg Glu Lys Leu Leu Ile Ile Asp Ser Asn Leu Gly
                20                  25                  30

Val Gln Asp Val Glu Asn Leu Lys Phe Leu Cys Ile Gly Leu Val Pro
            35                  40                  45

Asn Lys Lys Leu Glu Lys Ser Ser Ala Ser Asp Val Phe Glu His
        50                  55                  60

Leu Leu Ala Glu Asp Leu Leu Ser Glu Glu Asp Pro Phe Phe Leu Ala
65                  70                  75                  80

Glu Leu Leu Tyr Ile Ile Arg Gln Lys Lys Leu Leu Gln His Leu Asn
                85                  90                  95

Cys Thr Lys Glu Glu Val Glu Arg Leu Leu Pro Thr Arg Gln Arg Val
            100                 105                 110
```

```
Ser Leu Phe Arg Asn Leu Leu Tyr Glu Leu Ser Glu Gly Ile Asp Ser
        115                 120                 125

Glu Asn Leu Lys Asp Met Ile Phe Leu Leu Lys Asp Ser Leu Pro Lys
130                 135                 140

Thr Glu Met Thr Ser Leu Ser Phe Leu Ala Phe Leu Glu Lys Gln Gly
145                 150                 155                 160

Lys Ile Asp Glu Asp Asn Leu Thr Cys Leu Glu Asp Leu Cys Lys Thr
                165                 170                 175

Val Val Pro Lys Leu Leu Arg Asn Ile Glu Lys Tyr Lys Arg Glu Lys
            180                 185                 190

Ala Ile Gln Ile Val Thr Pro Pro Val Asp Lys Glu Ala Glu Ser Tyr
        195                 200                 205

Gln Gly Glu Glu Glu Leu Val Ser Gln Thr Asp Val Lys Thr Phe Leu
    210                 215                 220

Glu Ala Leu Pro Gln Glu Ser Trp Gln Asn Lys His Ala Gly Ser Asn
225                 230                 235                 240

Gly Asn Arg Ala Thr Asn Gly Ala Pro Ser Leu Val Ser Arg Gly Met
                245                 250                 255

Gln Gly Ala Ser Ala Asn Thr Leu Asn Ser Glu Thr Ser Thr Lys Arg
            260                 265                 270

Ala Ala Val Tyr Arg Met Asn Arg Asn His Arg Gly Leu Cys Val Ile
        275                 280                 285

Val Asn Asn His Ser Phe Thr Ser Leu Lys Asp Arg Gln Gly Thr His
    290                 295                 300

Lys Asp Ala Glu Ile Leu Ser His Val Phe Gln Trp Leu Gly Phe Thr
305                 310                 315                 320

Val His Ile His Asn Asn Val Thr Lys Val Glu Met Glu Met Val Leu
                325                 330                 335

Gln Lys Gln Lys Cys Asn Pro Ala His Ala Asp Gly Asp Cys Phe Val
            340                 345                 350

Phe Cys Ile Leu Thr His Gly Arg Phe Gly Ala Val Tyr Ser Ser Asp
        355                 360                 365

Glu Ala Leu Ile Pro Ile Arg Glu Ile Met Ser His Phe Thr Ala Leu
    370                 375                 380

Gln Cys Pro Arg Leu Ala Glu Lys Pro Lys Leu Phe Phe Ile Gln Ala
385                 390                 395                 400

Cys Gln Gly Glu Glu Ile Gln Pro Ser Val Ser Ile Glu Ala Asp Ala
                405                 410                 415

Leu Asn Pro Glu Gln Ala Pro Thr Ser Leu Gln Asp Ser Ile Pro Ala
            420                 425                 430

Glu Ala Asp Phe Leu Leu Gly Leu Ala Thr Val Pro Gly Tyr Val Ser
        435                 440                 445

Phe Arg His Val Glu Glu Gly Ser Trp Tyr Ile Gln Ser Leu Cys Asn
    450                 455                 460

His Leu Lys Lys Leu Val Pro Arg Met Leu Lys Phe Leu Glu Lys Thr
465                 470                 475                 480

Met Glu Ile Arg Gly Arg Lys Arg Thr Val Trp Gly Ala Lys Gln Ile
                485                 490                 495

Ser Ala Thr Ser Leu Pro Thr Ala Ile Ser Ala Gln Thr Pro Arg Pro
            500                 505                 510

Pro Met Arg Arg Trp Ser Ser Val Ser
        515                 520
```

<210> SEQ ID NO 21
<211> LENGTH: 585
<212> TYPE: PRT
<213> ORGANISM: Artificial Sequence
<220> FEATURE:
<223> OTHER INFORMATION: A synthetic gene insert was assembled from synthetic oligonucleotides and/or PCR products.

<400> SEQUENCE: 21

```
Met Glu Lys Lys Trp Lys Tyr Cys Ala Val Tyr Tyr Ile Ile Gln Ile
1               5                   10                  15

His Phe Val Lys Gly Val Trp Glu Lys Thr Val Asn Thr Glu Glu Asn
                20                  25                  30

Val Tyr Ala Thr Leu Gly Ser Asp Val Asn Leu Thr Cys Gln Thr Gln
            35                  40                  45

Thr Val Gly Phe Phe Val Gln Met Gln Trp Ser Lys Val Thr Asn Lys
        50                  55                  60

Ile Asp Leu Ile Ala Val Tyr His Pro Gln Tyr Gly Phe Tyr Cys Ala
65                  70                  75                  80

Tyr Gly Arg Pro Cys Glu Ser Leu Val Thr Phe Thr Glu Thr Pro Glu
                85                  90                  95

Asn Gly Ser Lys Trp Thr Leu His Leu Arg Asn Met Ser Cys Ser Val
                100                 105                 110

Ser Gly Arg Tyr Glu Cys Met Leu Val Leu Tyr Pro Glu Gly Ile Gln
            115                 120                 125

Thr Lys Ile Tyr Asn Leu Leu Ile Gln Thr His Val Thr Ala Asp Glu
        130                 135                 140

Trp Asn Ser Asn His Thr Ile Glu Ile Glu Ile Asn Gln Thr Leu Glu
145                 150                 155                 160

Ile Pro Cys Phe Gln Asn Ser Ser Ser Lys Ile Ser Ser Glu Phe Thr
                165                 170                 175

Tyr Ala Trp Ser Val Glu Asn Ser Ser Thr Asp Ser Trp Val Leu Leu
            180                 185                 190

Ser Lys Gly Ile Lys Glu Asp Asn Gly Thr Gln Glu Thr Leu Ile Ser
        195                 200                 205

Gln Asn His Leu Ile Ser Asn Ser Thr Leu Leu Lys Asp Arg Val Lys
    210                 215                 220

Leu Gly Thr Asp Tyr Arg Leu His Leu Ser Pro Val Gln Ile Phe Asp
225                 230                 235                 240

Asp Gly Arg Lys Phe Ser Cys His Ile Arg Val Gly Pro Asn Lys Ile
                245                 250                 255

Leu Arg Ser Ser Thr Thr Val Lys Val Phe Ala Lys Pro Glu Ile Pro
            260                 265                 270

Val Ile Val Glu Asn Asn Ser Thr Asp Val Leu Val Glu Arg Arg Phe
        275                 280                 285

Thr Cys Leu Leu Lys Asn Val Phe Pro Lys Ala Asn Ile Thr Trp Phe
    290                 295                 300

Ile Asp Gly Ser Phe Leu His Asp Glu Lys Glu Gly Ile Tyr Ile Thr
305                 310                 315                 320

Asn Glu Glu Arg Lys Gly Lys Asp Gly Phe Leu Glu Leu Lys Ser Val
                325                 330                 335

Leu Thr Arg Val His Ser Asn Lys Pro Ala Gln Ser Asp Asn Leu Thr
            340                 345                 350

Ile Trp Cys Met Ala Leu Ser Pro Val Pro Gly Asn Lys Val Trp Asn
        355                 360                 365
```

```
Ile Ser Ser Glu Lys Ile Thr Phe Leu Leu Gly Ser Glu Ile Ser Ser
        370                 375                 380

Thr Asp Pro Pro Leu Ser Val Thr Glu Ser Thr Leu Asp Thr Gln Pro
385                 390                 395                 400

Ser Pro Ala Ser Ser Val Ser Pro Ala Arg Tyr Pro Ala Thr Ser Ser
                405                 410                 415

Val Thr Leu Val Asp Val Ser Ala Leu Arg Pro Asn Thr Thr Pro Gln
            420                 425                 430

Pro Ser Asn Ser Ser Met Thr Thr Arg Gly Phe Asn Tyr Pro Trp Thr
        435                 440                 445

Ser Ser Gly Thr Asp Thr Lys Lys Ser Val Ser Arg Ile Pro Ser Glu
    450                 455                 460

Thr Tyr Ser Ser Ser Pro Ser Gly Ala Gly Ser Thr Leu His Asp Asn
465                 470                 475                 480

Val Phe Thr Ser Thr Ala Arg Ala Phe Ser Glu Val Pro Thr Thr Ala
                485                 490                 495

Asn Gly Ser Thr Lys Thr Asn His Val His Ile Thr Gly Ile Val Val
            500                 505                 510

Asn Lys Pro Lys Asp Gly Met Ser Trp Pro Val Ile Val Ala Ala Leu
        515                 520                 525

Leu Phe Cys Cys Met Ile Leu Phe Gly Leu Gly Val Arg Lys Trp Cys
    530                 535                 540

Gln Tyr Gln Lys Glu Ile Met Glu Arg Pro Pro Pro Phe Lys Pro Pro
545                 550                 555                 560

Pro Pro Pro Ile Lys Tyr Thr Cys Ile Gln Pro Asn Glu Ser Asp
                565                 570                 575

Leu Pro Tyr His Glu Met Glu Thr Leu
            580                 585

<210> SEQ ID NO 22
<211> LENGTH: 380
<212> TYPE: PRT
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 22

Met Gly Ile Gln Gly Leu Ala Lys Leu Ile Ala Asp Val Ala Pro Ser
1               5                   10                  15

Ala Ile Arg Glu Asn Asp Ile Lys Ser Tyr Phe Gly Lys Val Ala
            20                  25                  30

Ile Asp Ala Ser Met Ser Ile Tyr Gln Phe Leu Ile Ala Val Arg Gln
        35                  40                  45

Gly Gly Asp Val Leu Gln Asn Glu Glu Gly Glu Thr Thr Ser His Leu
    50                  55                  60

Met Gly Met Phe Tyr Arg Thr Ile Arg Met Met Glu Asn Gly Ile Lys
65                  70                  75                  80

Pro Val Tyr Val Phe Asp Gly Lys Pro Pro Gln Leu Lys Ser Gly Glu
                85                  90                  95

Leu Ala Lys Arg Ser Glu Arg Arg Ala Glu Ala Glu Lys Gln Leu Gln
            100                 105                 110

Gln Ala Gln Ala Ala Gly Ala Glu Gln Glu Val Glu Lys Phe Thr Lys
        115                 120                 125

Arg Leu Val Lys Val Thr Lys Gln His Asn Asp Glu Cys Lys His Leu
```

```
                130             135             140
Leu Ser Leu Met Gly Ile Pro Tyr Leu Asp Ala Pro Ser Glu Ala Glu
145                 150                 155                 160

Ala Ser Cys Ala Ala Leu Val Lys Ala Gly Lys Val Tyr Ala Ala Ala
                165                 170                 175

Thr Glu Asp Met Asp Cys Leu Thr Phe Gly Ser Pro Val Leu Met Arg
                180                 185                 190

His Leu Thr Ala Ser Glu Ala Lys Lys Leu Pro Ile Gln Glu Phe His
                195                 200                 205

Leu Ser Arg Ile Leu Gln Glu Leu Gly Leu Asn Gln Glu Gln Phe Val
210                 215                 220

Asp Leu Cys Ile Leu Leu Gly Ser Asp Tyr Cys Glu Ser Ile Arg Gly
225                 230                 235                 240

Ile Gly Pro Lys Arg Ala Val Asp Leu Ile Gln Lys His Lys Ser Ile
                245                 250                 255

Glu Glu Ile Val Arg Arg Leu Asp Pro Asn Lys Tyr Pro Val Pro Glu
                260                 265                 270

Asn Trp Leu His Lys Glu Ala His Gln Leu Phe Leu Glu Pro Glu Val
                275                 280                 285

Leu Asp Pro Glu Ser Val Glu Leu Lys Trp Ser Glu Pro Asn Glu Glu
                290                 295                 300

Glu Leu Ile Lys Phe Met Cys Gly Glu Lys Gln Phe Ser Glu Glu Arg
305                 310                 315                 320

Ile Arg Ser Gly Val Lys Arg Leu Ser Lys Ser Arg Gln Gly Ser Thr
                325                 330                 335

Gln Gly Arg Leu Asp Asp Phe Phe Lys Val Thr Gly Ser Leu Ser Ser
                340                 345                 350

Ala Lys Arg Lys Glu Pro Glu Pro Lys Gly Ser Thr Lys Lys Lys Ala
                355                 360                 365

Lys Thr Gly Ala Ala Gly Lys Phe Lys Arg Gly Lys
                370                 375                 380

<210> SEQ ID NO 23
<211> LENGTH: 223
<212> TYPE: PRT
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 23

Met Ala Ala Val Pro Gln Arg Ala Trp Thr Val Glu Gln Leu Arg
1               5                   10                  15

Ser Glu Gln Leu Pro Lys Lys Asp Ile Ile Lys Phe Leu Gln Glu His
                20                  25                  30

Gly Ser Asp Ser Phe Leu Ala Glu His Lys Leu Leu Gly Asn Ile Lys
                35                  40                  45

Asn Val Ala Lys Thr Ala Asn Lys Asp His Leu Val Thr Ala Tyr Asn
50                  55                  60

His Leu Phe Glu Thr Lys Arg Phe Lys Gly Thr Glu Ser Ile Ser Lys
65                  70                  75                  80

Val Ser Glu Gln Val Lys Asn Val Lys Leu Asn Glu Asp Lys Pro Lys
                85                  90                  95

Glu Thr Lys Ser Glu Gly Thr Leu Asp Glu Gly Pro Pro Lys Tyr Thr
                100                 105                 110
```

Lys Ser Val Leu Lys Lys Gly Asp Lys Thr Asn Phe Pro Lys Lys Gly
            115                 120                 125

Asp Val Val His Cys Trp Tyr Thr Gly Thr Leu Gln Asp Gly Thr Val
        130                 135                 140

Phe Asp Thr Asn Ile Gln Thr Ser Ala Lys Lys Lys Asn Ala Lys
145                 150                 155                 160

Pro Leu Ser Phe Lys Val Gly Val Lys Val Ile Arg Gly Trp Asp
                165                 170                 175

Glu Ala Leu Leu Thr Met Ser Lys Gly Glu Lys Ala Arg Leu Glu Ile
            180                 185                 190

Glu Pro Glu Trp Ala Tyr Gly Lys Lys Gly Gln Pro Asp Ala Lys Ile
            195                 200                 205

Pro Pro Asn Ala Lys Leu Thr Phe Glu Val Glu Leu Val Asp Ile
            210                 215                 220

<210> SEQ ID NO 24
<211> LENGTH: 1086
<212> TYPE: PRT
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 24

Met Gly Asn Ala Gly Ser Met Asp Ser Gln Gln Thr Asp Phe Arg Ala
1               5                   10                  15

His Asn Val Pro Leu Lys Leu Pro Met Pro Glu Pro Gly Glu Leu Glu
            20                  25                  30

Glu Arg Phe Ala Ile Val Leu Asn Ala Met Asn Leu Pro Pro Asp Lys
        35                  40                  45

Ala Arg Leu Leu Arg Gln Tyr Asp Asn Glu Lys Lys Trp Glu Leu Ile
    50                  55                  60

Cys Asp Gln Glu Arg Phe Gln Val Lys Asn Pro Pro His Thr Tyr Ile
65                  70                  75                  80

Gln Lys Leu Lys Gly Tyr Leu Asp Pro Ala Val Thr Arg Lys Lys Phe
                85                  90                  95

Arg Arg Arg Val Gln Glu Ser Thr Gln Val Leu Arg Glu Leu Glu Ile
            100                 105                 110

Ser Leu Arg Thr Asn His Ile Gly Trp Val Arg Glu Phe Leu Asn Glu
        115                 120                 125

Glu Asn Lys Gly Leu Asp Val Leu Val Glu Tyr Leu Ser Phe Ala Gln
    130                 135                 140

Tyr Ala Val Thr Phe Asp Phe Glu Ser Val Glu Ser Thr Val Glu Ser
145                 150                 155                 160

Ser Val Asp Lys Ser Lys Pro Trp Ser Arg Ser Ile Glu Asp Leu His
                165                 170                 175

Arg Gly Ser Asn Leu Pro Ser Pro Val Gly Asn Ser Val Ser Arg Ser
            180                 185                 190

Gly Arg His Ser Ala Leu Arg Tyr Asn Thr Leu Pro Ser Arg Arg Thr
        195                 200                 205

Leu Lys Asn Ser Arg Leu Val Ser Lys Asp Asp Val His Val Cys
    210                 215                 220

Ile Met Cys Leu Arg Ala Ile Met Asn Tyr Gln Tyr Gly Phe Asn Met
225                 230                 235                 240

Val Met Ser His Pro His Ala Val Asn Glu Ile Ala Leu Ser Leu Asn
                245                 250                 255

```
Asn Lys Asn Pro Arg Thr Lys Ala Leu Val Leu Glu Leu Leu Ala Ala
            260                 265                 270

Val Cys Leu Val Arg Gly Gly His Glu Ile Ile Leu Ser Ala Phe Asp
            275                 280                 285

Asn Phe Lys Glu Val Cys Gly Glu Lys Gln Arg Phe Glu Lys Leu Met
            290                 295                 300

Glu His Phe Arg Asn Glu Asp Asn Ile Asp Phe Met Val Ala Ser
305                 310                 315                 320

Met Gln Phe Ile Asn Ile Val Val His Ser Val Glu Asp Met Asn Phe
                325                 330                 335

Arg Val His Leu Gln Tyr Glu Phe Thr Lys Leu Gly Leu Asp Glu Tyr
            340                 345                 350

Leu Asp Lys Leu Lys His Thr Glu Ser Asp Lys Leu Gln Val Gln Ile
            355                 360                 365

Gln Ala Tyr Leu Asp Asn Val Phe Asp Val Gly Ala Leu Leu Glu Asp
            370                 375                 380

Ala Glu Thr Lys Asn Ala Ala Leu Glu Arg Val Glu Glu Leu Glu Glu
385                 390                 395                 400

Asn Ile Ser His Leu Ser Glu Lys Leu Gln Asp Thr Glu Asn Glu Ala
            405                 410                 415

Met Ser Lys Ile Val Glu Leu Glu Lys Gln Leu Met Gln Arg Asn Lys
            420                 425                 430

Glu Leu Asp Val Val Arg Glu Ile Tyr Lys Asp Ala Asn Thr Gln Val
            435                 440                 445

His Thr Leu Arg Lys Met Val Lys Glu Lys Glu Ala Ile Gln Arg
            450                 455                 460

Gln Ser Thr Leu Glu Lys Lys Ile His Glu Leu Glu Lys Gln Gly Thr
465                 470                 475                 480

Ile Lys Ile Gln Lys Lys Gly Asp Gly Asp Ile Ala Ile Leu Pro Val
            485                 490                 495

Val Ala Ser Gly Thr Leu Ser Met Gly Ser Glu Val Val Ala Gly Asn
            500                 505                 510

Ser Val Gly Pro Thr Met Gly Ala Ala Ser Ser Gly Pro Leu Pro Pro
            515                 520                 525

Pro Pro Pro Pro Leu Pro Pro Ser Ser Asp Thr Pro Glu Thr Val Gln
            530                 535                 540

Asn Gly Pro Val Thr Pro Pro Met Pro Pro Pro Pro Pro Pro Pro Pro
545                 550                 555                 560

Pro Pro Pro Pro Pro Pro Pro Pro Pro Pro Pro Pro Pro Leu Pro Gly
            565                 570                 575

Pro Ala Ala Glu Thr Val Pro Ala Pro Pro Leu Ala Pro Pro Leu Pro
            580                 585                 590

Ser Ala Pro Pro Leu Pro Gly Thr Ser Ser Pro Thr Val Val Phe Asn
            595                 600                 605

Ser Gly Leu Ala Ala Val Lys Ile Lys Pro Ile Lys Thr Lys Phe
            610                 615                 620

Arg Met Pro Val Phe Asn Trp Val Ala Leu Lys Pro Asn Gln Ile Asn
625                 630                 635                 640

Gly Thr Val Phe Asn Glu Ile Asp Asp Glu Arg Ile Leu Glu Asp Leu
                645                 650                 655

Asn Val Asp Glu Phe Glu Glu Ile Phe Lys Thr Lys Ala Gln Gly Pro
            660                 665                 670
```

```
Ala Ile Asp Leu Ser Ser Ser Lys Gln Lys Ile Pro Gln Lys Gly Ser
            675                 680                 685

Asn Lys Val Thr Leu Leu Glu Ala Asn Arg Ala Lys Asn Leu Ala Ile
        690                 695                 700

Thr Leu Arg Lys Ala Gly Lys Thr Ala Asp Glu Ile Cys Lys Ala Ile
705                 710                 715                 720

His Val Phe Asp Leu Lys Thr Leu Pro Val Asp Phe Val Glu Cys Leu
                725                 730                 735

Met Arg Phe Leu Pro Thr Glu Asn Glu Val Lys Val Leu Arg Leu Tyr
            740                 745                 750

Glu Arg Glu Arg Lys Pro Leu Glu Asn Leu Ser Asp Glu Asp Arg Phe
        755                 760                 765

Met Met Gln Phe Ser Lys Ile Glu Arg Leu Met Gln Lys Met Thr Ile
    770                 775                 780

Met Ala Phe Ile Gly Asn Phe Ala Glu Ser Ile Gln Met Leu Thr Pro
785                 790                 795                 800

Gln Leu His Ala Ile Ala Ala Ser Val Ser Ile Lys Ser Ser Gln
                805                 810                 815

Lys Leu Lys Lys Ile Leu Glu Ile Ile Leu Ala Leu Gly Asn Tyr Met
            820                 825                 830

Asn Ser Ser Lys Arg Gly Ala Val Tyr Gly Phe Lys Leu Gln Ser Leu
        835                 840                 845

Asp Leu Leu Leu Asp Thr Lys Ser Thr Asp Arg Lys Gln Thr Leu Leu
    850                 855                 860

His Tyr Ile Ser Asn Val Val Lys Glu Lys Tyr His Gln Val Ser Leu
865                 870                 875                 880

Phe Tyr Asn Glu Leu His Tyr Val Glu Lys Ala Ala Ala Val Ser Leu
                885                 890                 895

Glu Asn Val Leu Leu Asp Val Lys Glu Leu Gln Arg Gly Met Asp Leu
            900                 905                 910

Thr Lys Arg Glu Tyr Thr Met His Asp His Asn Thr Leu Leu Lys Glu
        915                 920                 925

Phe Ile Leu Asn Asn Glu Gly Lys Leu Lys Lys Leu Gln Asp Asp Ala
    930                 935                 940

Lys Ile Ala Gln Asp Ala Phe Asp Asp Val Val Lys Tyr Phe Gly Glu
945                 950                 955                 960

Asn Pro Lys Thr Thr Pro Pro Ser Val Phe Phe Pro Val Phe Val Arg
                965                 970                 975

Phe Val Lys Ala Tyr Lys Gln Ala Glu Glu Glu Asn Gly Leu Arg Lys
            980                 985                 990

Lys Gln Glu Gln Ala Leu Met Glu Lys Leu Leu Glu Gln Glu Ala Leu
        995                 1000                1005

Met Glu Gln Gln Asp Pro Lys Ser Pro Ser His Lys Ser Lys Arg
    1010                1015                1020

Gln Gln Gln Glu Leu Ile Ala Glu Leu Arg Arg Arg Gln Val Lys
    1025                1030                1035

Asp Asn Arg His Val Tyr Glu Gly Lys Asp Gly Ala Ile Glu Asp
    1040                1045                1050

Ile Ile Thr Val Leu Lys Thr Val Pro Phe Thr Ala Arg Thr Ala
    1055                1060                1065

Lys Arg Gly Ser Arg Phe Phe Cys Glu Pro Val Leu Thr Glu Glu
    1070                1075                1080

Tyr His Tyr
```

```
            1085
```

<210> SEQ ID NO 25
<211> LENGTH: 335
<212> TYPE: PRT
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 25

Met Ala Gly Ala Ala Glu Ala Ala Val Ala Ala Val Glu Glu Val
1               5                   10                  15

Gly Ser Ala Gly Gln Phe Glu Glu Leu Leu Arg Leu Lys Ala Lys Ser
                20                  25                  30

Leu Leu Val Val His Phe Trp Ala Pro Trp Ala Pro Gln Cys Ala Gln
                35                  40                  45

Met Asn Glu Val Met Ala Glu Leu Ala Lys Glu Leu Pro Gln Val Ser
            50                  55                  60

Phe Val Lys Leu Glu Ala Gly Val Pro Glu Val Ser Glu Lys Tyr
65              70                  75                  80

Glu Ile Ser Ser Val Pro Thr Phe Leu Phe Phe Lys Asn Ser Gln Lys
                    85                  90                  95

Ile Asp Arg Leu Asp Gly Ala His Ala Pro Glu Leu Thr Lys Lys Val
                100                 105                 110

Gln Arg His Ala Ser Ser Gly Ser Phe Leu Pro Ser Ala Asn Glu His
                115                 120                 125

Leu Lys Glu Asp Leu Asn Leu Arg Leu Lys Lys Leu Thr His Ala Ala
                130                 135                 140

Pro Cys Met Leu Phe Met Lys Gly Thr Pro Gln Glu Pro Arg Cys Gly
145                 150                 155                 160

Phe Ser Lys Gln Met Val Glu Ile Leu His Lys His Asn Ile Gln Phe
                165                 170                 175

Ser Ser Phe Asp Ile Phe Ser Asp Glu Glu Val Arg Gln Gly Leu Lys
                180                 185                 190

Ala Tyr Ser Ser Trp Pro Thr Tyr Pro Gln Leu Tyr Val Ser Gly Glu
                195                 200                 205

Leu Ile Gly Gly Leu Asp Ile Ile Lys Glu Leu Glu Ala Ser Glu Glu
                210                 215                 220

Leu Asp Thr Ile Cys Pro Lys Ala Pro Lys Leu Glu Glu Arg Leu Lys
225                 230                 235                 240

Val Leu Thr Asn Lys Ala Ser Val Met Leu Phe Met Lys Gly Asn Lys
                245                 250                 255

Gln Glu Ala Lys Cys Gly Phe Ser Lys Gln Ile Leu Glu Ile Leu Asn
                260                 265                 270

Ser Thr Gly Val Glu Tyr Glu Thr Phe Asp Ile Leu Glu Asp Glu Glu
                275                 280                 285

Val Arg Gln Gly Leu Lys Ala Tyr Ser Asn Trp Thr Tyr Pro Gln
                290                 295                 300

Leu Tyr Val Lys Gly Glu Leu Val Gly Gly Leu Asp Ile Val Lys Glu
305                 310                 315                 320

Leu Lys Glu Asn Gly Glu Leu Leu Pro Ile Leu Arg Gly Glu Asn
                325                 330                 335

<210> SEQ ID NO 26
<211> LENGTH: 966

<212> TYPE: PRT
<213> ORGANISM: Artificial Sequence
<220> FEATURE:
<223> OTHER INFORMATION: A synthetic gene insert was assembled from synthetic oligonucleotides and/or PCR products.

<400> SEQUENCE: 26

```
Met Ala Asn Phe Gln Glu His Leu Ser Cys Ser Ser Pro His Leu
1               5                   10                  15

Pro Phe Ser Glu Ser Lys Thr Phe Asn Gly Leu Gln Asp Glu Leu Thr
            20                  25                  30

Ala Met Gly Asn His Pro Ser Pro Lys Leu Leu Glu Asp Gln Gln Glu
        35                  40                  45

Lys Gly Met Val Arg Thr Glu Leu Ile Glu Ser Val His Ser Pro Val
    50                  55                  60

Thr Thr Thr Val Leu Thr Ser Val Ser Glu Asp Ser Arg Asp Gln Phe
65                  70                  75                  80

Glu Asn Ser Val Leu Gln Leu Arg Glu His Asp Glu Ser Glu Thr Ala
                85                  90                  95

Val Ser Gln Gly Asn Ser Asn Thr Val Asp Gly Glu Ser Thr Ser Gly
            100                 105                 110

Thr Glu Asp Ile Lys Ile Gln Phe Ser Arg Ser Gly Ser Gly Ser Gly
        115                 120                 125

Gly Phe Leu Glu Gly Leu Phe Gly Cys Leu Arg Pro Val Trp Asn Ile
    130                 135                 140

Ile Gly Lys Ala Tyr Ser Thr Asp Tyr Lys Leu Gln Gln Gln Asp Thr
145                 150                 155                 160

Trp Glu Val Pro Phe Glu Glu Ile Ser Glu Leu Gln Trp Leu Gly Ser
                165                 170                 175

Gly Ala Gln Gly Ala Val Phe Leu Gly Lys Phe Arg Ala Glu Glu Val
            180                 185                 190

Ala Ile Lys Lys Val Arg Glu Gln Asn Glu Thr Asp Ile Lys His Leu
        195                 200                 205

Arg Lys Leu Lys His Pro Asn Ile Ile Ala Phe Lys Gly Val Cys Thr
    210                 215                 220

Gln Ala Pro Cys Tyr Cys Ile Ile Met Glu Tyr Cys Ala His Gly Gln
225                 230                 235                 240

Leu Tyr Glu Val Leu Arg Ala Gly Arg Lys Ile Thr Pro Arg Leu Leu
                245                 250                 255

Val Asp Trp Ser Thr Gly Ile Ala Ser Gly Met Asn Tyr Leu His Leu
            260                 265                 270

His Lys Ile Ile His Arg Asp Leu Lys Ser Pro Asn Val Leu Val Thr
        275                 280                 285

His Thr Asp Ala Val Lys Ile Ser Asp Phe Gly Thr Ser Lys Glu Leu
    290                 295                 300

Ser Asp Lys Ser Thr Lys Met Ser Phe Ala Gly Thr Val Ala Trp Met
305                 310                 315                 320

Ala Pro Glu Val Ile Arg Asn Glu Pro Val Ser Glu Lys Val Asp Ile
                325                 330                 335

Trp Ser Phe Gly Val Val Leu Trp Glu Leu Leu Thr Gly Glu Ile Pro
            340                 345                 350

Tyr Lys Asp Val Asp Ser Ser Ala Ile Ile Trp Gly Val Gly Ser Asn
        355                 360                 365

Ser Leu His Leu Pro Val Pro Ser Thr Cys Pro Asp Gly Phe Lys Ile
    370                 375                 380
```

-continued

Leu Met Lys Gln Thr Trp Gln Ser Lys Pro Arg Asn Arg Pro Ser Phe
385                 390                 395                 400

Arg Gln Thr Leu Met His Leu Asp Ile Ala Ser Ala Asp Val Leu Ala
            405                 410                 415

Thr Pro Gln Glu Thr Tyr Phe Lys Ser Gln Ala Glu Trp Arg Glu Glu
        420                 425                 430

Val Lys Lys His Phe Glu Lys Ile Lys Ser Glu Gly Thr Cys Ile His
    435                 440                 445

Arg Leu Asp Glu Glu Leu Ile Arg Arg Arg Glu Glu Leu Arg His
450                 455                 460

Ala Leu Asp Ile Arg Glu His Tyr Glu Arg Lys Leu Glu Arg Ala Asn
465                 470                 475                 480

Asn Leu Tyr Met Glu Leu Ser Ala Ile Met Leu Gln Leu Glu Met Arg
            485                 490                 495

Glu Lys Glu Leu Ile Lys Arg Glu Gln Ala Val Glu Lys Lys Tyr Pro
            500                 505                 510

Gly Thr Tyr Lys Arg His Pro Val Arg Pro Ile Ile His Pro Asn Ala
        515                 520                 525

Met Glu Lys Leu Met Lys Arg Lys Gly Val Pro His Lys Ser Gly Met
530                 535                 540

Gln Thr Lys Arg Pro Asp Leu Leu Arg Ser Glu Gly Ile Pro Thr Thr
545                 550                 555                 560

Glu Val Ala Pro Thr Ala Ser Pro Leu Ser Gly Ser Pro Lys Met Ser
                565                 570                 575

Thr Ser Ser Ser Lys Ser Arg Tyr Arg Ser Lys Pro Arg His Arg Arg
            580                 585                 590

Gly Asn Ser Arg Gly Ser His Ser Asp Phe Ala Ala Ile Leu Lys Asn
            595                 600                 605

Gln Pro Ala Gln Glu Asn Ser Pro His Pro Thr Tyr Leu His Gln Ala
        610                 615                 620

Gln Ser Gln Tyr Pro Ser Leu His His His Asn Ser Leu Gln Gln Gln
625                 630                 635                 640

Tyr Gln Gln Pro Pro Ala Met Ser Gln Ser His His Pro Arg Leu
                645                 650                 655

Asn Met His Gly Gln Asp Ile Ala Thr Cys Ala Asn Asn Leu Arg Tyr
            660                 665                 670

Phe Gly Pro Ala Ala Ala Leu Arg Ser Pro Leu Ser Asn His Ala Gln
            675                 680                 685

Arg Gln Leu Pro Gly Ser Ser Pro Asp Leu Ile Ser Thr Ala Met Ala
        690                 695                 700

Ala Asp Cys Trp Arg Ser Ser Glu Pro Asp Lys Gly Gln Ala Gly Pro
705                 710                 715                 720

Trp Gly Cys Cys Gln Ala Asp Ala Tyr Asp Pro Cys Leu Gln Cys Arg
                725                 730                 735

Pro Glu Gln Tyr Gly Ser Leu Asp Ile Pro Ser Ala Glu Pro Val Gly
                740                 745                 750

Arg Ser Pro Asp Leu Ser Lys Ser Pro Ala His Asn Pro Leu Leu Glu
            755                 760                 765

Asn Ala Gln Ser Ser Glu Lys Thr Glu Glu Asn Glu Phe Ser Gly Cys
            770                 775                 780

Arg Ser Glu Ser Ser Leu Gly Thr Ser His Leu Gly Thr Pro Pro Ala
785                 790                 795                 800

Leu Pro Arg Lys Thr Arg Pro Leu Gln Lys Ser Gly Asp Asp Ser Ser
            805                 810                 815

Glu Glu Glu Glu Gly Glu Val Asp Ser Glu Val Glu Phe Pro Arg Arg
        820                 825                 830

Gln Arg Pro His Arg Cys Ile Ser Ser Cys Gln Ser Tyr Ser Thr Phe
        835                 840                 845

Ser Ser Glu Asn Phe Ser Val Ser Asp Gly Glu Gly Asn Thr Ser
850                 855                 860

Asp His Ser Asn Ser Pro Asp Glu Leu Ala Asp Lys Leu Glu Asp Arg
865                 870                 875                 880

Leu Ala Glu Lys Leu Asp Asp Leu Leu Ser Gln Thr Pro Glu Ile Pro
                885                 890                 895

Ile Asp Ile Ser Ser His Ser Asp Gly Leu Ser Asp Lys Glu Cys Ala
                900                 905                 910

Val Arg Arg Val Lys Thr Gln Met Ser Leu Gly Lys Leu Cys Val Glu
            915                 920                 925

Glu Arg Gly Tyr Glu Asn Pro Met Gln Phe Glu Ser Asp Cys Asp
        930                 935                 940

Ser Ser Asp Gly Glu Cys Ser Asp Ala Thr Val Arg Thr Asn Lys His
945                 950                 955                 960

Tyr Ser Ser Ala Thr Trp
                965

<210> SEQ ID NO 27
<211> LENGTH: 1152
<212> TYPE: PRT
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 27

Met Ala Asp Leu Ser Leu Ala Asp Ala Leu Thr Glu Pro Ser Pro Asp
1               5                   10                  15

Ile Glu Gly Glu Ile Lys Arg Asp Phe Ile Ala Thr Leu Glu Ala Glu
            20                  25                  30

Ala Phe Asp Asp Val Val Gly Glu Thr Val Gly Lys Thr Asp Tyr Ile
        35                  40                  45

Pro Leu Leu Asp Val Asp Glu Lys Thr Gly Asn Ser Glu Ser Lys Lys
    50                  55                  60

Lys Pro Cys Ser Glu Thr Ser Gln Ile Glu Asp Thr Pro Ser Ser Lys
65                  70                  75                  80

Pro Thr Leu Leu Ala Asn Gly Gly His Gly Val Glu Gly Ser Asp Thr
                85                  90                  95

Thr Gly Ser Pro Thr Glu Phe Leu Glu Leu Lys Met Ala Tyr Gln Glu
            100                 105                 110

Tyr Pro Asn Ser Gln Asn Trp Pro Glu Asp Thr Asn Phe Cys Phe Gln
        115                 120                 125

Pro Glu Gln Val Val Asp Pro Ile Gln Thr Asp Pro Phe Lys Met Tyr
    130                 135                 140

His Asp Asp Asp Leu Ala Asp Leu Val Phe Pro Ser Ser Ala Thr Ala
145                 150                 155                 160

Asp Thr Ser Ile Phe Ala Gly Gln Asn Asp Pro Leu Lys Asp Ser Tyr
                165                 170                 175

Gly Met Ser Pro Cys Asn Thr Ala Val Val Pro Gln Gly Trp Ser Val
            180                 185                 190

```
Glu Ala Leu Asn Ser Pro His Ser Glu Ser Phe Val Ser Pro Glu Ala
            195                 200                 205

Val Ala Glu Pro Pro Gln Pro Thr Ala Val Pro Leu Glu Leu Ala Lys
210                 215                 220

Glu Ile Glu Met Ala Ser Glu Arg Pro Pro Ala Gln Ala Leu Glu
225                 230                 235                 240

Ile Met Met Gly Leu Lys Thr Thr Asp Met Ala Pro Ser Lys Glu Thr
            245                 250                 255

Glu Met Ala Leu Ala Lys Asp Met Ala Leu Ala Thr Lys Thr Glu Val
            260                 265                 270

Ala Leu Ala Lys Asp Met Glu Ser Pro Thr Lys Leu Asp Val Thr Leu
            275                 280                 285

Ala Lys Asp Met Gln Pro Ser Met Glu Ser Asp Met Ala Leu Val Lys
            290                 295                 300

Asp Met Glu Leu Pro Thr Glu Lys Glu Val Ala Leu Val Lys Asp Val
305                 310                 315                 320

Arg Trp Pro Thr Glu Thr Asp Val Ser Ser Ala Lys Asn Val Leu
                    325                 330                 335

Pro Thr Glu Thr Glu Val Ala Pro Ala Lys Asp Val Thr Leu Leu Lys
            340                 345                 350

Glu Thr Glu Arg Ala Ser Pro Ile Lys Met Asp Leu Ala Pro Ser Lys
            355                 360                 365

Asp Met Gly Pro Pro Lys Glu Asn Lys Lys Glu Thr Glu Arg Ala Ser
            370                 375                 380

Pro Ile Lys Met Asp Leu Ala Pro Ser Lys Asp Met Gly Pro Pro Lys
385                 390                 395                 400

Glu Asn Lys Ile Val Pro Ala Lys Asp Leu Val Leu Leu Ser Glu Ile
                    405                 410                 415

Glu Val Ala Gln Ala Asn Asp Ile Ile Ser Ser Thr Glu Ile Ser Ser
                    420                 425                 430

Ala Glu Lys Val Ala Leu Ser Ser Glu Thr Glu Val Ala Leu Ala Arg
            435                 440                 445

Asp Met Thr Leu Pro Pro Glu Thr Asn Val Ile Leu Thr Lys Asp Lys
            450                 455                 460

Ala Leu Pro Leu Glu Ala Glu Val Ala Pro Val Lys Asp Met Ala Gln
465                 470                 475                 480

Leu Pro Glu Thr Glu Ile Ala Pro Ala Lys Asp Val Ala Pro Ser Thr
                    485                 490                 495

Val Lys Glu Val Gly Leu Leu Lys Asp Met Ser Pro Leu Ser Glu Thr
            500                 505                 510

Glu Met Ala Leu Gly Lys Asp Val Thr Pro Pro Gly Thr Glu Val
            515                 520                 525

Val Leu Ile Lys Asn Val Cys Leu Pro Pro Glu Met Glu Val Ala Leu
530                 535                 540

Thr Glu Asp Gln Val Pro Ala Leu Lys Thr Glu Ala Pro Leu Ala Lys
545                 550                 555                 560

Asp Gly Val Leu Thr Leu Ala Asn Asn Val Thr Pro Ala Lys Asp Val
            565                 570                 575

Pro Pro Leu Ser Glu Thr Glu Ala Thr Pro Val Pro Ile Lys Asp Met
            580                 585                 590

Glu Ile Ala Gln Thr Gln Lys Gly Ile Ser Glu Asp Ser His Leu Glu
            595                 600                 605
```

```
Ser Leu Gln Asp Val Gly Gln Ser Ala Ala Pro Thr Phe Met Ile Ser
    610             615                 620
Pro Glu Thr Val Thr Gly Thr Gly Lys Lys Cys Ser Leu Pro Ala Glu
625                 630                 635                 640
Glu Asp Ser Val Leu Glu Lys Leu Gly Glu Arg Lys Pro Cys Asn Ser
                645                 650                 655
Gln Pro Ser Glu Leu Ser Ser Glu Thr Ser Gly Ile Ala Arg Pro Glu
            660                 665                 670
Glu Gly Arg Pro Val Val Ser Gly Thr Gly Asn Asp Ile Thr Thr Pro
        675                 680                 685
Pro Asn Lys Glu Leu Pro Pro Ser Pro Glu Lys Lys Thr Lys Pro Leu
690                 695                 700
Ala Thr Thr Gln Pro Ala Lys Thr Ser Thr Ser Lys Ala Lys Thr Gln
705                 710                 715                 720
Pro Thr Ser Leu Pro Lys Gln Pro Ala Pro Thr Thr Ile Gly Gly Leu
                725                 730                 735
Asn Lys Lys Pro Met Ser Leu Ala Ser Gly Leu Val Pro Ala Ala Pro
            740                 745                 750
Pro Lys Arg Pro Ala Val Ala Ser Ala Arg Pro Ser Ile Leu Pro Ser
        755                 760                 765
Lys Asp Val Lys Pro Lys Pro Ile Ala Asp Ala Lys Ala Pro Glu Lys
770                 775                 780
Arg Ala Ser Pro Ser Lys Pro Ala Ser Ala Pro Ala Ser Arg Ser Gly
785                 790                 795                 800
Ser Lys Ser Thr Gln Thr Val Ala Lys Thr Thr Thr Ala Ala Ala Val
                805                 810                 815
Ala Ser Thr Gly Pro Ser Ser Arg Ser Pro Ser Thr Leu Leu Pro Lys
            820                 825                 830
Lys Pro Thr Ala Ile Lys Thr Glu Gly Lys Pro Ala Glu Val Lys Lys
        835                 840                 845
Met Thr Ala Lys Ser Val Pro Ala Asp Leu Ser Arg Pro Lys Ser Thr
850                 855                 860
Ser Thr Ser Ser Met Lys Lys Thr Thr Thr Leu Ser Gly Thr Ala Pro
865                 870                 875                 880
Ala Ala Gly Val Val Pro Ser Arg Val Lys Ala Thr Pro Met Pro Ser
                885                 890                 895
Arg Pro Ser Thr Thr Pro Phe Ile Asp Lys Lys Pro Thr Ser Ala Lys
            900                 905                 910
Pro Ser Ser Thr Thr Pro Arg Leu Ser Arg Leu Ala Thr Asn Thr Ser
        915                 920                 925
Ala Pro Asp Leu Lys Asn Val Arg Ser Lys Val Gly Ser Thr Glu Asn
930                 935                 940
Ile Lys His Gln Pro Gly Gly Arg Ala Lys Val Glu Lys Lys Thr
945                 950                 955                 960
Glu Ala Ala Ala Thr Thr Arg Lys Pro Glu Ser Asn Ala Val Thr Lys
                965                 970                 975
Thr Ala Gly Pro Ile Ala Ser Ala Gln Lys Gln Pro Ala Gly Lys Val
            980                 985                 990
Gln Ile Val Ser Lys Lys Val Ser Tyr Ser His Ile Gln Ser Lys Cys
        995                 1000                1005
Gly Ser Lys Asp Asn Ile Lys His Val Pro Gly Gly Gly Asn Val
        1010                1015                1020
Gln Ile Gln Asn Lys Lys Val Asp Ile Ser Lys Val Ser Ser Lys
```

```
            1025                1030                1035

Cys Gly Ser Lys Ala Asn Ile Lys His Lys Pro Gly Gly Gly Asp
        1040                1045                1050

Val Lys Ile Glu Ser Gln Lys Leu Asn Phe Lys Glu Lys Ala Gln
    1055                1060                1065

Ala Lys Val Gly Ser Leu Asp Asn Val Gly His Leu Pro Ala Gly
    1070                1075                1080

Gly Ala Val Lys Thr Glu Gly Gly Ser Glu Ala Pro Leu Cys
        1085                1090                1095

Pro Gly Pro Pro Ala Gly Glu Glu Pro Ala Ile Ser Glu Ala Ala
    1100                1105                1110

Pro Glu Ala Gly Ala Pro Thr Ser Ala Ser Gly Leu Asn Gly His
    1115                1120                1125

Pro Thr Leu Ser Gly Gly Gly Asp Gln Arg Glu Ala Gln Thr Leu
    1130                1135                1140

Asp Ser Gln Ile Gln Glu Thr Ser Ile
    1145                1150

<210> SEQ ID NO 28
<211> LENGTH: 401
<212> TYPE: PRT
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 28

Met Arg Arg Ala Pro Ala Ala Glu Arg Leu Leu Glu Leu Gly Phe Pro
1               5                   10                  15

Pro Arg Cys Gly Arg Gln Glu Pro Pro Phe Pro Leu Gly Val Thr Arg
            20                  25                  30

Gly Trp Gly Arg Trp Pro Ile Gln Lys Arg Arg Glu Gly Ala Arg Pro
        35                  40                  45

Val Pro Phe Ser Glu Arg Ser Gln Glu Asp Gly Arg Gly Pro Ala Ala
    50                  55                  60

Arg Ser Ser Gly Thr Leu Trp Arg Ile Arg Thr Arg Leu Ser Leu Cys
65                  70                  75                  80

Arg Asp Pro Glu Pro Pro Pro Leu Cys Leu Leu Arg Val Ser Leu
                85                  90                  95

Leu Cys Ala Leu Arg Ala Gly Arg Gly Ser Arg Trp Gly Glu Asp
            100                 105                 110

Gly Ala Arg Leu Leu Leu Pro Ala Arg Ala Ala Gly Asn Gly
        115                 120                 125

Glu Ala Glu Pro Ser Gly Gly Pro Ser Tyr Ala Gly Arg Met Leu Glu
    130                 135                 140

Ser Ser Gly Cys Lys Ala Leu Lys Glu Gly Val Leu Glu Lys Arg Ser
145                 150                 155                 160

Asp Gly Leu Leu Gln Leu Trp Lys Lys Lys Cys Cys Ile Leu Thr Glu
                165                 170                 175

Glu Gly Leu Leu Leu Ile Pro Pro Lys Gln Leu Gln His Gln Gln Gln
            180                 185                 190

Gln Gln Gln Gln Gln Gln Gln Gln Gln Gln Gln Pro Gly Gln Gly
        195                 200                 205

Pro Ala Glu Pro Ser Gln Pro Ser Gly Pro Ala Val Ala Ser Leu Glu
    210                 215                 220
```

-continued

Pro Pro Val Lys Leu Lys Glu Leu His Phe Ser Asn Met Lys Thr Val
225                 230                 235                 240

Asp Cys Val Glu Arg Lys Gly Lys Tyr Met Tyr Phe Thr Val Val Met
            245                 250                 255

Ala Glu Gly Lys Glu Ile Asp Phe Arg Cys Pro Gln Asp Gln Gly Trp
        260                 265                 270

Asn Ala Glu Ile Thr Leu Gln Met Val Gln Tyr Lys Asn Arg Gln Ala
    275                 280                 285

Ile Leu Ala Val Lys Ser Thr Arg Gln Lys Gln Gln His Leu Val Gln
290                 295                 300

Gln Gln Pro Pro Ser Gln Pro Gln Pro Gln Leu Gln Pro Gln
305                 310                 315                 320

Pro Gln Pro Gln Pro Gln Pro Gln Pro Gln Ser Gln Pro Gln
            325                 330                 335

Pro Gln Pro Gln Pro Lys Pro Gln Pro Gln Leu His Pro Tyr Pro
        340                 345                 350

His Pro His Pro His Pro His Ser His Pro His Ser His Pro His Pro
        355                 360                 365

His Pro His Pro His Pro His Gln Ile Pro His Pro His Pro Gln Pro
370                 375                 380

His Ser Gln Pro His Gly His Arg Leu Leu Arg Ser Thr Ser Asn Ser
385                 390                 395                 400

Ala

<210> SEQ ID NO 29
<211> LENGTH: 382
<212> TYPE: PRT
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 29

Met Gly Ala Phe Leu Asp Lys Pro Lys Met Glu Lys His Asn Ala Gln
1               5                   10                  15

Gly Gln Gly Asn Gly Leu Arg Tyr Gly Leu Ser Ser Met Gln Gly Trp
            20                  25                  30

Arg Val Glu Met Glu Asp Ala His Thr Ala Val Ile Gly Leu Pro Ser
        35                  40                  45

Gly Leu Glu Ser Trp Ser Phe Phe Ala Val Tyr Asp Gly His Ala Gly
    50                  55                  60

Ser Gln Val Ala Lys Tyr Cys Cys Glu His Leu Leu Asp His Ile Thr
65                  70                  75                  80

Asn Asn Gln Asp Phe Lys Gly Ser Ala Gly Ala Pro Ser Val Glu Asn
                85                  90                  95

Val Lys Asn Gly Ile Arg Thr Gly Phe Leu Glu Ile Asp Glu His Met
            100                 105                 110

Arg Val Met Ser Glu Lys Lys His Gly Ala Asp Arg Ser Gly Ser Thr
        115                 120                 125

Ala Val Gly Val Leu Ile Ser Pro Gln His Thr Tyr Phe Ile Asn Cys
    130                 135                 140

Gly Asp Ser Arg Gly Leu Leu Cys Arg Asn Arg Lys Val His Phe Phe
145                 150                 155                 160

Thr Gln Asp His Lys Pro Ser Asn Pro Leu Glu Lys Glu Arg Ile Gln
                165                 170                 175

```
Asn Ala Gly Gly Ser Val Met Ile Gln Arg Val Asn Gly Ser Leu Ala
            180                 185                 190

Val Ser Arg Ala Leu Gly Asp Phe Asp Tyr Lys Cys Val His Gly Lys
        195                 200                 205

Gly Pro Thr Glu Gln Leu Val Ser Pro Glu Pro Glu Val His Asp Ile
    210                 215                 220

Glu Arg Ser Glu Glu Asp Asp Gln Phe Ile Ile Leu Ala Cys Asp Gly
225                 230                 235                 240

Ile Trp Asp Val Met Gly Asn Glu Glu Leu Cys Asp Phe Val Arg Ser
                245                 250                 255

Arg Leu Glu Val Thr Asp Asp Leu Glu Lys Val Cys Asn Glu Val Val
            260                 265                 270

Asp Thr Cys Leu Tyr Lys Gly Ser Arg Asp Asn Met Ser Val Ile Leu
        275                 280                 285

Ile Cys Phe Pro Asn Ala Pro Lys Val Ser Pro Glu Ala Val Lys Lys
    290                 295                 300

Glu Ala Glu Leu Asp Lys Tyr Leu Glu Cys Arg Val Glu Glu Ile Ile
305                 310                 315                 320

Lys Lys Gln Gly Glu Gly Val Pro Asp Leu Val His Val Met Arg Thr
                325                 330                 335

Leu Ala Ser Glu Asn Ile Pro Ser Leu Pro Pro Gly Gly Glu Leu Ala
            340                 345                 350

Ser Lys Arg Asn Val Ile Glu Ala Val Tyr Asn Arg Leu Asn Pro Tyr
        355                 360                 365

Lys Asn Asp Asp Thr Asp Ser Thr Ser Thr Asp Met Trp
    370                 375                 380

<210> SEQ ID NO 30
<211> LENGTH: 114
<212> TYPE: PRT
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 30

Met Ala Glu Cys Pro Thr Leu Gly Glu Ala Val Thr Asp His Pro Asp
1               5                   10                  15

Arg Leu Trp Ala Trp Glu Lys Phe Val Tyr Leu Asp Glu Lys Gln His
            20                  25                  30

Ala Trp Leu Pro Leu Thr Ile Glu Ile Lys Asp Arg Leu Gln Leu Arg
        35                  40                  45

Val Leu Leu Arg Arg Glu Asp Val Val Leu Gly Arg Pro Met Thr Pro
    50                  55                  60

Thr Gln Ile Gly Pro Ser Leu Leu Pro Ile Met Trp Gln Leu Tyr Pro
65                  70                  75                  80

Asp Gly Arg Tyr Arg Ser Ser Asp Ser Ser Phe Trp Arg Leu Val Tyr
                85                  90                  95

His Ile Lys Ile Asp Gly Val Glu Asp Met Leu Leu Glu Leu Leu Pro
            100                 105                 110

Asp Asp

<210> SEQ ID NO 31
<211> LENGTH: 158
<212> TYPE: PRT
<213> ORGANISM: Artificial Sequence
<220> FEATURE:
```

<223> OTHER INFORMATION: A synthetic gene insert was assembled from
      synthetic oligonucleotides and/or PCR products.

<400> SEQUENCE: 31

Met Ser Gly Ile Ala Leu Ser Arg Leu Ala Gln Glu Arg Lys Ala Trp
1               5                   10                  15

Arg Lys Asp His Pro Phe Gly Phe Val Ala Val Pro Thr Lys Asn Pro
                20                  25                  30

Asp Gly Thr Met Asn Leu Met Asn Trp Glu Cys Ala Ile Pro Gly Lys
            35                  40                  45

Lys Gly Thr Pro Trp Glu Gly Gly Leu Phe Lys Leu Arg Met Leu Phe
        50                  55                  60

Lys Asp Asp Tyr Pro Ser Ser Pro Pro Lys Cys Lys Phe Glu Pro Pro
65                  70                  75                  80

Leu Phe His Pro Asn Val Tyr Pro Ser Gly Thr Val Cys Leu Ser Ile
                85                  90                  95

Leu Glu Glu Asp Lys Asp Trp Arg Pro Ala Ile Thr Ile Lys Gln Ile
                100                 105                 110

Leu Leu Gly Ile Gln Glu Leu Leu Asn Glu Pro Asn Ile Gln Asp Pro
            115                 120                 125

Ala Gln Ala Glu Ala Tyr Thr Ile Tyr Cys Gln Asn Arg Val Glu Tyr
        130                 135                 140

Glu Lys Arg Val Arg Ala Gln Ala Lys Lys Phe Ala Pro Ser
145                 150                 155

<210> SEQ ID NO 32
<211> LENGTH: 528
<212> TYPE: PRT
<213> ORGANISM: Artificial Sequence
<220> FEATURE:
<223> OTHER INFORMATION: A synthetic gene insert was assembled from
      synthetic oligonucleotides and/or PCR products.

<400> SEQUENCE: 32

Met Gly Asp Ala Pro Ser Pro Glu Glu Lys Leu His Leu Ile Thr Arg
1               5                   10                  15

Asn Leu Gln Glu Val Leu Gly Glu Lys Leu Lys Glu Ile Leu Lys
                20                  25                  30

Glu Arg Glu Leu Lys Ile Tyr Trp Gly Thr Ala Thr Thr Gly Lys Pro
            35                  40                  45

His Val Ala Tyr Phe Val Pro Met Ser Lys Ile Ala Asp Phe Leu Lys
        50                  55                  60

Ala Gly Cys Glu Val Thr Ile Leu Phe Ala Asp Leu His Ala Tyr Leu
65                  70                  75                  80

Asp Asn Met Lys Ala Pro Trp Glu Leu Leu Glu Leu Arg Val Ser Tyr
                85                  90                  95

Tyr Glu Asn Val Ile Lys Ala Met Leu Glu Ser Ile Gly Val Pro Leu
                100                 105                 110

Glu Lys Leu Lys Phe Ile Lys Gly Thr Asp Tyr Gln Leu Ser Lys Glu
            115                 120                 125

Tyr Thr Leu Asp Val Tyr Arg Leu Ser Ser Val Val Thr Gln His Asp
        130                 135                 140

Ser Lys Lys Ala Gly Ala Glu Val Val Lys Gln Val Glu His Pro Leu
145                 150                 155                 160

Leu Ser Gly Leu Leu Tyr Pro Gly Leu Gln Ala Leu Asp Glu Glu Tyr
                165                 170                 175

```
Leu Lys Val Asp Ala Gln Phe Gly Gly Ile Asp Gln Arg Lys Ile Phe
            180             185             190

Thr Phe Ala Glu Lys Tyr Leu Pro Ala Leu Gly Tyr Ser Lys Arg Val
        195             200             205

His Leu Met Asn Pro Met Val Pro Gly Leu Thr Gly Ser Lys Met Ser
        210             215             220

Ser Ser Glu Glu Glu Ser Lys Ile Asp Leu Leu Asp Arg Lys Glu Asp
225             230             235             240

Val Lys Lys Lys Leu Lys Lys Ala Phe Cys Glu Pro Gly Asn Val Glu
                245             250             255

Asn Asn Gly Val Leu Ser Phe Ile Lys His Val Leu Phe Pro Leu Lys
            260             265             270

Ser Glu Phe Val Ile Leu Arg Asp Glu Lys Trp Gly Gly Asn Lys Thr
            275             280             285

Tyr Thr Ala Tyr Val Asp Leu Glu Lys Asp Phe Ala Ala Glu Val Val
        290             295             300

His Pro Gly Asp Leu Lys Asn Ser Val Glu Val Ala Leu Asn Lys Leu
305             310             315             320

Leu Asp Pro Ile Arg Glu Lys Phe Asn Thr Pro Ala Leu Lys Lys Leu
                325             330             335

Ala Ser Ala Ala Tyr Pro Asp Pro Ser Lys Gln Lys Pro Met Ala Lys
            340             345             350

Gly Pro Ala Lys Asn Ser Glu Pro Glu Val Ile Pro Ser Arg Leu
            355             360             365

Asp Ile Arg Val Gly Lys Ile Ile Thr Val Glu Lys His Pro Asp Ala
    370             375             380

Asp Ser Leu Tyr Val Glu Lys Ile Asp Val Gly Glu Ala Glu Pro Arg
385             390             395             400

Thr Val Val Ser Gly Leu Val Gln Phe Val Pro Lys Glu Glu Leu Gln
            405             410             415

Asp Arg Leu Val Val Val Leu Cys Asn Leu Lys Pro Gln Lys Met Arg
            420             425             430

Gly Val Glu Ser Gln Gly Met Leu Leu Cys Ala Ser Ile Glu Gly Ile
            435             440             445

Asn Arg Gln Val Glu Pro Leu Asp Pro Pro Ala Gly Ser Ala Pro Gly
    450             455             460

Glu His Val Phe Val Lys Gly Tyr Glu Lys Gly Gln Pro Asp Glu Glu
465             470             475             480

Leu Lys Pro Lys Lys Lys Val Phe Glu Lys Leu Gln Ala Asp Phe Lys
            485             490             495

Ile Ser Glu Glu Cys Ile Ala Gln Trp Lys Gln Thr Asn Phe Met Thr
            500             505             510

Lys Leu Gly Ser Ile Ser Cys Lys Ser Leu Lys Gly Gly Asn Ile Ser
            515             520             525
```

IDENTIFICATION OF HEALTH STATUS IN THE ELDERLY USING IMMUNOLOGICAL BIOMARKERS

CROSS REFERENCE TO RELATED APPLICATIONS

This application is a U.S. National Phase Application under 35 U.S.C. 371 of International Application No. PCT/SG2020/050540 filed on Sep. 23, 2020, which claims the benefit of priority from Singapore Patent Application No. 10201908922U, filed Sep. 25, 2019. The entire disclosures of both of the above applications are incorporated herein by reference.

FIELD OF INVENTION

The invention relates to the detection of immunological biomarkers, particularly autoantibodies, to determine the health status and/or aging trajectory in the elderly.

BACKGROUND

Despite technological advances in the area of proteomics research, there are only a handful of biomarkers that have entered the clinic, and 90% of the biomarkers are protein biomarkers [1]. Autoantibody biomarkers as described herein are autoantibodies to antigens, autoantibodies being antibodies which are produced by an individual which are directed against one or more of the individual's own proteins ('self' antigens). Some of the main reasons for failure of biomarkers [2] to make it into clinical practice are:
1) Low sensitivity and specificity
2) Low prognostic/predictive value
3) Not important for clinical decision making
4) Original claims fail validation (false discoveries)

The management of care of elderly individuals depends less on age than on the effect of their comorbidity history (past and present) on their current health status [3]. These comorbidities impose a certain stress on the immune system which has been challenged over the years to deal with infections, cancer or chronic inflammatory diseases [4].

An aim of the invention is therefore to provide an improved panel of autoantibody biomarkers for assessing the health status of elderly individuals.

SUMMARY OF INVENTION

In one aspect of the invention, there is provided a method for determining the health of an individual from a sample extracted from that individual, comprising the steps of:
(i) testing the sample for the presence of biomarkers specific for health;
(ii) determining whether the subject is healthy, is of intermediate health, or is unhealthy, based on the detection of said biomarkers;
characterised in that the biomarkers are autoantibodies to antigens comprising AURKA, FEN1, GLRX3, PHLDA1, PPM1A, FKBP3, CD96 and MAPK13.

In one embodiment the individual is elderly, typically at least 60 years old.

Advantageously the autoantibody biomarkers can be used in the characterization (or diagnosis) of the health status of an elderly individual (Healthy, Intermediate and Unhealthy) by measuring the distribution of plasma-antibody levels. Furthermore a subset of these autoantibody biomarkers, particularly those associated with Healthy and Intermediate, may have a protective role against non-communicable disease.

In one embodiment the sample is tested using a panel of antigens that correspond to the autoantibody biomarkers. Typically, the antigens are biotinylated proteins. Advantageously the biotinylation ensures that the antigens are folded in their correct form to ensure accuracy of detection by the autoantibody biomarkers.

In one embodiment the antigens may include one or more from the group comprising of UBE2I, AAK1, YARS, ASPSCR1, CASP10, FHOD2, TCL1A and MAP4.

It should be noted that not all antigens generate an autoantibody response and it is not possible to predict a priori which antigens will do so in a given cohort—of more than 1500 antigens tested, only autoantibodies against the 16 antigens described above are suitable as biomarkers to identify health and aging status.

In one embodiment each biotinylated protein is formed from a Biotin Carboxyl Carrier Protein (BCCP) folding marker which is fused in-frame with the protein.

In a further embodiment the biotinylated proteins are bound to a streptavidin-coated substrate.

Advantageously full-length proteins are expressed as fusions to the BCCP folding marker which itself becomes biotinylated in vivo when the fusion partner is correctly folded. By comparison misfolded fusion partners cause the BCCP to remain in the 'apo' (i.e. non-biotinylated) form such that it cannot attach to a streptavidin substrate. Thus, only correctly folded fusion proteins become attached to the streptavidin substrate via the biotin moiety appended to the BCCP tag.

In one embodiment the substrate comprises a glass slide, biochip, strip, slide, bead, microtitre plate well, surface plasmon resonance support, microfluidic device, thin film polymer base layer, hydrogel-forming polymer base layer, or any other device or technology suitable for detection of antibody-antigen binding.

In one embodiment the substrate is exposed to a sample extracted from a person, such that autoantibody biomarkers from the sample may bind to the antigens.

Typically, the sample comprises any or any combination of exosomes, blood, serum, plasma, urine, saliva, amniotic fluid, cerebrospinal fluid, breast milk, semen or bile.

In one embodiment following exposure to the sample, the substrate is exposed to a fluorescently-tagged secondary antibody to allow the amount of any autoantibodies from the sample bound to the antigens on the panel to be determined. Typically, the secondary antibody is anti-human IgG, but it will be appreciated that other secondary antibodies could be used, such as anti-IgM, anti-IgG1, anti-IgG2, anti-IgG3, anti-IgG4 or anti-IgA.

In one embodiment the healthiness of the individual corresponds to the relative or absolute amount of autoantibodies from the sample specifically binding to the antigens.

In one embodiment the method is performed in vitro.

In one embodiment the method comprises detecting upregulation/downregulation of one or more biomarkers.

In a further aspect of the invention, there is provided a method for manufacturing a kit for determining the health of an elderly individual from a sample extracted from that individual, comprising the steps of:
for each antigen in a panel, cloning a biotin carboxyl carrier protein folding marker in-frame with a gene encoding the said antigen and expressing the resulting biotinylated antigen;

binding the biotinylated antigens to addressable locations on one or more streptavidin-coated substrates, thereby forming an antigen array;

such that the amount of autoantibodies from the sample binding to the antigens on the panel can be determined by exposing the substrate to the sample and measuring the response;

characterised in that the antigens comprise AURKA, FEN1, GLRX3, PHLDA1, PPM1A, FKBP3, CD96 and MAPK13.

In one embodiment the antigens may include one or more from the group comprising of UBE2I, AAK1, YARS, ASPSCR1, CASP10, FHOD2, TCL1A and MAP4.

In a further aspect of the invention there is provided a method for determining the health of an elderly individual by exposing a composition comprising a panel of antigens as herein described to a sample extracted from that individual, and determining the level of autoantibodies from the sample binding to the antigens.

In a yet further aspect of the invention there is provided a method for determining the health of an elderly individual by exposing a composition comprising a panel of antigens as herein described to a sample extracted from that individual in vitro, and determining the level of autoantibodies from the sample binding to the antigens.

In further aspect of the invention, there is provided a composition comprising a panel of antigens for determining the health of an elderly individual, characterised in that the antigens comprise AURKA, FEN1, GLRX3, PHLDA1, PPM1A, FKBP3, CD96 and MAPK13.

In one embodiment the antigens may include one or more from the group comprising of UBE2I, AAK1, YARS, ASPSCR1, CASP10, FHOD2, TCL1A and MAP4.

In one embodiment the antigens are biotinylated proteins

In one embodiment the amount of one or more autoantibody biomarkers binding in vitro to the antigens in a sample from a patient can be measured to determine the health status of the patient.

In yet further aspect of the invention, there is provided a composition comprising a panel of autoantibody biomarkers for determining the health status of an elderly patient;

wherein the level of one or more autoantibody biomarkers are measured in a sample from the patient;

characterised in that the one or more autoantibody biomarkers are selected from autoantibodies specific for one or more of the following antigens: AURKA, FEN1, GLRX3, PHLDA1, PPM1A, FKBP3, CD96 and MAPK13.

BRIEF DESCRIPTION OF DRAWINGS

It will be convenient to further describe the present invention with respect to the accompanying drawings that illustrate possible arrangements of the invention. Other arrangements of the invention are possible, and consequently the particularity of the accompanying drawings is not to be understood as superseding the generality of the preceding description of the invention.

DETAILED DESCRIPTION

Materials and Methods

Figure 2:
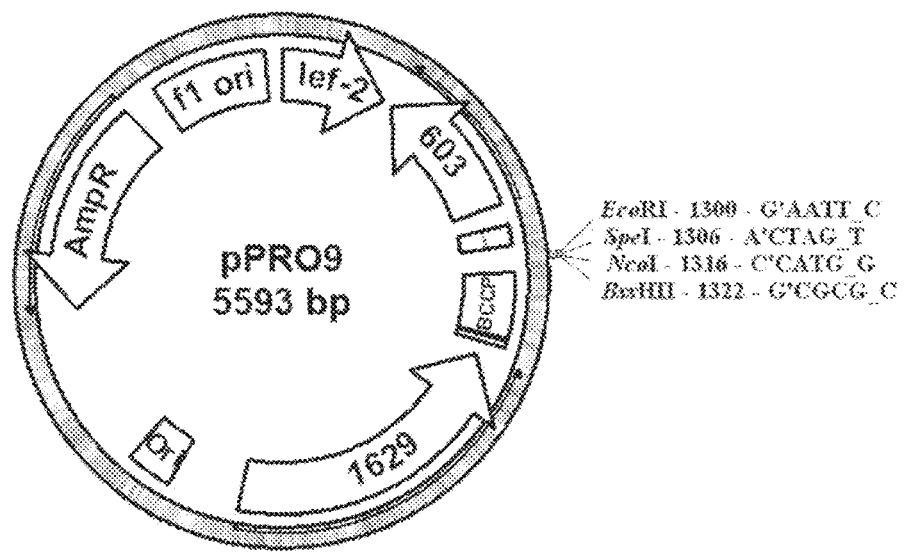
FIG. 2 illustrates the pPRO9 plasmid used as a vector.

Gene synthesis and cloning. The pPRO9 plasmid (see FIG. 2 below) was constructed by standard techniques and consists of a c-myc tag and BCCP protein domain, preceded by a multi-cloning site. A synthetic gene insert was assembled from synthetic oligonucleotides and/or PCR products. The fragment was cloned into pPRO9 using SpeI and NcoI cloning sites. The plasmid DNA was purified from transformed bacteria and concentration determined by UV spectroscopy. The final construct was verified by sequencing. The sequence congruence within the used restriction sites was 100%. 5 µg of the plasmid preparation was lyophilized for storage.

The recombinant baculoviruses are generated via cotransfection of a bacmid carrying the strong viral polyhedrin promoter together with a transfer vector carrying the coding sequences of protein of interest, into the Sf9 cell line which is a clonal isolate derived from the parental *Spodoptera frugiperda* cell line IPLB-Sf-21-AE. Homologous recombination initiated by the viral system causes the transfected cells to show signs of viral cytopathic effect (CPE) within few days of culture incubation. The most common CPE observed was the significantly enlargement of average cell size, a consequences of viral progeny propagation. These baculoviruses known as P0 were then released into the culture medium, and viral amplification were done to generate a higher titre of P1 viruses.

Protein Expression. Expressions were carried out in 24 well blocks using 3 ml cultures containing $6 \times 10^6$ Sf9 cells per well. High titre, low passage, viral stocks of recombinant baculovirus ($>10^7$ pfu/ml) were used to infect sf9 insect cells. The infected cells were then cultured for 72 hours to allow them to produce the recombinant protein of interest. The cells were washed with PBS, resuspended in buffer, and were frozen in aliquots at −80° C. ready for lysis as required. Depending on the transfer vector construct and the nature of the protein itself, recombinant protein lysate can be pelleted either from the cultured cell or the cultured medium. Positive recombinant proteins were then analyzed via SDS-PAGE and Western blot against Streptavidin-HRP antibody. In total, 1557 human antigens were cloned and expressed using this methodology.

Array fabrication. HS (hydrogel-streptavidin) slides were purchased from Schott and used to print the biotinylated proteins. A total of 9 nanoliters of crude protein lysate was printed on a HS slide in quadruplicate using non-contact piezo printing technology. Print buffer that have a pH between 7.0 and 7.5 were used. The slides were dried by centrifugation (200×g for 5 min) before starting the washing and blocking. The printed arrays were blocked with solutions containing BSA or casein (concentration: 0.1 mg/ml) in a phosphate buffer. The pH was adjusted to be between 7.0 and 7.5 and cold solutions were used (4° C.-20° C.). Slides were not allowed to dry between washes and were protected from light. In total, each resultant 'Immunome array' comprised 1557 antigens, each printed in quadruplicate.

Experimental Procedure. Each critical experimental step of running the Immunome array required a second trained person to thoroughly check, precisely record and cross-check all steps in the protocol, in order to reduce operator bias. Samples were picked, randomised and assigned to assay racks accordingly. These samples were then stored at −20° C. until the experimental setup was complete.

1. Study Cohort

The study cohort was divided into 2 age groups: young control individuals (YC) and the elderly individuals. The YC group (n=60) composed of male (n=34) and female (n=26) individuals of Chinese ethnicity from 18 to 27 years of age. They are clinically healthy with no reported comorbidities nor active medical treatments. The selection of elderly individuals was performed within elderly individuals of Chinese ethnicity of 60 years of age and beyond. This initial selection increases the analytical power and outcome of this study by removing an ethnicity bias.

Figure 5A:
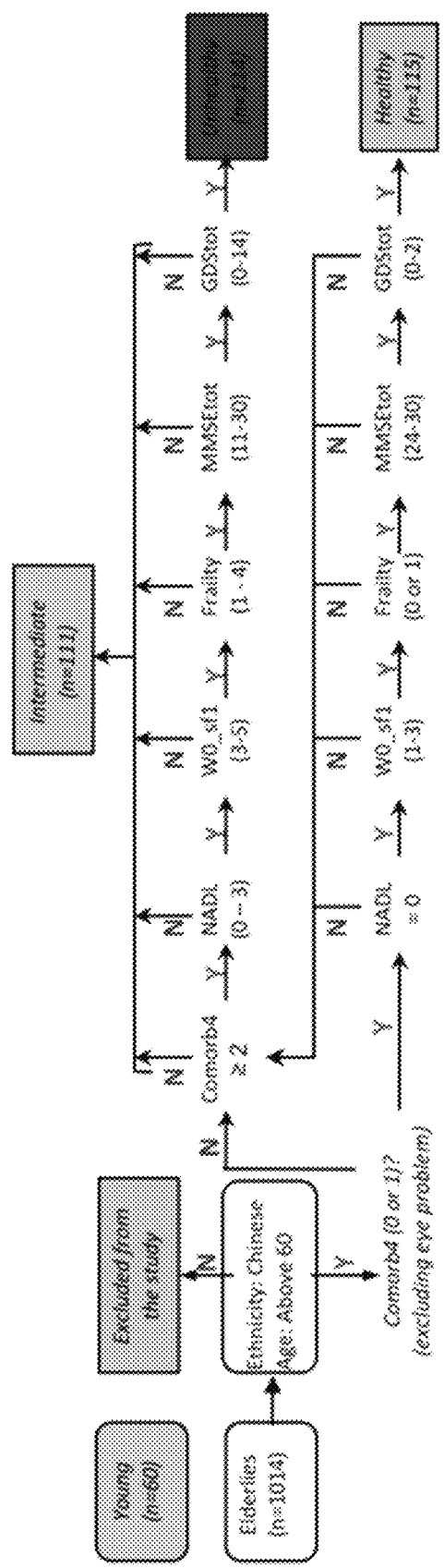
FIG. 5 illustrates the cohort selection: (A) Schematic describing the workflow used to select and categorize elderly individuals in the study; (B) Distribution of elderly and young individuals according to age and gender; Statistical analysis performed with Kruskal-Wallis test with Dunn's correction; (C) Range of clinical variables used for the categorization of elderly individuals; (D) Characteristic of elderly individuals selected in the study for the 6 determining clinical parameters.

Further selection of elderly individuals into health classes (Healthy, Intermediate and Unhealthy) was based on the combination of 6 clinical parameters (FIG. 5A):

Commorb5: Variable reflecting the total number of comorbidities excluding eye problems NADL: Total number of disabilities affecting Activities of Daily Living of the elderly individual [7]

Wo_sf1: Parameter measuring the general quality of life.

Frailty: A clinical syndrome where the elderly individual is progressively highly vulnerable to internal and external stressors. It is a multidimensional variable taking into account the physical strength and cognitive abilities [8]

MMSEtot: Total score of the Mini-Mental State Examination. This is indicative of the cognitive capabilities of the elderly individual [9].

GDStot: Total score of the Geriatric Depression Scale. This is a self-reported assessment used to identify the depression in the elderly [10].

The characterization of the health status of the elderly individuals takes into accounts the 6 parameters previously described and resulted in the selection of the following groups (FIG. 5A):

115 Healthy elderlies,
111 elderlies with Intermediate health status,
114 Unhealthy elderlies.

Figure 5C:
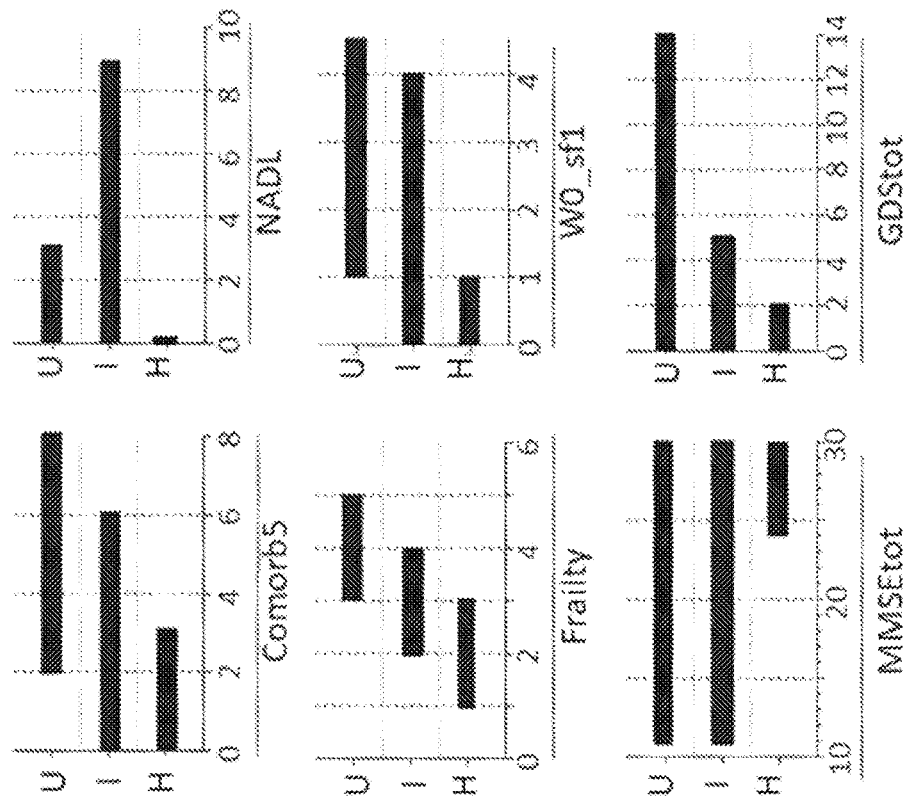
Figure 5B:
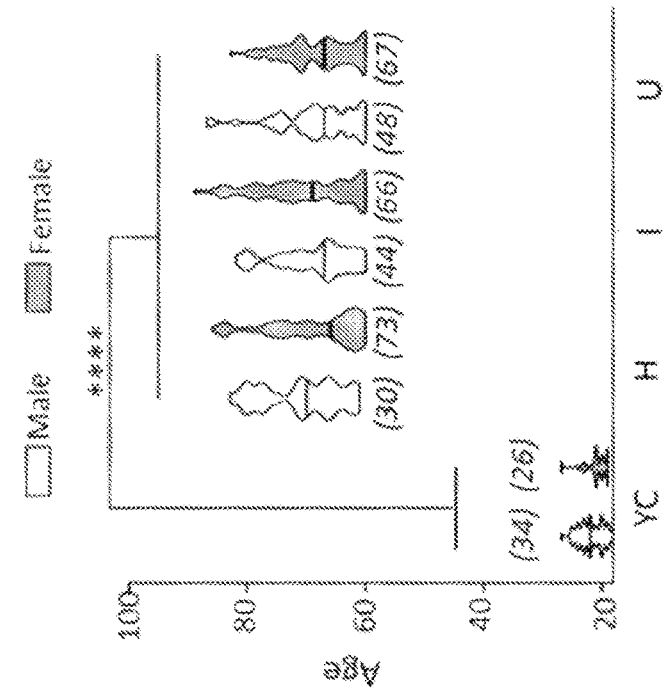

There are no significant variations of age between the health groups although a gender difference can be observed as more females are present in each health group (FIG. 5B, FIG. 5D). In FIG. 5D, bold numbers determine the grade of the individuals for the specific category and score. Numbers between brackets correspond to number of individuals with specific traits. ND: Not determined. Ave: Average age of all elderly individuals for each health groups [6].

Overall the repartition of the individuals showed that unhealthy elderly individuals present an accumulation of comorbidities, an increased frailty status and cognitive decline associated with higher depressive status and an increased quality of life (FIG. 5C, FIG. 5D).

2. Serum/Plasma Dilution

Samples were then placed in a shaking incubator set at +20° C. to allow thawing for 30 minutes. When completely thawed, each sample was vortexed vigorously three times at full speed and spun down for 3 minutes at 13,000 g using a microcentrifuge. 22.5 µL of the sample was pipetted into 4.5 mL of Serum Assay Buffer (SAB) containing 0.1% v/v Triton, 0.1% w/v BSA, 10% v/v PBS (20° C.) and vortexed to mix three times. The tube was tilted during aspiration to ensure that the sera was sampled from below the lipid layer at the top but does not touch the bottom of the tube in case of presence of any sediment. This Serum/Plasma dilution process was carried out in a class II Biological Safety Cabinet. Batch records were marked accordingly to ensure that the correct samples were added to the correct tubes.

3. Biomarker Assay

The array was removed from the storage buffer using forceps, placed in the slide box and rack containing 200 mL of cold SAB (4° C.) and shaken on shaker at 50 rpm, for 5 minutes. When the slides have completed washing, the slide was placed, array side up, in a slide hybridization chamber with individual sera which had been diluted earlier. All slides were scanned using the barcode scanner into the relevant batch record and incubated in a refrigerated shaker at 50 rpm for 2 hours at 20° C.

4. Array Washing after Serum Binding

The protein array slide was then rinsed twice in individual "Pap jars" with 30 mL SAB, followed by 200 mL of SAB buffer in the slide staining box for 20 minutes on the shaker at 50 rpm at room temperature. All slides were transferred sequentially and in the same orientation.

5. Incubation with Cy3-Anti IgG

Binding of autoantibodies to the arrayed antigens on replica Immunome arrays was detected by incubation with Cy3-rabbit anti-human IgG. Arrays were immersed in hybridization solution containing a mixture of Cy3-rabbit anti-human IgG solution diluted 1000-fold in SAB buffer for 2 hours at 50 rpm in 20° C.

6. Washing after Incubation with Cy3-Anti IgG

After incubation, the slide was dipped in 200 mL of SAB buffer, 3 times for 5 minutes at 50 rpm at room temperature. Excess buffer was removed by immersing the slide in 200 mL of pure water for a few minutes. Slides were then dried for 2 min at 240 g at room temperature. Slides were then stored at room temperature until scanning (preferably the same day). Hybridization signals were measured with a microarray laser scanner (Agilent Scanner) at 10 µm resolution. Fluorescence intensities were detected according to the manufacturer's instructions, whereby each spot is plotted using Agilent Feature Extraction software.

Spot segmentation Semi-automatic QC process was carried out in order to produce a viable result. The output from the microarray scanner is a raw .tiff format image file. Extraction and quantification of each spot on the array were performed using the GenePix Pro 7 software (Molecular Devices). A GAL (GenePix Array List) file for the array was generated to aid with image analysis. GenePix Pro 7 allows for automatic spot gridding and alignment of each spot on the array for data extraction. Following data extraction, a GenePix Results (.GPR) file was generated for each slide which contains numerical information for each spot; Protein ID, protein name, foreground intensities, background intensities etc.

Bioinformatics Analysis.

1. Image Analysis: Raw Data Extraction

The aim of an image analysis is to evaluate the amount of autoantibody present in the serum sample by measuring the median intensities of all the pixels within each probed spot. A raw .tiff format image file is generated for each slide, i.e. each sample. Automatic extraction and quantification of each spot on the array are performed using the GenePix Pro 7 software (Molecular Devices) which outputs the statistics for each probed spot on the array. This includes the mean and median of the pixel intensities within a spot along with its local background. A GAL (GenePix Array List) file for the array is generated to aid with image analysis. This file contains the information of all probed spots and their positions on the array. Following data extraction, a GenePix Results (.GPR) file is generated for each slide which contains the information for each spot; Protein ID, protein name, foreground intensities, background intensities etc. In the data sheet generated from the experiment, both foreground and background intensities of each spot are represented in relative fluorescence units (RFUs).

2. Data Handling and Pre-Processing

For each slide, proteins and control probes are spotted in quadruplicate—4 arrays on each slide. The following steps were performed to verify the quality of the protein array data before proceeding with data analysis:

Step 1:

Calculate net intensities for each spot by subtracting background signal intensities from the foreground signal intensities of each spot. For each spot, the background signal intensity was calculated using a circular region with three times the diameter of the spot, centered on the spot.

Step 2:

Remove replica spots with RFU ≤0.

Step 3:

No saturated pixels should be visible within the spots across array which may exceed scanner's reading capacity (maximum RFU for our scanner is 65536 RFU). Therefore, spot/s that show saturation in >20% of the pixels were removed if it occurs in ≤2 replica/s. If saturated spots occur in 3 or more replicas of that protein or probe, these proteins/probes will be flagged as "SAT" and excluded from the downstream analyses.

Step 4:

Zero net intensities if only 1 replica spot remaining.

Step 5:

Calculating percentage of coefficient of variant (CV %) of to determine the variations between the replica spots on each slide.

$$CV\ \% = \frac{S.D.}{Mean} \times 100\% \qquad \text{Equation 1}$$

Flag a set of replica spots with only 2 or less replica/s remaining and CV % >20% as "High CV". The mean RFU of these replica spots (i.e. proteins) will be excluded from the downstream analysis.

For proteins/controls with a CV % >20% and with 3 or more replica spots remaining, the replica spots which result in this high CV % value were filtered out. This was done by calculating the standard deviation between the median value of the net intensities and individual net intensities for each set of replica spots. The spot with the highest standard deviation was removed. CV % values were re-calculated and the process repeated.

Step 6:

Calculating the mean of the net intensities for the remaining replica spots.

Step 7:

Composite normalisation of data using both quantile-based and total intensity-based modules. This method assumes that different samples share a common underlying distribution of their control probes while considering the potential existence of flagged spots within them. The Immunome array uses Cy3-labelled biotinylated BSA (Cy3-BSA) replicates as the positive control spots across slides. Hence it is considered as a housekeeping probe for normalisation of signal intensities for any given study.

The quantile module adopts the algorithm described by Bolstad et al., 2003 [11]. This reorganisation enables the detection and handling of outliers or flagged spots in any of the Cy3BSA control probes. A total intensity-based module was then implemented to obtain a scaling factor for each sample. This method assumes that post-normalisation, the positive controls should have a common total intensity value across all samples. This composite method aims to normalise the protein array data from variations in their measurements whilst preserving the targeted biological activity across samples. The steps are as follows:

Quantile-Based Normalisation of all cy3BSA Across all Samples (i=spot number and j=sample number)

1. Load all Cy3-BSA across all samples, j, into an i×j matrix X
2. Sort spot intensities in each column j of X to get $X_{sort}$
3. Take the mean across each row i of $X_{sort}$ to get $\langle X_i \rangle$ Intensity-Based Normalisation 1. Calculate sum of the mean across each row i, $\Sigma \langle Xi \rangle$
2. For each sample, k, calculate the sum of all Cy3-BSA controls, $\Sigma Xk$
3. For each sample, k, $$\text{Scaling factor } (k) = \frac{\sum \langle Xi \rangle}{\sum Xk} \qquad \text{Equation 2}$$

Data Analysis

The fluorescence signals from the 1557 autoantibody measurements were logarithmically transformed to ensure normality prior to any parametric analysis. One way ANOVA was carried on each of the 1557 autoantibody measurements against i) between all groups (healthy elderlies, elderlies with intermediate health status, unhealthy elderlies and the young controls) and ii) between the elderlies (healthy, intermediate and unhealthy) to identify autoantibodies which were significantly different in at least one of the groups compared to the rest (Table 1). An initial P-value threshold of 0.05 was used to indicate significance. Autoantibody biomarkers towards 16 antigens were identified in this manner: YARS [12], UBE2I [13], TCL1A [14], PPM1A [15], PHLDA1 [16], GLRX3 [17], FHOD2 [18], FEN1 [19], CASP10 [20], MAPK13 [21], MAP4 [22], FKBP3 [23], CD96 [24], AURKA [25], ASP-SCR1 [26] and AAK [27], shown in FIG. 3. Amongst these 16 antigens, AURKA, FEN1, GLRX3, PHLDA1, PPM1A, FKBP3, CD96 and MAPK13 were found to have P-values of <0.02 in both analyses (between all groups and between elderlies).

TABLE 1

| | P-Values | |
|---|---|---|
| Biomarker | between all groups | between elderlies |
| AURKA | 0.000912 | 1.41E–03 |
| FEN1 | 0.00772 | 0.00592 |
| GLRX3 | 0.00289 | 0.00633 |
| PHLDA1 | 0.00476 | 0.00799 |
| PPM1A | 7.61E–05 | 0.0108 |
| FKBP3 | 0.00504 | 0.0114 |

TABLE 1-continued

| Biomarker | P-Values | |
| --- | --- | --- |
| | between all groups | between elderlies |
| CD96 | 0.00593 | 0.0116 |
| MAPK13 | 0.0191 | 0.0165 |
| MAP4 | 0.0376 | 0.0172 |
| TCL1A | 0.000814 | 0.0211 |
| FHOD2 | 1.05E−04 | 0.0212 |
| CASP10 | 5.91E−05 | 0.023 |
| ASPSCR1 | 0.0317 | 0.0281 |
| YARS | 0.0761 | 0.045 |
| AAK1 | 0.0126 | 0.0453 |
| UBE2I | 0.0036 | 0.0496 |

Pathway enrichment analysis showed that 4 of the 16 (PHLDA1, AURKA, FEN1 and UBE2I) are involved in Cell Cycle and DNA repair pathways which are altered in the aging process.

Figure 4B:
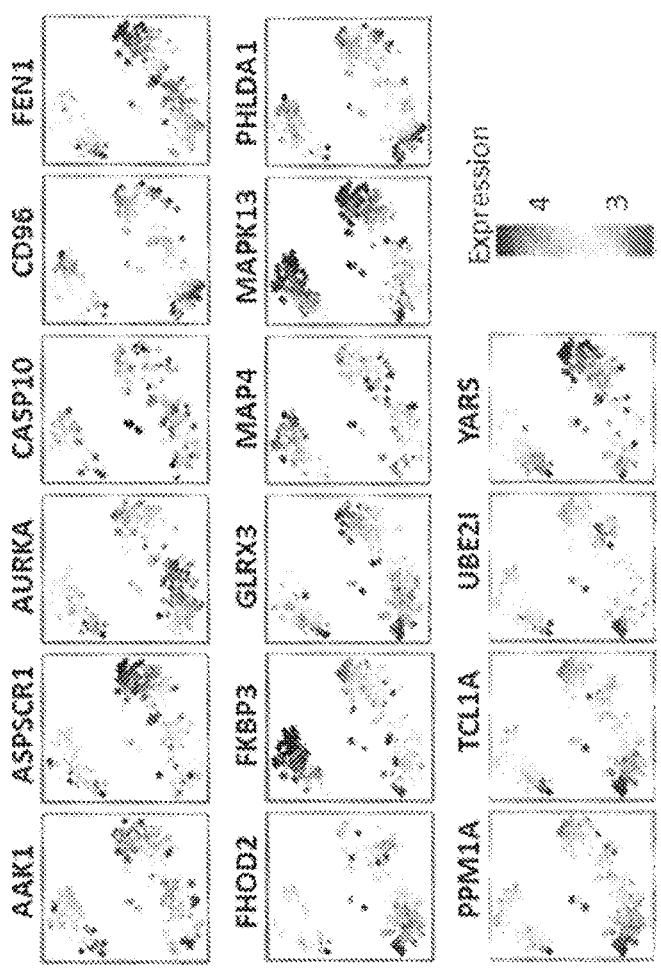
FIG. 4 illustrates a clustering analysis: (A) Representation of clusters defined within the elderlies by the 16 antigens by tSNE clustering analysis [5]; (B) Expression density of antibodies for each target protein; (C) Autoantibodies specific to each of the health status groups.
Figure 4A:
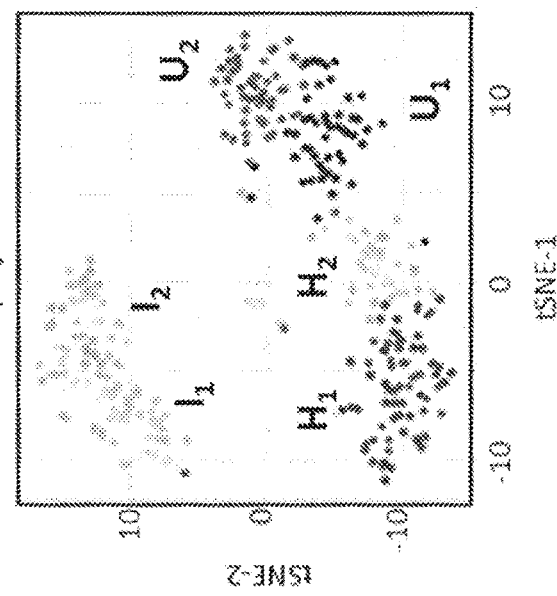

Given that each of the 16 individual autoantibodies are weak predictors of the health status on their own, dimension reduction using tSNE was carried out to identify the collective capabilities of the 16 autoantibodies to differentiate the health groups. As seen in the FIG. 4A, dimension reduction using tSNE show that the 2 tSNE dimensions were able to differentiate the 3 health groups. The specificity of the 16 autoantibodies is shown in FIG. 4B.

To identify autoantibodies specific to each of the health status, a series of t-tests with Welch correction was used to test each of the health status against the rest for all 16 identified autoantibodies. For each of the autoantibodies, the best t-test result amongst the three health statuses were selected as the autoantibody of choice for that health status.

Figure 1:
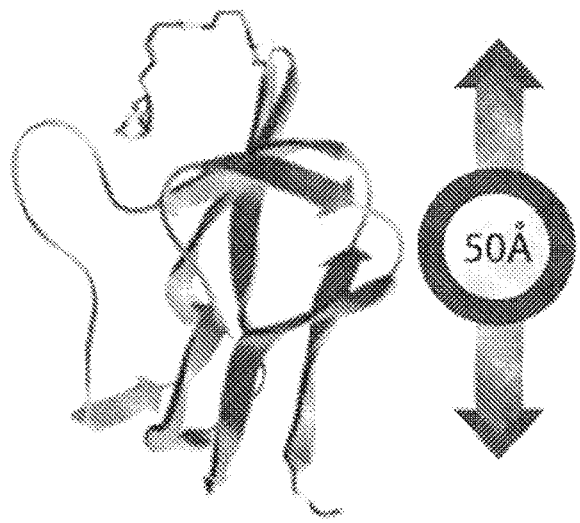
FIG. 1 illustrates the structure of the *E. coli* Biotin Carboxyl Carrier Protein domain.
Figure 4C:
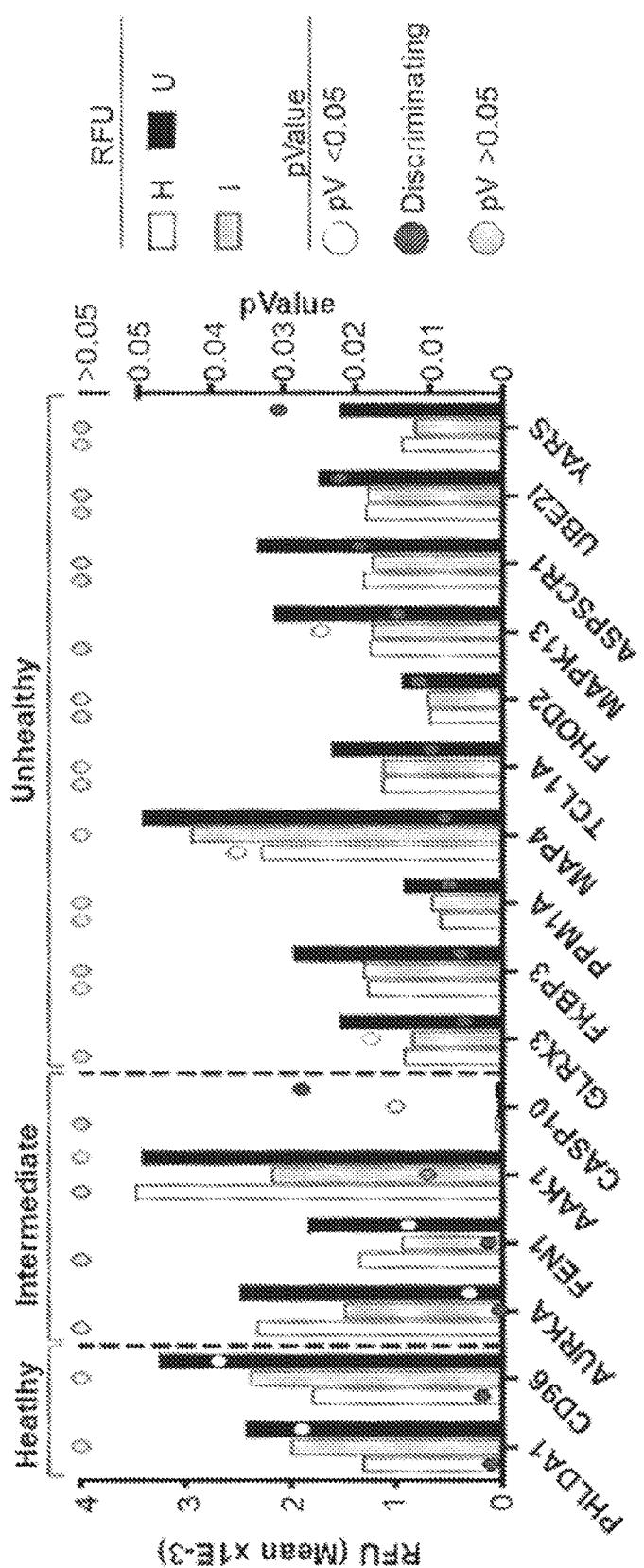

This identified PHLDA1 and CD96 as being specific for the healthy group, AURKA, FEN1, CASP10 and AAK1 as being specific for the intermediate group and the rest as being specific for the unhealthy group (FIG. 4C). The healthy and intermediate autoantibodies may have a protective role against non-communicable disease. The mean RFU is shown for each of the health status groups together with the P-values of the t-tests demonstrating the significance of the autoantibody in discriminating the health status group of interest against the rest The invention utilises the Biotin Carboxyl Carrier Protein (BCCP) folding marker which is cloned in-frame with the gene encoding the protein of interest, as described above and in EP1470229. The structure of the E. coli BCCP domain is illustrated in FIG. 1, wherein residues 77-156 are drawn (coordinate file 1bdo) showing the N- and C-termini and the single biotin moiety that is attached to lysine 122 in vivo by biotin ligase.

BCCP acts not only as a protein folding marker but also as a protein solubility enhancer. BCCP can be fused to either the N- or C-terminal of a protein of interest. Full-length proteins are expressed as fusions to the BCCP folding marker which becomes biotinylated in vivo, but only when the protein is correctly folded. Conversely, misfolded proteins drive the misfolding of BCCP such that it is unable to become biotinylated by host biotin ligases. Hence, misfolded proteins are unable to specifically attach to a streptavidin-coated solid support. Therefore, only correctly folded proteins become attached to a solid support via the BCCP tag.

The surface chemistry of the support is designed carefully and may use a three-dimensional thin film polymer base layer (polyethylene glycol; PEG), which retains protein spot morphologies and ensures consistent spot sizes across the array. The PEG layer inhibits non-specific binding, therefore reducing the high background observed using other platforms. The solid support used to immobilize the selected biomarkers is thus designed to resist non-specific macromolecule adsorption and give excellent signal-to-noise ratios and low limits of detection (i.e. improved sensitivity) by minimising non-specific background binding. In addition, the PEG layer also preserves the folded structure and functionality of arrayed proteins and protein complexes post-immobilisation. This is critical for the accurate diagnosis because human serum antibodies are known in general to bind non-specifically to exposed hydrophobic surfaces on unfolded proteins, thus giving rise to false positives in serological assays on arrays of unfolded proteins, moreover, human autoantibodies typically bind to discontinuous epitopes, so serological assays on arrays of unfolded proteins or mis-folded proteins will also give rise to false negatives in autoantibody binding assays.

As biotinylated proteins bound to a streptavidin-coated surface show negligible dissociation, this interaction therefore provides a superior means for tethering proteins to a planar surface and is ideal for applications such as protein arrays, SPR and bead-based assays. The use of a compact, folded, biotinylated, 80 residue domain BCCP affords two significant advantages over for example the AviTag and intein-based tag. First, the BCCP domain is cross-recognised by eukaryotic biotin ligases enabling it to be biotinylated efficiently in yeast, insect, and mammalian cells without the need to co-express the E. coli biotin ligase. Second, the N- and C-termini of BCCP are physically separated from the site of biotinylation by 50 Å (as shown in FIG. 1), so the BCCP domain can be thought of as a stalk which presents the recombinant proteins away from the solid support surface, thus minimising any deleterious effects due to immobilisation.

The success rate of BCCP folding marker mediated expression of even the most complex proteins is in excess of 98%. The technology can therefore be applied in a highly parallelised pipeline resulting in high-throughput, highly consistent production of functionally validated proteins.

The addition of BCCP permits the monitoring of fusion protein folding by measuring the extent of in vivo biotinylation. This can be measured by standard blotting procedures, using SDS-PAGE or in situ colony lysis and transfer of samples to a membrane, followed by detection of biotinylated proteins using a streptavidin conjugate such as streptavidin-horseradish peroxidase. Additionally, the fact that the BCCP domain is biotinylated in vivo is particularly useful when multiplexing protein purification for fabrication of protein arrays since the proteins can be simultaneously purified from cellular lysates and immobilised in a single step via the high affinity and specificity exhibited by a streptavidin surface.

Figure 3A:
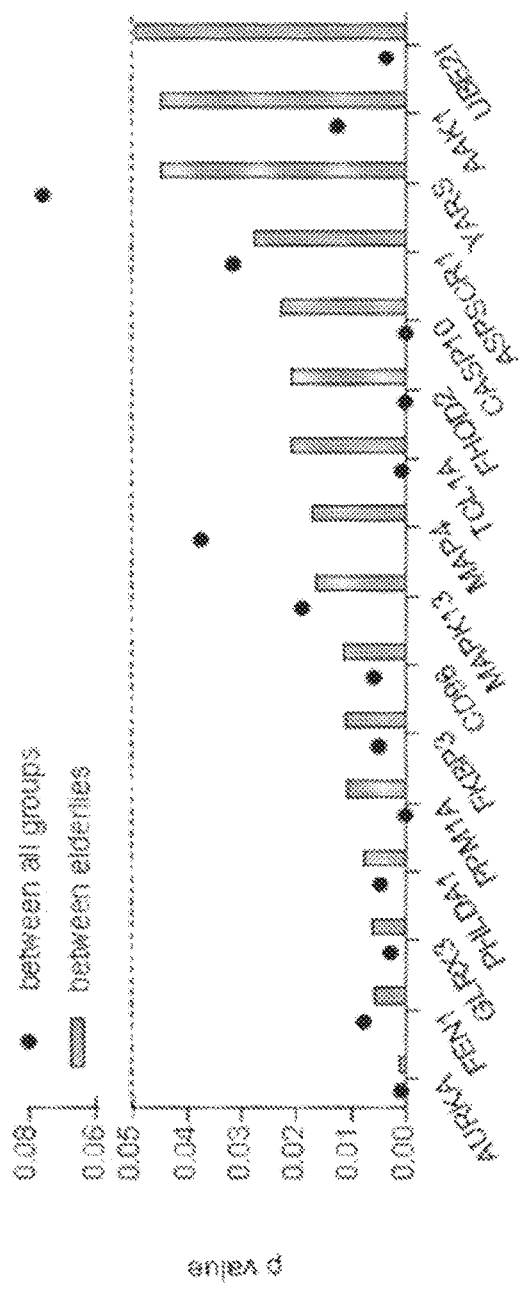
FIG. 3 illustrates proteins associated with cell-cycle and cell-death as (A) a chart; (B) linked pathways.
Figure 3B:
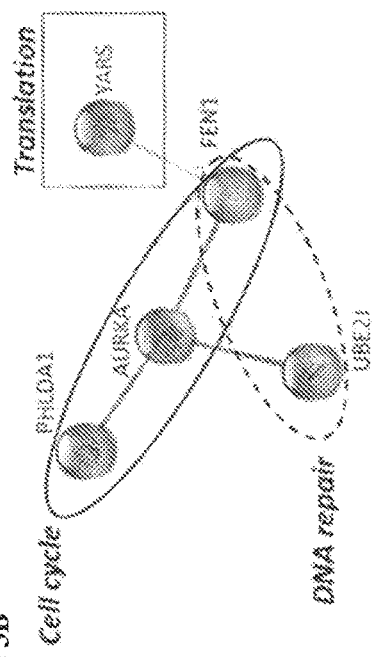

FIG. 3 illustrates discriminating proteins in the elderly, characterized by processes of cell-cycle and cell-death. (A) p-values related to the 16 protein-targets discriminating the various elderly health statuses. Only readouts of serum/plasma antibody to the YARS protein do not also discriminate between the elderlies and YC individuals (p>0.05) (B) 5 protein readouts were tightly associated with regards to pathways linked to cell-cycle (PHLDA1, AURKA, FEN1), DNA repair (UBE2I, FEN1) and translation (YARS) by enrichment pathway analysis (String).

REFERENCES

[1] Mackay E M, Bathe O F. Identifying Clinically Relevant Proteins for Targeted Analysis in the Development of a Multiplexed Proteomic Biomarker Assay. Methods Mol Biol. 2018; 1788:123-129.

[2] Yadav S, Kashaninejad N, Masud M K, Yamauchi Y, Nguyen N T, Shiddiky M J A. Autoantibodies as diagnostic and prognostic cancer biomarker: Detection techniques and approaches. Biosens Bioelectron. 2019 May 13; 139:111315.

[3] Makovski T T, Schmitz S, Zeegers M P, Stranges S, van den Akker M. Multimorbidity and quality of life: systematic literature review and meta-analysis. Ageing Res Rev. 2019 Apr. 29. pii: S1568-1637(19)30006-6.

[4] Fali T, Vallet H, Sauce D. Impact of stress on aged immune system compartments: Overview from fundamental to clinical data. Exp Gerontol. 2018 May; 105: 19-26. doi: 10.1016/j.exger.2018.02.007.

[5] Van Der Maaten L., Hinton G. Visualizing data using t-SNE. *Journal of Machine Learning Research.* 2008; 9(1):2579-2605

[6] Valenzuela J F, Monterola C, Tong V J C, Ng T P, Larbi A. Health and disease phenotyping in old age using a cluster network analysis. Sci Rep. 2017 Nov. 15; 7(1): 15608.

[7] Elizabeth A. Phelan Barbara Williams Brenda W. J. H. Penninx James P. LoGerfo Suzanne G. Leveille. Activities of Daily Living Function and Disability in Older Adults in a Randomized Trial of the Health Enhancement Program The Journals of Gerontology: Series A, Volume 59, Issue 8, August 2004, Pages M838-M843.

[8] Fried L P, Ferrucci L, Darer J, Williamson J D, Anderson G. Untangling the concepts of disability, frailty, and comorbidity: implications for improved targeting and care. J Gerontol A Biol Sci Med Sci. 2004 March; 59(3):255-63.

[9] Crum R M, Anthony J C, Bassett S S, Folstein M F. Population-based norms for the Mini-Mental State Examination by age and educational level. JAMA. 1993 May 12; 269(18):2386-91.

[10] Lesher E L, Berryhill J S. Validation of the Geriatric Depression Scale—Short Form among inpatients. J Clin Psychol. 1994 March; 50(2):256-60.

[11] Bolstad B M, Irizarry R A, Astrand M, Speed T P. A comparison of normalization methods for high density oligonucleotide array data based on variance and bias. Bioinformatics. 2003 Jan. 22; 19(2):185-93.

[12] Tracewska-Siemiątkowska A, Haer-Wigman L, Bosch D G M, Nickerson D, Bamshad M J; University of Washington Center for Mendelian Genomics, van de Vorst M, Rendtorff N D, Möller C, Kjellström U, Andréasson S, Cremers F P M, Tranebjærg L. An Expanded Multi-Organ Disease Phenotype Associated with Mutations in YARS. Genes (Basel). 2017 Dec. 11; 8(12). pii: E381

[13] Watanabe T K, Fujiwara T, Kawai A, Shimizu F, Takami S, Hirano H, Okuno S, Ozaki K, Takeda S, Shimada Y, Nagata M, Takaichi A, Takahashi E, Nakamura Y, Shin S. Cloning, expression, and mapping of UBE2I, a novel gene encoding a human homologue of yeast ubiquitin-conjugating enzymes which are critical for regulating the cell cycle. Cytogenet Cell Genet. 1996; 72(1):86-9.

[14] Ho M F, Lummertz da Rocha E, Zhang C, Ingle J N, Goss P E, Shepherd L E, Kubo M, Wang L, Li H, Weinshilboum R M. TCL1A, a Novel Transcription Factor and a Coregulator of Nuclear Factor κB p65: Single Nucleotide Polymorphism and Estrogen Dependence. J Pharmacol Exp Ther. 2018 June; 365(3):700-710.

[15] Lin X, Duan X, Liang Y Y, Su Y, Wrighton K H, Long J, Hu M, Davis C M, Wang J, Brunicardi F C, Shi Y, Chen Y G, Meng A, Feng X H. PPM1A Functions as a Smad Phosphatase to Terminate TGFβ Signaling. Cell. 2016 Sep. 8; 166(6):1597.

[16] Chen Y, Takikawa M, Tsutsumi S, Yamaguchi Y, Okabe A, Shimada M, Kawase T, Sada A, Ezawa I, Takano Y, Nagata K, Suzuki Y, Semba K, Aburatani H, Ohki R. PHLDA1, another PHLDA family protein that inhibits Akt. Cancer Sci. 2018 November; 109(11):3532-3542.

[17] Li B1, Chen M1, Lu M1, Xin-Xiang J1, Meng-Xiong P1, Jun-Wu M1. Glutaredoxin 3 promotes migration and invasion via the Notch signalling pathway in oral squamous cell carcinoma. Free Radic Res. 2018 April; 52(4): 390-401.

[18] Otomo T, Tomchick D R, Otomo C, Panchal S C, Machius M, Rosen M K. Structural basis of actin filament nucleation and processive capping by a formin homology 2 domain. Nature. 2005 Feb. 3; 433(7025):488-94.

[19] Kathera C, Zhang J, Janardhan A, Sun H, Ali W, Zhou X, He L, Guo Z. Interacting partners of FEN1 and its role in the development of anticancer therapeutics. Oncotarget. 2017 Apr. 18; 8(16):27593-27602.

[20] Horn S, Hughes M A, Schilling R, Sticht C, Tenev T, Ploesser M, Meier P, Sprick M R, MacFarlane M, Leverkus M. Caspase-10 Negatively Regulates Caspase-8-Mediated Cell Death, Switching the Response to CD95L in Favor of NF-κB Activation and Cell Survival. Cell Rep. 2017 Apr. 25; 19(4):785-797.

[21] Tan F L, Ooi A, Huang D, Wong J C, Qian C N, Chao C, Ooi L, Tan Y M, Chung A, Cheow P C, Zhang Z, Petillo D, Yang X J, Teh B T. p38delta/MAPK13 as a diagnostic marker for cholangiocarcinoma and its involvement in cell motility and invasion. Int J Cancer. 2010 May 15; 126(10):2353-61

[22] Kremer B E, Haystead T, Macara I G. Mammalian septins regulate microtubule stability through interaction with the microtubule-binding protein MAP4. Mol Biol Cell. 2005 October; 16(10):4648-59

[23] Zhu W, Li Z, Xiong L, Yu X, Chen X, Lin Q. FKBP3 Promotes Proliferation of Non-Small Cell Lung Cancer Cells through Regulating Sp1/HDAC2/p27. Theranostics. 2017 Jul. 22; 7(12):3078-3089

[24] Georgiev H, Ravens I, Papadogianni G, Bernhardt G. Coming of Age: CD96 Emerges as Modulator of Immune Responses. Front Immunol. 2018 May 17; 9:1072.

[25] Donnella H J, Webber J T, Levin R S, Camarda R, Momcilovic O, Bayani N, Shah K N, Korkola J E, Shokat K M, Goga A, Gordan J D, Bandyopadhyay S. Kinome rewiring reveals AURKA limits PI3K-pathway inhibitor efficacy in breast cancer. Nat Chem Biol. 2018 August; 14(8):768-777

[26] Bogan JS1, Hendon N, McKee A E, Tsao T S, Lodish H F. Nature. 2003 Oct. 16; 425(6959):727-33. Functional cloning of TUG as a regulator of GLUT4 glucose transporter trafficking.

[27] Gupta-Rossi N, Ortica S, Meas-Yedid V, Heuss S, Moretti J, Olivo-Marin J C, Israël A. The adaptor-associated kinase 1, AAK1, is a positive regulator of the Notch pathway. J Biol Chem. 2011 May 27; 286(21):18720-30.

TABLE 2

| Protein Name | UniprotID | Description |
| --- | --- | --- |
| AAK1 | Q2M2I8 | HUMAN AP2-associated protein kinase 1 |

Nucleotide Sequence (Seq ID No. 1):
>P001067_KIN2_KIN2p1_AAK1_22848_*Homo sapiens* AP2 associated kinase 1_
BC002695.2_AAH02695.1_Q2M2I8_0_0_1425_0_1422
ATGAAGAAGTTTTTCGACTCCCGGCGAGAGCAGGGCGGCTCTGGCCTGGGCTCCGGCTCCAGCGGAGGAG

GGGGCAGCACCTCGGGCCTGGGCAGTGGCTACATCGGAAGAGTCTTCGGCATCGGCGACAGCAGGTCAC

AGTGGACGAGGTGTTGGCGGAAGGTGGATTTGCTATTGTATTTCTGGTGAGGACAAGCAATGGGATGAAAT

GTGCCTTGAAACGCATGTTTGTCAACAATGAGCATGATCTCCAGGTGTGCAAGAGAGAAATCCAGATAATGA

GGGATCTTTCAGGGCACAAGAATATTGTGGGTTACATTGATTCTAGTATCAACAACGTGAGTAGCGGTGATGT

ATGGGAAGTGCTCATTCTGATGGACTTTTGTAGAGGTGGCCAGGTGGTAAACCTGATGAACCAGCGCCTGCA

AACAGGCTTTACAGAGAATGAAGTGCTCCAGATATTTTGTGATACCTGTGAAGCTGTTGCCCGCCTGCATCA

GTGCAAAACTCCTATTATCCACCGGGACCTGAAGGTTGAAAACATCCTCTTGCATGACCGAGGCCACTATGT

CCTGTGTGACTTTGGAAGCGCCACCAACAAATTCCAGAATCCACAAACTGAGGGAGTCAATGCAGTAGAAGA

TGAGATTAAGAAATACACAACGCTGTCCTATCGAGCACCAGAAATGGTCAACCTGTACAGTGGCAAAATCATC

ACTACGAAGGCAGACATTTGGGCTCTTGGATGTTTGTTGTATAAATTATGCTACTTCACTTTGCCCATTTGGGG

AAAGTCAGGTGGCAATTTGTGATGGAAACTTCACAATTCCTGATAATTCTCGATATTCTCAAGACATGCACTG

CCTAATTAGGTATATGTTGGAACCAGACCCTGACAAAAGGCCGGATATTTACCAGGTGTCCTACTTCTCATTT

AAGCTACTCAAGAAAGAGTGCCCAATTCCAAATGTACAGAACTCTCCCATTCCTGCAAAGCTTCCTGAACCAG

TGAAAGCCAGTGAGGCAGCTGCAAAAAAGACCCAGCCAAAGGCCAGACTGACAGATCCCATTCCCACCACA

GAGACTTCAATTGCACCCCGCCAGAGGCCTAAAGCTGGGCAGACTCAGCCGAACCCAGGAATCCTTCCCAT

CCAGCCAGCGCTGACACCCCGGAAGAGGGCCACTGTTCAGCCCCCACCTCAGGCTGCAGGATCCAGCAAT

CAGCCTGGCCTTTTAGCCAGTGTTCCCCAACCAAAACCCCAAGCCCCACCCAGCCAGCCTCTGCCGCAAAC

TCAGGCCAAGCAGCCACAGGCTCCTCCCACTCCACAGCAGACGCCTTCTACTCAGGCCCAGGGTCTGCCCG

CTCAGGCCCAGGCCACACCCCAGCACCAGCAGCATACAATAAAACTTAGTATGAAACTT

Protein Sequence (Seq ID No. 17):
>sp|Q2M2I8|AAK1_HUMAN AP2-associated protein kinase 1 OS = *Homo sapiens*
OX = 9606 GN = AAK1 PE = 1 SV = 3
MKKFFDSRREQGGSGLGSGSSGGGGSTSGLGSGYIGRVFGIGRQQVTVDEVLAEGGFAIVFLVRTSNGMKCAL

KRMFVNNEHDLQVCKREIQIMRDLSGHKNIVGYIDSSINNVSSGDVWEVLILMDFCRGGQVVNLMNQRLQTGFTE

NEVLQIFCDTCEAVARLHQCKTPIIHRDLKVENILLHDRGHYVLCDFGSATNKFQNPQTEGVNAVEDEIKKYTTLSY

RAPEMVNLYSGKIITTKADIWALGCLLYKLCYFTLPFGESQVAICDGNFTIPDNSRYSQDMHCLIRYMLEPDPDKRP

DIYQVSYFSFKLLKKECPIPNVQNSPIPAKLPEPVKASEAAAKKTQPKARLTDPIPTTETSIAPRQRPKAGQTQPNP

GILPIQPALTPRKRATVQPPPQAAGSSNQPGLLASVPQPKPQAPPSQPLPQTQAKQPQAPPTPQQTPSTQAGL

PAQAQATPQHQQQLFLKQQQQQQQPPPAQQQPAGTFYQQQQAQTQQFQAVHPATQKPAIAQFPVVSQGGSQ

QQLMQNFYQQQQQQQQQQQQQLATALHQQQLMTQQAALQQKPTMAAGQQPQPQPAAAPQPAPAQEPAIQ

APVRQQPKVQTTPPPAVQGQKVGSLTPPSSPKTQRAGHRRILSDVTHSAVFGVPASKSTQLLQAAAAEASLNKS

KSATTTPSGSPRTSQQNVYNPSEGSTWNPFDDDNFSKLTAEELLNKDFAKLGEGKHPEKLGGSAESUPGFQST

QGDAFATTSFSAGTAEKRKGGQTVDSGLPLLSVSDPFIPLQVPDAPEKLIEGLKSPDTSLLLPDLLPMTDPFGSTS

DAVIEKADVAVESLIPGLEPPVPQRLPSQTESVTSNRTDSLTGEDSLLDCSLLSNPTTDLLEEFAPTAISAPVHKAA

EDSNLISGFDVPEGSDKVAEDEFDPIPVLITKNPQGGHSRNSSGSSESSLPNLARSLLLVDQLIDL

TABLE 2-continued

| Protein Name | UniprotID | Description |
|---|---|---|

ASPSCR1    Q9BZE9    HUMAN Tether containing UBX domain for GLUT4

Nucleotide Sequence (Seq ID No. 2):
>P000270_CAN_CAN1-2_ASPSCR1_79058_Homo sapiens alveolar soft part sarcoma
chromosome region candidate 1_BC018722.1_AAH18722.1_Q9BZE9_0_0_1662_0_1659
ATGGCGGCCCCGGCAGGCGGCGGAGGCTCCGCGGTGTCGGTGCTGGCCCCGAACGGCCGGCGCCACAC

GGTGAAGGTGACGCCGAGCACCGTGCTGCTTCAGGTTCTGGAGGACACGTGCCGGCGGCAGGACTTCAAC

CCCTGTGAATATGATCTGAAGTTTCAGAGGAGCGTGCTCGACCTTTCTCTCCAGTGGAGATTTGCCAACCTG

CCCAACAATGCCAAGCTGGAGATGGTGCCCGCTTCCCGGAGCCGTGAGGGGCCTGAGAACATGGTTCGCA

TCGCTTTGCAGCTGGACGATGGCTCGAGGTTGCAGGACTCTTTCTGTTCAGGCCAGACCCTCTGGGAGCTT

CTCAGCCATTTTCCACAGATCAGGGAGTGCCTGCAGCACCCCGGCGGGGCCACCCCAGTCTGCGTGTACAC

GAGGGATGAGGTGACGGGTGAAGCTGCCCTGCGGGGCACGACGCTGCAGTCGCTGGGCCTGACCGGGGG

CAGCGCCACCATCAGGTTTGTCATGAAGTGCTACGACCCCGTGGGCAAGACCCCAGGAAGCCTGGGCTCGT

CAGCGTCGGCTGGCCAGGCAGCCGCCAGCGCTCCACTTCCCTTGGAATCTGGGGAGCTCAGCCGCGGCGA

CTTGAGCCGTCCGGAGGACGCGGACACCTCAGGGCCCTGCTGCGAGCACACTCAGGAGAAGCAGAGCACA

AGGGCACCCGCAGCTGCCCCCTTTGTTCCTTTCTCGGGTGGGGACAGAGACAGGGGGGCCCTCCTGGGC

CCACGAGGCCTCTGACATCATCTTCAGCTAAGTTGCCGAAGTCCCTCTCCAGCCCTGGAGGCCCCTCCAAG

CCAAAGAAGTCCAAGTCGGGCCAGGATCCCCAGCAGGAGCAGGAGCAGGAGCGGGAGCGGGATCCCCAG

CAGGAGCAGGAGCGGGAGCGGCCCGTGGACCGGGAGCCCGTGGACCGGGAGCCGGTGGTGTGCCACCC

CGACCTGGAGGAGCGGCTGCAGGCCTGGCCAGCGGAGCTGCCTGATGAGTTCTTTGAGCTGACGGTGGAC

GACGTGAGAAGACGCTTGGCCCAGCTCAAGAGTGAGCGGAAGCGCCTGGAAGAAGCCCCCTTGGTGACCA

AGGCCTTCAGGGAGGCGCAGATAAAGGAGAAGCTGGAGCGCTACCCAAAGGTGGCTCTGAGGGTCCTGTT

CCCCGACCGCTACGTCCTACAGGGCTTCTTCCGCCCCAGCGAGACAGTGGGGGACTTGCGAGACTTCGTGA

GGAGCCACTGGGGAACCCCGAGCTGTCATTTTACCTGTTCATCACCCCTCCAAAAACAGTCCTGGACGACC

ACACGCAGACCCTCTTTCAGGCGAACCTCTTCCCGGCCGCTCTGGTGCACTTGGGAGCCGAGGAGCCGGC

AGGTGTCTACCTGGAGCCTGGCCTGCTGGAGCATGCCATCTCCCCATCTGCGGCCGACGTGCTGGTGGCC

AGGTACATGTCCAGGGCCGCCGGGTCCCCTTCCCCATTGCCAGCCCCTGACCCTGCACCTAAGTCTGAGCC

AGCTGCTGAGGAGGGGCGCTGGTCCCCCCTGAGCCCATCCCAGGGACGGCCCAGCCCGTGAAGAGGAG

CCTGGGCAAGGTGCCCAAGTGGCTGAAGCTGCCGGCCAGCAAGAGG

Protein Sequence (Seq ID No. 18):
>sp|Q9BZE9|ASPC1_HUMAN Tether containing UBX domain for GLUT4
OS = Homo sapiens OX = 9606 GN = ASPSCR1 PE = 1 SV = 1
MAAPAGGGSAVSVLAPNGRRHTVKVTPSTVLLQVLEDTCRRQDFNPCEYDLKFQRSVLDLSLQWRFANLPNN

AKLEMVPASRSREGPENMVRIALQLDDGSRLQDSFCSGQTLWELLSHFPQIRECLQHPGGATPVCVYTRDEVTG

EAALRGTTLQSLGLTGGSATIRFVMKCYDPVGKTPGSLGSSASAGQAAASAPLPLESGELSRGDLSRPEDADTS

GPCCEHTQEKQSTRAPAAAPFVPFSGGGQRLGGPPGPTRPLTSSSAKLPKSLSSPGGPSKPKKSKSGQDPQQE

QEQERERDPQQEQERERPVDREPVDREPVVCHPDLEERLQAWPAELPDEFFELTVDDVRRRLAQLKSERKRLE

EAPLVTKAFREAQIKEKLERYPKVALRVLFPDRYVLQGFFRPSETVGDLRDFVRSHLGNPELSFYLFITPPKTVLDD

HTQTLFQANLFPAALVHLGAEEPAGVYLEPGLLEHAISPSAADVLVARYMSRAAGSPSPLPAPDPAPKSEPAAEE

GALVPPEPIPGTAQPVKRSLGKVPKWLKLPASKR

TABLE 2-continued

| Protein Name | UniprotID | Description |
|---|---|---|

AURKA      O14965      HUMAN Aurora kinase A

Nucleotide Sequence (Seq ID No. 3):
>P000003_KIN96_KIN_STK6_6790_Homo sapiens serine/threonine kinase 6 transcript
variant 1_BC001280.1_AAH01280.1_O14965_56781.92_0_1212_0_1209
ATGGACCGATCTAAAGAAAACTGCATTTCAGGACCTGTTAAGGCTACAGCTCCAGTTGGAGGTCCAAAACGT

GTTCTCGTGACTCAGCAATTTCCTTGTCAGAATCCATTACCTGTAAATAGTGGCCAGGCTCAGCGGGTCTTGT

GTCCTTCAAATTCTTCCCAGCGCGTTCCTTTGCAAGCACAAAAGCTTGTCTCCAGTCACAAGCCGGTTCAGAA

TCAGAAGCAGAAGCAATTGCAGGCAACCAGTGTACCTCATCCTGTCTCCAGGCCACTGAATAACACCCAAAA

GAGCAAGCAGCCCCTGCCATCGGCACCTGAAAATAATCCTGAGGAGGAACTGGCATCAAAACAGAAAAATG

AAGAATCAAAAAAGAGGCAGTGGGCTTTGGAAGACTTTGAAATTGGTCGCCCTCTGGGTAAAGGAAAGTTTG

GTAATGTTTATTTGGCAAGAGAAAAGCAAAGCAAGTTTATTCTGGCTCTTAAAGTGTTATTTAAAGCTCAGCTG

GAGAAAGCCGGAGTGGAGCATCAGCTCAGAAGAGAAGTAGAAATACAGTCCCACCTTCGGCATCCTAATATT

CTTAGACTGTATGGTTATTTCCATGATGCTACCAGAGTCTACCTAATTCTGGAATATGCACCACTTGGAACAG

TTTATAGAGAACTTCAGAAACTTTCAAAGTTTGATGAGCAGAGAACTGCTACTTATATAACAGAATTGGCAAAT

GCCCTGTCTTACTGTCATTCGAAGAGAGTTATTCATAGAGACATTAAGCCAGAGAACTTACTTCTTGGATCAG

CTGGAGAGCTTAAAATTGCAGATTTTGGGTGGTCAGTACATGCTCCATCTTCCAGGAGGACCACTCTCTGTG

GCACCCTGGACTACCTGCCCCCTGAAATGATTGAAGGTCGGATGCATGATGAGAAGGTGGATCTCTGGAGC

CTTGGAGTTCTTTGCTATGAATTTTTAGTTGGGAAGCCTCCTTTTGAGGCAAACACATACCAAGAGACCTACA

AAAGAATATCACGGGTTGAATTCACATTCCCTGACTTTGTAACAGAGGGAGCCAGGGACCTCATTTCAAGACT

GTTGAAGCATAATCCCAGCCAGAGGCCAATGCTCAGAGAAGTACTTGAACACCCCTGGATCACAGCAAATTC

ATCAAAACCATCAAATTGCCAAAACAAAGAATCAGCTAGCAAACAGTCT

Protein Sequence (Seq ID No. 19):
>sp|O14965|AURKA_HUMAN Aurora kinase A OS = Homo sapiens OX = 9606
GN = AURKA PE = 1 SV = 2
MDRSKENCISGPVKATAPVGGPKRVLVTQQFPCQNPLPVNSGQAQRVLCPSNSSQRVPLQAQKLVSSHKPVQN

QKQKQLQATSVPHPVSRPLNNTQKSKQPLPSAPENNPEEELASKQKNEESKKRQWALEDFEIGRPLGKGKFGNV

YLAREKQSKFILALKVLFKAQLEKAGVEHQLRREVEIQSHLRHPNILRLYGYFHDATRVYLILEYAPLGTVYRELQKL

SKFDEQRTATYITELANALSYCHSKRVIHRDIKPENLLLGSAGELKIADFGWSVHAPSSRRTTLCGTLDYLPPEMIE

GRMHDEKVDLWSLGVLCYEFLVGKPPFEANTYQETYKRISRVEFTFPDFVTEGARDLISRLLKHNPSQRPMLREV

LEHPWITANSSKPSNCQNKESASKQS

CASP10      Q92851      HUMAN Caspase-10

Nucleotide Sequence (Seq ID No. 4):
>P001817_Q305_Q305p2_CASP10_843_Homo sapiens caspase 10 apoptosis-related
cysteine protease_BC042844.1_AAH42844.1_Q92851_0_0_1569_0_1566
ATGAAATCTCAAGGTCAACATTGGTATTCCAGTTCAGATAAAAACTGTAAAGTGAGCTTTCGTGAGAAGCTTCTG

ATTATTGATTCAAACCTGGGGGTCCAAGATGTGGAGAACCTCAAGTTTCTCTGCATAGGATTGGTCCCCAACAA

GAAGCTGGAGAAGTCCAGCTCAGCCTCAGATGTTTTTGAACATCTCTTGGCAGAGGATCTGCTGAGTGAGGAA

GACCCTTTCTTCCTGGCAGAACTCCTCTATATCATACGGCAGAAGAAGCTGCTGCAGCACCTCAACTGTACCAA

AGAGGAAGTGGAGCGACTGCTGCCCACCCGACAAAGGGTTTCTCTGTTTAGAAACCTGCTCTACGAACTGTCA

GAAGGCATTGACTCAGAGAACTTAAAGGACATGATCTTCCTTCTGAAAGACTCGCTTCCCAAAACTGAAATGAC

CTCCCTAAGTTTCCTGGCATTTCTAGAGAAACAAGGTAAAATAGATGAAGATAATCTGACATGCCTGGAGGACCT

CTGCAAAACAGTTGTACCTAAACTTTTGAGAAACATAGAGAAATACAAAAGAGAAAGCTATCCAGATAGTGAC

ACCTCCTGTAGACAAGGAAGCCGAGTCGTATCAAGGAGAGGAAGAACTAGTTTCCCAAACAGATGTTAAGACAT

TABLE 2-continued

| Protein Name | UniprotID | Description |
|---|---|---|

TCTTGGAAGCCTTACCGCAGGAGTCCTGGCAAAATAAGCATGCAGGTAGTAATGGTAACAGAGCCACAAATGGT

GCACCAAGCCTGGTCTCCAGGGGGATGCAAGGAGCATCTGCTAACACTCTAAACTCTGAAACCAGCACAAAGA

GGGCAGCTGTGTACAGGATGAATCGGAACCACAGAGGCCTCTGTGTCATTGTCAACAACCACAGCTTTACCTC

CCTGAAGGACAGACAAGGAACCCATAAAGATGCTGAGATCCTGAGTCATGTGTTCCAGTGGCTTGGGTTCACA

GTGCATATACACAATAATGTGACGAAAGTGGAAATGGAGATGGTCCTGCAGAAGCAGAAGTGCAATCCAGCCC

ATGCCGACGGGGACTGCTTCGTGTTCTGTATTCTGACCCATGGGAGATTTGGAGCTGTCTACTCTTCGGATGAG

GCCCTCATTCCCATTCGGGAGATCATGTCTCACTTCACAGCCCTGCAGTGCCCTAGACTGGCTGAAAAACCTAA

ACTCTTTTTCATCCAGGCCTGCCAAGGTGAAGAGATACAGCCTTCCGTATCCATCGAAGCAGATGCTCTGAACC

CTGAGCAGGCACCCACTTCCCTGCAGGACAGTATTCCTGCCGAGGCTGACTTCCTACTTGGTCTGGCCACTGT

CCCAGGCTATGTATCCTTTCGGCATGTGGAGGAAGGCAGCTGGTATATTCAGTCTCTGTGTAATCATCTGAAGA

AATTGGTCCCAAGACATGAAGACATCTTATCCATCCTCACTGCTGTCAACGATGATGTGAGTCGAAGAGTGGAC

AAACAGGGAACAAAGAAACAGATGCCCCAGCCTGCTTTCACACTAAGGAAAAAACTAGTATTCCCTGTGCCCCT

GGATGCACTTTCATTA

Protein Sequence (Seq ID No. 20):
>sp|Q92851|CASPA_HUMAN Caspase-10 OS = Homo sapiens OX = 9606 GN = CASP10
PE = 1 SV = 3
MKSQGQHWYSSSDKNCKVSFREKLLIIDSNLGVQDVENLKFLCIGLVPNKKLEKSSSASDVFEHLLAEDLLSEEDPFF LAELLYIIRQKKLLQHLNCTKEEVERLLPTRQRVSLFRNLLYELSEGIDSENLKDMIFLLKDSLPKTEMTSLSFLAFLEKQ

GKIDEDNLTCLEDLCKTVVPKLLRNIEKYKREKAIQIVTPPVDKEAESYQGEEELVSQTDVKTFLEALPQESWQNKHA

GSNGNRATNGAPSLVSRGMQGASANTLNSETSTKRAAVYRMNRNHRGLCVIVNNHSFTSLKDRQGTHKDAEILSHV

FQWLGFTVHIHNNVTKVEMEMVLQKQKCNPAHADGDCFVFCILTHGRFGAVYSSDEALIPIREIMSHFTALQCPRLAE

KPKLFFIQACQGEEIQPSVSIEADALNPEQAPTSLQDSIPAEADFLLGLATVPGYVSFRHVEEGSWYIQSLCNHLKKLV

PRMLKFLEKTMEIRGRKRTVWGAKQISATSLPTAISAQTPRPPMRRWSSVS

| CD96 | P40200 | HUMAN T-cell surface protein tactile |

Nucleotide Sequence (Seq ID No. 5):
>P002164_Q305_Q305p3_CD96_10225_Homo sapiens CD96
antigen_BC020749.1_AAH20749.1_P40200_0_0_1209_0_1206
ATGGAGAAAAAATGGAAATACTGTGCTGTCTATTACATCATCCAGATACATTTTGTCAAGGGAGTTTGGGAAAAA

ACAGTCAACACAGAAGAAAATGTTTATGCTACACTTGGCTCTGATGTCAACCTGACCTGCCAAACACAGACAGT

AGGCTTCTTCGTGCAGATGCAATGGTCCAAGGTCACCAATAAGATAGACCTGATTGCTGTCTATCATCCCCAAT

ACGGCTTCTACTGTGCCTATGGGAGACCCTGTGAGTCACTTGTGACTTTCACAGAAACTCCTGAGAATGGGTCA

AAATGGACTCTGCACTTAAGGAATATGTCTTGTTCAGTCAGTGGAAGGTACGAGTGTATGCTTGTTCTGTATCCA

GAGGGCATTCAGACTAAAATCTACAACCTTCTCATTCAGACACACGTTACAGCAGATGAATGGAACAGCAACCA

TACGATAGAAATAGAGATAAATCAGACTCTGGAAATACCATGCTTTCAAAATAGCTCCTCAAAAATTTCATCTGAG

TTCACCTATGCATGGTCGGTGGAGGATAATGGAACTCAGGAAACACTTATCTCCCAAAATCACCTCATCAGCAA

TTCCACATTACTTAAAGATAGAGTCAAGCTTGGTACAGACTACAGACTCCACCTCTCTCCAGTCCAAATCTTCGA

TGATGGGCGGAAGTTCTCTTGCCACATTAGAGTCGGTCCTAACAAAATCTTGAGGAGCTCCACCACAGTCAAGG

TTTTTGCTAAACCAGAAATCCCTGTGATTGTGGAAAATAACTCCACGGATGTCTTGGTAGAGAGAAGATTCACCT

GCTTACTAAAGAATGTATTTCCCAAAGCAAATATCACATGGTTTATAGATGGAAGTTTTCTTCATGATGAAAAGA

AGGAATATATATTACTAATGAAGAGAGAAAAGGCAAAGATGGATTTTTGGAACTGAAGTCTGTTTTAACAAGGGT

TABLE 2-continued

| Protein Name | UniprotID | Description |
|---|---|---|

```
ACATAGTAATAAACCAGCCCAATCAGACAACTTGACCATTTGGTGTATGGCTCTGTCTCCAGTCCCAGGAAATAA

AGTGTGGAACATCTCATCAGAAAAGATCACTTTTCTCTTAGGTTCTGAAATTTCCTCAACAGACCCTCCACTGAG

TGTTACAGAATCTACCCTTGACACCCAACCTTCTCCAGCCAGCAGTGTATCTCCTGCAAGTAAGAATGTTTTCAC

ACTGAGCTAT
```

Protein Sequence (Seq ID No. 21):
>sp|P40200|TACT_HUMAN T-cell surface protein tactile OS = Homo sapiens
OX = 9606 GN = CD96 PE = 1 SV = 2

```
MEKKWKYCAVYYIIQIHFVKGVWEKTVNTEENVYATLGSDVNLTCQTQTVGFFVQMQWSKVTNKIDLIAVYHPQYGF

YCAYGRPCESLVTFTETPENGSKWTLHLRNMSCSVSGRYECMLVLYPEGIQTKIYNLLIQTHVTADEWNSNHTIEIEIN

QTLEIPCFQNSSSKISSEFTYAWSVENSSTDSWVLLSKGIKEDNGTQETLISQNHLISNSTLLKDRVKLGTDYRLHLSP

VQIFDDGRKFSCHIRVGPNKILRSSTTVKVFAKPEIPVIVENNSTDVLVERRFTCLLKNVFPKANITWFIDGSFLHDEKE

GIYITNEERKGKDGFLELKSVLTRVHSNKPAQSDNLTIWCMALSPVPGNKVWNISSEKITFLLGSEISSTDPPLSVTES

TLDTQPSPASSVSPARYPATSSVTLVDVSALRPNTTPQPSNSSMTTRGFNYPWTSSGTDTKKSVSRIPSETYSSSPS

GAGSTLHDNVFTSTARAFSEVPTTANGSTKTNHVHITGIVVNKPKDGMSWPVIVAALLFCCMILFGLGVRKWCQYQK

EIMERPPPFKPPPPPIKYTCIQEPNESDLPYHEMETL
```

| FEN1 | P39748 | HUMAN Flap endonuclease 1 |
|---|---|---|

Nucleotide Sequence (Seq ID No. 6):
>P000413_SIG_SIG1-2_FEN1_2237_Homo sapiens flap structure-specific
endonuclease 1_BC000323.2_AAH00323.1_P39748_53567_0_1143_0_1140

```
ATGGGAATTCAAGGCCTGGCCAAACTAATTGCTGATGTGGCCCCAGTGCCATCCGGGAGAATGACATCAAGA

GCTACTTTGGCCGTAAGGTGGCCATTGATGCCTCTATGAGCATTTATCAGTTCCTGATTGCTGTTCGCCAGGGT

GGGGATGTGCTGCAGAATGAGGAGGGTGAGACCACCAGCCACCTGATGGGCATGTTCTACCGCACCATTCGC

ATGATGGAGAACGGCATCAAGCCCGTGTATGTCTTTGATGGCAAGCCGCCACAGCTCAAGTCAGGCGAGCTGG

CCAAACGCAGTGAGCGGCGGGCTGAGGCAGAGAAGCAGCTGCAGCAGGCTCAGGCTGCTGGGGCCGAGCAG

GAGGTGGAAAAATTCACTAAGCGGCTGGTGAAGGTCACTAAGCAGCACAATGATGAGTGCAAACATCTGCTGA

GCCTCATGGGCATCCCTTATCTTGATGCACCCAGTGAGGCAGAGGCCAGCTGTGCTGCCCTGGTGAAGGCTG

GCAAAGTCTATGCTGCGGCTACCGAGGACATGGACTGCCTCACCTTCGGCAGCCCTGTGCTAATGCGACACCT

GACTGCCAGTGAAGCCAAAAAGCTGCCAATCCAGGAATTCCACCTGAGCCGGATTCTGCAGGAGCTGGGCCTG

AACCAGGAACAGTTTGTGGATCTGTGCATCCTGCTAGGCAGTGACTACTGTGAGAGTATCCGGGGTATTGGGC

CCAAGCGGGCTGTGGACCTCATCCAGAAGCACAAGAGCATCGAGGAGATCGTGCGGCGACTTGACCCCAACA

AGTACCCTGTGCCAGAAAATTGGCTCCACAAGGAGGCTCACCAGCTCTTCTTGGAACCTGAGGTGCTGGACCC

AGAGTCTGTGGAGCTGAAGTGGAGCGAGCCAAATGAAGAAGAGCTGATCAAGTTCATGTGTGGTGAAAAGCAG

TTCTCTGAGGAGCGAATCCGCAGTGGGGTCAAGAGGCTGAGTAAGAGCCGCCAAGGCAGCACCCAGGGCCGC

CTGGATGATTTCTTCAAGGTGACCGGCTCACTCTCTTCAGCTAAGCGCAAGGAGCCAGAACCCAAGGGATCCA

CTAAGAAGAAGGCAAAGACTGGGGCAGCAGGGAAGTTTAAAAGGGGAAAA
```

Protein Sequence (Seq ID No. 22):
>sp|P39748|FEN1_HUMAN Flap endonuclease 1 OS = Homo sapiens OX=9606
GN = FEN1 PE = 1 SV = 1

```
MGIQGLAKLIADVAPSAIRENDIKSYFGRKVAIDASMSIYQFLIAVRQGGDVLQNEEGETTSHLMGMFYRTIRMMENGI

KPVYVFDGKPPQLKSGELAKRSERRAEAEKQLQQAQAAGAEQEVEKFTKRLVKVTKQHNDECKHLLSLMGIPYLDA

PSEAEASCAALVKAGKVYAAATEDMDCLTFGSPVLMRHLTASEAKKLPIQEFHLSRILQELGLNQEQFVDLCILLGSD

YCESIRGIGPKRAVDLIQKHKSIEEIVRRLDPNKYPVPENWLHKEAHQLFLEPEVLDPESVELKWSEPNEEELIKFMCG

EKQFSEERIRSGVKRLSKSRQGSTQGRLDDFFKVTGSLSSAKRKEPEPKGSTKKKAKTGAAGKFKRGK
```

TABLE 2-continued

| Protein Name | UniprotID | Description |
| --- | --- | --- |
| FKBP3 | Q00688 | HUMAN Peptidyl-prolyl cis-trans isomerase FKBP3 |

Nucleotide Sequence (Seq ID No. 7):
>P001211_CAG_CAGp1_FKBP3_2287_Homo sapiens FK506 binding protein 3
25 kDa_BC016288.1_AAH16288.1_Q00688_0_0_675_0_672
ATGGCGGCGGCCGTTCCACAGCGGGCGTGGACCGTGGAGCAGCTGCGCAGTGAGCAGCTGCCCAAGAAGGA

CATTATCAAGTTTCTGCAGGAACACGGTTCAGATTCGTTTCTTGCAGAACATAAATTATTAGGAAACATTAAAAAT

GTGGCCAAGACAGCTAACAAGGACCACTTGGTTACAGCCTATAACCATCTTTTTGAAACTAAGCGTTTTAAGGGT

ACTGAAAGTATAAGTAAAGTGTCTGAGCAAGTAAAAAATGTGAAGCTTAATGAAGATAAACCCAAAGAAACCAAG

TCTGAAGAGACCCTGGATGAGGGTCCACCAAAATATACTAAATCTGTTCTGAAAAAGGGAGATAAAACCAACTTT

CCCAAAAAGGGAGATGTTGTTCACTGCTGGTATACAGGAACACTACAAGATGGGACTGTTTTTGATACTAATATT

CAAACAAGTGCAAAGAAGAAGAAAAATGCCAAGCCTTTAAGTTTTAAGGTCGGAGTAGGCAAAGTTATCAGAGG

ATGGGATGAAGCTCTCTTGACTATGAGTAAAGGAGAAAAGGCTCGACTGGAGATTGAACCAGAATGGGCTTAC

GGAAAGAAAGGACAGCCTGATGCCAAAATTCCACCAAATGCAAAACTCACTTTTGAAGTGGAATTAGTGGATATT

GAT

Protein Sequence (Seq ID No. 23):
>sp|Q00688|FKBP3_HUMAN Peptidyl-prolyl cis-trans isomerase FKBP3
OS = Homo sapiens OX = 9606 GN = FKBP3 PE = 1 SV = 1
MAAAVPQRAWTVEQLRSEQLPKKDIIKFLQEHGSDSFLAEHKLLGNIKNVAKTANKDHLVTAYNHLFETKRFKGTESI

SKVSEQVKNVKLNEDKPKETKSEETLDEGPPKYTKSVLKKGDKTNFPKKGDVVHCWYTGTLQDGTVFDTNIQTSAK

KKKNAKPLSFKVGVGKVIRGWDEALLTMSKGEKARLEIEPEWAYGKKGQPDAKIPPNAKLTFEVELVDID

| FMNL2 | Q96PY5 | HUMAN Formin-like protein 2 |

Nucleotide Sequence (Seq ID No. 8):
>P000661_TRN_TRNp1_FHOD2_114793_Homo sapiens formin homology 2 domain
containing 2_BC036492.2_AAH36492.1_Q96PY5_0_0_537_0_534
ATGGACTTGACCAAGAGAGAGTACACCATGCATGACCATAACACGCTGCTGAAGGAGTTCATCCTCAACAATGA

GGGGAAGCTGAAGAAGCTGCAGGATGATGCCAAGATCGCACAGGATGCCTTTGATGATGTTGTGAAGTATTTT

GGAGAAAACCCCAAGACAACACCACCCTCTGTCTTCTTTCCTGTCTTTGTCCGGTTTGTGAAAGCATATAAGCAA

GCAGAAGAGGAAAATGAGCTGAGGAAAAAGCAGGAACAAGCTCTCATGGAAAAACTCCTAGAGCAAGAAGCTC

TGATGGAGCAGCAGGATCCAAAGTCTCCTTCTCATAAATCAAAGAGGCAGCAGCAAGAGTTAATTGCAGAATTA

AGAAGACGACAAGTTAAAGATAACAGACATGTATATGAGGGAAAAGATGGTGCCATTGAAGATATTATCACAGC

CTTAAAGAAGAATAATATCACTAAATTTCCAAATGTTCACTCGAGGGTAAGGATTTCTTCTAGCACACCGGTGGT

GGAGGATACACAGAGC

Protein Sequence (Seq ID No. 24):
>sp|Q96PY5|FMNL2_HUMAN Formin-like protein 2 OS = Homo sapiens OX = 9606
GN = FMNL2 PE = 1 SV = 3
MGNAGSMDSQQTDFRAHNVPLKLPMPEPGELEERFAIVLNAMNLPPDKARLLRQYDNEKKWELICDQERFQVKNP

PHTYIQKLKGYLDPAVTRKKFRRRVQESTQVLRELEISLRTNHIGWVREFLNEENKGLDVLVEYLSFAQYAVTFDFES

VESTVESSVDKSKPWSRSIEDLHRGSNLPSPVGNSVSRSGRHSALRYNTLPSRRTLKNSRLVSKKDDVHVCIMCLR

AIMNYQYGFNMVMSHPHAVNEIALSLNNKNPRTKALVLELLAAVCLVRGGHEIILSAFDNFKEVCGEKQRFEKLMEHF

RNEDNNIDFMVASMQFINIVVHSVEDMNFRVHLQYEFTKLGLDEYLDKLKHTESDKLQVQIQAYLDNVFDVGALLEDA

ETKNAALERVEELEENISHLSEKLQDTENEAMSKIVELEKQLMQRNKELDVVREIYKDANTQVHTLRKMVKEKEEAIQ

RQSTLEKKIHELEKQGTIKIQKKGDGDIAILPVVASGTLSMGSEVVAGNSVGPTMGAASSGPLPPPPPPLPPSSDTPE

TVQNGPVTPPMPPPPPPPPPPPPPPPPPPPLPGPAAETVPAPPLAPPLPSAPPLPGTSSPTVVFNSGLAAVKIKKP

IKTKFRMPVFNWVALKPNQINGTVFNEIDDERILEDLNVDEFEEIFKTKAQGPAIDLSSSKQKIPQKGSNKVTLLEANRA

KNLAITLRKAGKTADEICKAIHVFDLKTLPVDFVECLMRFLPTENEVKVLRLYERERKPLENLSDEDRFMMGFSKIERL

TABLE 2-continued

| Protein Name | UniprotID | Description |
|---|---|---|

MQKMTIMAFIGNFAESIQMLTPQLHAIIAASVSIKSSQKLKKILEIILALGNYMNSSKRGAVYGFKLQSLDLLLDTKSTDR

KQTLLHYISNWKEKYHQVSLFYNELHYVEKAAAVSLENVLLDVKELQRGMDLTKREYTMHDHNTLLKEFILNNEGKL

KKLQDDAKIAQDAFDDVVKYFGENPKTTPPSVFFPVFVRFVKAYKQAEEENELRKKQEQALMEKLLEQEALMEQQD

PKSPSHKSKRQQQELIAELRRRQVKDNRHVYEGKDGAIEDIITVLKTVPFTARTAKRGSRFFCEPVLTEEYHY

GLRX3            O76003        HUMAN Glutaredoxin-3

Nucleotide Sequence (Seq ID No. 9):
>P000071_KIN96_KIN_TXNL2_10539_Homo sapiens thioredoxin-like clone
MGC: 12349_BC005289_AAH05289_O76003_48409.07_0_1008_0_1005
ATGGCGGCGGGGCGGCTGAGGCAGCTGTAGCGGCCGTGGAGGAGGTCGGCTCAGCCGGGCAGTTTGAGG

AGCTGCTGCGCCTCAAAGCCAAGTCCCTCCTTGTGGTCCATTTCTGGGCACCATGGGCTCCACAGTGTGCACA

GATGAACGAAGTTATGGCAGAGTTAGCTAAAGAACTCCCTCAAGTTTCATTTGTGAAGTTGGAAGCTGAAGGTG

TTCCTGAAGTATCTGAAAAATATGAAATTAGCTCTGTTCCCACTTTTCTGTTTTTCAAGAATTCTCAGAAAATCGA

CCGATTAGATGGTGCACATGCCCCAGAGTTGACCAAAAAAGTTCAGCGACATGCATCTAGTGGCTCCTTCCTAC

CCAGCGCTAATGAACATCTTAAAGAAGATCTCAACCTTCGCTTGAAGAAATTGACTCATGCTGCCCCCTGCATG

CTGTTTATGAAAGGAACTCCTCAAGAACCACGCTGTGGTTTCAGCAAGCAGATGGTGGAAATTCTTCACAAACA

TAATATTCAGTTTAGCAGTTTTGATATCTTCTCAGATGAAGAGGTTCGACAGGGACTCAAAGCCTATTCCAGTTG

GCCTACCTATCCTCAGCTCTATGTTTCTGGAGAGCTCATAGGAGGACTTGATATAATTAAGGAGCTAGAAGCAT

CTGAAGAACTAGATACAATTTGTCCCAAAGCTCCCAAATTAGAGGAAAGGCTCAAAGTGCTGACAAATAAAGCTT

CTGTGATGCTCTTTATGAAAGGAAACAAACAGGAAGCAAAATGTGGATTCAGCAAACAAATTCTGGAAATACTAA

ATAGTACTGGTGTTGAATATGAAACATTCGATATATTGGAGGATGAAGAAGTTCGGCAAGGATTAAAAGCTTACT

CAAATTGGCCAACATACCCTCAGCTGTATGTGAAAGGGGAGCTGGTGGGAGGATTGGATATTGTGAAGGAACT

GAAAGAAAATGGTGAATTGCTGCCTATACTGAGAGGAGAAAAT

Protein Sequence (Seq ID No. 25):
>sp|O76003|GLRX3_HUMAN Glutaredoxin-3 OS = Homo sapiens OX = 9606
GN = GLRX3 PE = 1 SV = 2
MAAGAAEAAVAAVEEVGSAGQFEELLRLKAKSLLVVHFWAPWAPQCAQMNEVMAELAKELPQVSFVKLEAEGVPE

VSEKYEISSVPTFLFFKNSGKIDRLDGAHAPELTKKVGRHASSGSFLPSANEHLKEDLNLRLKKLTHAAPCMLFMKGT

PQEPRCGFSKQMVEILHKHNIGFSSFDIFSDEEVRQGLKAYSSWPTYPQLYVSGELIGGLDIIKELEASEELDTICPKA

PKLEERLKVLTNKASVMLFMKGNKQEAKCGFSKQILEILNSTGVEYETFDILEDEEVRGGLKAYSNWPTYPQLYVKGE

LVGGLDIVKELKENGELLPILRGEN

MAP3K13          O43283        HUMAN Mitogen-activated protein kinase kinase kinase 13

Nucleotide Sequence (Seq ID No. 10):
>P001569_Q106_G106p2_MAP3K13_9175_Homo sapiens MAP3K13 mitogen-activated
protein kinase kinase kinase 13_NM_004721_0_0_0_0_0_0_0
ATGGCCAACCTTCAGGAGCACCTGAGCTGCTCCTCTTCTCCACACTTACCCTTCAGTGAAAGCAAAACCTTCAA

TGGACTACAAGATGAGCTCACAGCTATGGGGAACCACCCTTCTCCCAAGCTGCTCGAGGACCAGCAGGAAAAG

GGGATGGTACGAACAGAGCTAATCGAGAGCGTGCACAGCCCCGTCACCACAACAGTGTTGACGAGCGTAAGT

GAGGATTCCAGGGACCAGTTTGAGAACAGCGTTCTTCAGCTAAGGGAACACGATGAATCAGAGACGGCGGTGT

CTCAGGGGAACAGCAACACGGTGGACGGAGAGAGCACAAGCGGAACTGAAGACATAAAGATTCAGTTCAGCA

GGTCAGGCAGTGGCAGTGGTGGGTTTCTTGAAGGACTATTTGGATGCTTAAGGCCTGTATGGAATATCATTGGG

AAGGCATATTCCACTGATTACAAATTGCAGCAGCAAGATACTTGGGAAGTGCCATTTGAGGAGATCTCAGAGCT

GCAGTGGCTGGGTAGTGGAGCCCAAGGAGCGGTCTTCTTGGGCAAGTTCCGGGCGGAAGAGGTGGCCATCAA

GAAAGTGAGAGAACAGAATGAGACGGATATCAAGCATTTGAGGAAGTTGAAGCACCCTAACATCATCGCATTCA

AGGGTGTTTGTACTCAGGCCCCATGTTATTGTATTATCATGGAATACTGTGCCCATGGACAACTCTACGAGGTCT

TABLE 2-continued

| Protein Name | UniprotID | Description |
|---|---|---|

```
TACGAGCTGGCAGGAAGATCACACCTCGATTGCTAGTAGACTGGTCCACAGGAATTGCAAGTGGAATGAATTAT
TTGCACCTCCATAAAATTATTCATCGTGATCTCAAATCACCTAATGTTTTAGTGACCCACACAGATGCGGTAAAAA
TTTCAGATTTTGGTACATCTAAGGAACTCAGTGACAAAAGTACCAAGATGTCATTTGCTGGCACGGTCGCATGG
ATGGCGCCAGAGGTGATACGGAATGAACCTGTCTCTGAAAAAGTTGATATATGGTCTTTTGGAGTGGTGCTTTG
GGAGCTGCTGACAGGAGAGATCCCTTACAAAGATGTAGATTCTTCAGCCATTATCTGGGGTGTTGGAAGCAACA
GCCTCCACCTTCCAGTTCCTTCCACTTGCCCTGATGGATTCAAAATCCTTATGAAACAGACGTGGCAGAGTAAA
CCTCGAAACCGACCTTCTTTTCGGCAGACACTCATGCATTTAGACATTGCCTCTGCAGATGTACTTGCCACCCC
ACAAGAAACTTACTTCAAGTCTCAGGCTGAATGGAGAGAAGAAGTGAAAAAACATTTTGAGAAGATCAAAGTGA
AGGAACTTGTATACACCGGTTAGATGAAGAACTGATTCGAAGGCGCAGAGAAGAGCTCAGGCATGCGCTGGAT
ATTCGTGAACACTATGAGCGGAAGCTTGAGCGGGCGAATAATTTATACATGGAATTGAGTGCCATCATGCTGCA
GCTAGAAATGCGGGAGAAGGAGCTCATTAAGCGTGAGCAAGCAGTGGAAAAGAAGTATCCTGGGACCTACAAA
CGACACCCTGTTCGTCCTATCATCCATCCCAATGCCATGGAGAAACTCATGAAAAGGAAAGGAGTGCCTCACAA
ATCTGGGATGCAGACCAAACGGCCAGACTTGTTGAGATCAGAAGGGATCCCCACCACAGAAGTGGCTCCCACT
GCATCCCCTTTGTCCGGAAGTCCCAAAATGTCCACTTCTAGCAGCAAGAGCCGATATCGAAGCAAACCACGCCA
CCGCCGAGGGAATAGCAGAGGCAGCCATAGTGACTTTGCCGCAATCTTGAAAAACCAGCCAGCCCAGGAAAAT
TCACCCCATCCCACTTACCTGCACCAAGCTCAATCCCAATACCCTTCTCTTCATCACCATAATTCTCTGCAGCAG
CAATACCAGCAGCCCCTCCTGCCATGTCCCAGAGTCACCATCCCAGACTCAATATGCACGGACAGGACATAG
CAACCTGCGCCAACAACCTGAGGTATTTCGGCCCAGCAGCAGCCCTGCGGAGCCCACTCAGCAACCATGCTCA
GAGACAGCTGCCCGGCTCGAGCCCTGACCTCATCTCCACAGCCATGGCTGCAGACTGCTGGAGAAGTTCTGA
GCCTGACAAGGGCCAAGCTGGTCCCTGGGGCTGTTGCCAGGCTGACGCTTATGACCCCTGCCTTCAGTGCAG
GCCAGAACAGTATGGGTCCTTAGACATACCCTCTGCTGAGCCAGTGGGGAGGAGCCCTGACCTTTCCAAGTCA
CCAGCACATAATCCTCTCTTGGAAAACGCCCAGAGTTCTGAGAAAACGGAAGAAAATGAATTCAGCGGCTGTAG
GTCTGAGTCATCCCTCGGCACCTCTCATCTCGGCACCCCTCCAGCGCTACCTCGAAAACAAGGCCTCTGCAG
AAGAGTGGAGATGACTCCTCAGAAGAGGAAGAAGGGGAAGTAGATAGTGAAGTTGAATTTCCACGAAGACAGA
GGCCCCATCGCTGTATCAGCAGCTGCCAGTCATATTCAACCTTTAGCTCTGAGAATTTCTCTGTGTCTGATGGA
GAAGAGGGAAATACCAGTGACCACTCAAACAGTCCTGATGAGTTAGCTGATAAACTTGAAGACCGCTTGGCAGA
GAAGCTAGACGACCTGCTGTCCCAGACGCCAGAGATTCCCATTGACATATCCTCACACTCGGATGGGCTCTCT
GACAAGGAGTGTGCCGTGCGCCGTGTGAAGACTCAGATGTCTCTGGGCAAGCTGTGTGTGGAGGAACGTGGC
TATGAGAACCCCATGCAGTTTGAAGAATCGGACTGTGACTCTTCAGATGGGGAGTGTTCTGATGCCACAGTTAG
GACCAATAAACACTACAGCTCTGCTACCTGG
```

Protein Sequence (Seq ID No. 26):
>sp|O43283|M3K13_HUMAN Mitogen-activated protein kinase kinase kinase 13
OS = Homo sapiens OX = 9606 GN = MAP3K13 PE = 1 SV = 1
MANFQEHLSCSSSPHLPFSESKTFNGLQDELTAMGNHPSPKLLEDQQEKGMVRTELIESVHSPVTTTVLTSVSEDSR

DQFENSVLQLREHDESETAVSQGNSNTVDGESTSGTEDIKIQFSRSGSGSGGFLEGLFGCLRPVWNIIGKAYSTDYK

LQQQDTWEVPFEEISELQWLGSGAQGAVFLGKFRAEEVAIKKVREQNETDIKHLRKLKHPNIIAFKGVCTQAPCYCII

MEYCAHGQLYEVLRAGRKITPRLLVDWSTGIASGMNYLHLHKIIHRDLKSPNVLVTHTDAVKISDFGTSKELSDKSTK

MSFAGTVAWMAPEVIRNEPVSEKVDIWSFGVVLWELLTGEIPYKDVDSSAIIWGVGSNSLHLPVPSTCPDGFKILMKQ

TWQSKPRNRPSFRQTLMHLDIASADVLATPQETYFKSQAEWREEVKKHFEKIKSEGTCIHRLDEELIRRRREELRHAL

DIREHYERKLERANNLYMELSAIMLQLEMREKELIKREQAVEKKYPGTYKRHPVRPIIHPNAMEKLMKRKGVPHKSG

TABLE 2-continued

| Protein Name | UniprotID | Description |
|---|---|---|

MQTKRPDLLRSEGIPTTEVAPTASPLSGSPKMSTSSSKSRYRSKPRHRRGNSRGSHSDFAAILKNQPAQENSPHPT

YLHQAQSQYPSLHHHNSLQQQYQQPPPAMSQSHHPRLNMHGQDIATCANNLRYFGPAAALRSPLSNHAQRQLPG

SSPDLISTAMAADCWRSSEPDKGQAGPWGCCQADAYDPCLQCRPEQYGSLDIPSAEPVGRSPDLSKSPAHNPLLE

NAQSSEKTEENEFSGCRSESSLGTSHLGTPPALPRKTRPLQKSGDDSSEEEEGEVDSEVEFPRRQRPHRCISSCQS

YSTFSSENFSVSDGEEGNTSDHSNSPDELADKLEDRLAEKLDDLLSQTPEIPIDISSHSDGLSDKECAVRRVKTQMSL

GKLCVEERGYENPMQFEESDCDSSDGECSDATVRTNKHYSSATW

MAP4        P27816     HUMAN Microtubule-associated protein 4

Nucleotide Sequence (Seq ID No. 11):
>P000490_SIG_SIG1-3_MAP4_4134_*Homo sapiens* MAP4 microtubule-associated
protein 4_BC008715.2_AAH08715.1_P27816_113843.4_0_2940_0_2937
ATGGCTGACCTCAGTCTTGCAGATGCATTAACAGAACCATCTCCAGACATTGAGGGAGAGATAAAGCGGGACTT

CATTGCCACACTAGAGGCAGAGGCCTTTGATGATGTTGTGGGAGAAACTGTTGGAAAAACAGACTATATTCCTC

TCCTGGATGTTGATGAGAAAACCGGGAACTCAGAGTCAAAGAAGAAACCGTGCTCAGAAACTAGCCAGATTGAA

GATACTCCATCTTCTAAACCAACACTCCTAGCCAATGGTGGTCATGGAGTAGAAGGGAGCGATACTACAGGGTC

TCCAACTGAATTCCTTGAAGAGAAAATGGCCTACCAGGAATACCCAAATAGCCAGAACTGGCCAGAAGATACCA

ACTTTTGTTTCCAACCTGAGCAAGTGGTCGATCCTATCCAGACTGATCCCTTTAAGATGTACCATGATGATGACC

TGGCAGATTTGGTCTTTCCCTCCAGTGCGACAGCTGATACTTCAATATTTGCAGGACAAAATGATCCCTTGAAAG

ACAGTTACGGTATGTCTCCCTGCAACACAGCTGTTGTACCTCAGGGGTGGTCTGTGGAAGCCTTAAACTCTCCA

CACTCAGAGTCCTTTGTTTCCCCAGAGGCTGTTGCAGAACCTCCTCAGCCAACGGCAGTTCCCTTAGAGCTAGC

CAAGGAGATAGAAATGGCATCAGAAGAGAGGCCACCAGCACAAGCATTGGAAATAATGATGGGACTGAAGACT

ACTGACATGGCACCATCTAAAGAAACAGAGATGGCCCTCGCCAAGGACATGGCACTAGCTACAAAAACCGAGG

TGGCATTGGCTAAAGATATGGAATCACCCACCAAATTAGATGTGACACTGGCCAAGGACATGCAGCCATCCATG

GAATCAGATATGGCCCTAGTCAAGGACATGGAACTACCCACAGAAAAGAAGTGGCCCTGGTTAAGGATGTCA

GATGGCCCACAGAAACAGATGTATCTTCAGCCAAGAATGTGGTACTGCCCACAGAAACAGAGGTAGCCCCAGC

CAAGGATGTGACACTGTTGAAAGAAACAGAGAGGGCATCTCCTATAAAAATGGACTTAGCCCCTTCCAAGGACA

TGGGACCACCCAAAGAAAACAAGAAAGAAACAGAGAGGGCATCTCCTATAAAAATGGACTTGGCTCCTTCCAAG

GACATGGGACCACCCAAAGAAAACAAGATAGTCCCAGCCAAGGATTTGGTATTACTCTCAGAAATAGAGGTGGC

ACAGGCTAATGACATTATATCATCCACAGAAATATCCTCTGCTGAGAAGGTGGCTTTGTCCTCAGAAACAGAGG

TAGCCCTGGCCAGGACATGACACTGCCCCCGGAAACCAACGTGATCTTGACCAAGGATAAAGCACTACCTTT

AGAAGCAGAGGTGGCCCCAGTCAAGGACATGGCTCAACTCCCAGAAACAGAAATAGCCCCGGCCAAGGATGT

GGCTCCGTCCACAGTAAAAGAAGTGGGCTTGTTGAAGGACATGTCTCCACTATCAGAAACAGAAATGGCTCTGG

GCAAGGATGTGACTCCACCTCCAGAAACAGAAGTAGTTCTCATCAAGAACGTATGTCTGCCTCCAGAAATGGAG

GTGGCCCTGACTGAGGATCAGGTCCCAGCCCTCAAAACAGAAGCTCCCACCACCATTGGTGGGTTGAATAAAA

AACCCATGAGCCTTGCTTCAGGCTTAGTGCCAGCTGCCCCACCCAAACGCCCTGCCGTCGCCTCTGCCAGGCC

TTCCATCTTACCTTCAAAAGACGTGAAGCCAAAGCCCATTGCAGATGCAAAGGCTCCTGAGAAGCGGGCCTCAC

CATCCAAGCCAGCTTCTGCCCCAGCCTCCAGATCTGGGTCCAAGAGCACTCAGACTGTTGCAAAAACCACAAC

AGCTGCTGCTGTTGCCTCAACTGGCCCAAGCAGTAGGAGCCCCTCCACGCTCCTGCCCAAGAAGCCCACTGCC

ATTAAGACTGAGGGAAAACCTGCAGAAGTCAAGAAGATGACTGCAAAGTCTGTACCAGCTGACTTGAGTCGCCC

AAAGAGCACCTCCACCAGTTCCATGAAGAAAACCACCACTCTCAGTGGGACAGCCCCCGCTGCAGGGGTGGTT

CCCAGCCGAGTCAAGGCCACACCCATGCCCTCCCGGCCCTCCACAACTCCTTTCATAGACAAGAAGCCCACCT

CGGCCAAACCCAGCTCCACCACCCCCCGGCTCAGCCGCCTGGCCACCAATACTTCTGCTCCTGATCTGAAGAA

TABLE 2-continued

| Protein Name | UniprotID | Description |
|---|---|---|

```
TGTCCGCTCCAAGGTTGGCTCCACGGAAAACATCAAGCATCAGCCTGGAGGAGGCCGGGCCAAAGTAGAGAA

AAAAACAGAGGCAGCTGCTACAACCCGAAAGCCTGAATCTAATGCAGTCACTAAAACAGCCGGCCCAATTGCAA

GTGCACAGAAACAACCTGCGGGGAAAGTCCAGATAGTCTCCAAAAAAGTGAGCTACAGCCATATTCAGTCCAAG

TGTGGTTCCAAGGACAATATTAAGCATGTCCCTGGAGGTGGTAATGTTCAGATTCAGAACAAGAAAGTGGACAT

CTCTAAGGTCTCCTCCAAGTGTGGGTCTAAGGCTAACATCAAGCACAAGCCTGGTGGAGGAGATGTCAAGATT

GAAAGTCAGAAGTTGAACTTCAAGGAGAAGGCCCAGGCCAAGGTGGGATCCCTCGATAATGTGGGCCACCTAC

CTGCAGGAGGTGCTGTGAAGACTGAGGGCGGTGGCAGCGAGGCTCCTCTGTGTCCGGGTCCCCCTGCTGGG

GAGGAGCCGGCCATCTCTGAGGCAGCGCCTGAAGCTGGCGCCCCCACTTCAGCCAGTGGCCTCAATGGCCAC

CCCACCCTGTCAGGGGGTGGTGACCAAAGGGAGGCCCAGACCTTGGACAGCCAGATCCAGGAGACAAGCATC
```

Protein Sequence (Seq ID No. 27):
>sp|P27816|MAP4_HUMAN Microtubule-associated protein 4 OS = Homo sapiens
OX = 9606 GN = MAP4 PE = 1 SV = 3

```
MADLSLADALTEPSPDIEGEIKRDFIATLEAEAFDDVVGETVGKTDYIPLLDVDEKTGNSESKKKPCSETSQIEDTPSS

KPTLLANGGHGVEGSDTTGSPTEFLEEKMAYQEYPNSQNWPEDTNFCFQPEQVVDPIQTDPFKMYHDDDLADLVF

PSSATADTSIFAGQNDPLKDSYGMSPCNTAVVPQGWSVEALNSPHSESFVSPEAVAEPPQPTAVPLELAKEIEMASE

ERPPAQALEIMMGLKTTDMAPSKETEMALAKDMALATKTEVALAKDMESPTKLDVTLAKDMQPSMESDMALVKDME

LPTEKEVALVKDVRWPTETDVSSAKNVVLPTETEVAPAKDVTLLKETERASPIKMDLAPSKDMGPPKENKKETERAS

PIKMDLAPSKDMGPPKENKIVPAKDLVLLSEIEVAQANDIISSTEISSAEKVALSSETEVALARDMTLPPETNVILTKDKA

LPLEAEVAPVKDMAQLPETEIAPAKDVAPSTVKEVGLLKDMSPLSETEMALGKDVTPPPETEVVLIKNVCLPPEMEVA

LTEDQVPALKTEAPLAKDGVLTLANNVTPAKDVPPLSETEATPVPIKDMEIAQTQKGISEDSHLESLQDVGQSAAPTF

MISPETVTGTGKKCSLPAEEDSVLEKLGERKPCNSQPSELSSETSGIARPEEGRPVVSGTGNDITTPPNKELPPSPEK

KTKPLATTQPAKTSTSKAKTQPTSLPKQPAPTTIGGLNKKPMSLASGLVPAAPPKRPAVASARPSILPSKDVKPKPIAD

AKAPEKRASPSKPASAPASRSGSKSTQTVAKTTTAAAVASTGPSSRSPSTLLPKKPTAIKTEGKPAEVKKMTAKSVP

ADLSRPKSTSTSSMKKTTTLSGTAPAAGWPSRVKATPMPSRPSTTPFIDKKPTSAKPSSTTPRLSRLATNTSAPDLK

NVRSKVGSTENIKHQPGGGRAKVEKKTEAAATTRKPESNAVTKTAGPIASAQKQPAGKVQIVSKKVSYSHIQSKCGS

KDNIKHVPGGGNVQIQNKKVDISKVSSKCGSKANIKHKPGGGDVKIESQKLNFKEKAQAKVGSLDNVGHLPAGGAVK

TEGGGSEAPLCPGPPAGEEPAISEAAPEAGAPTSASGLNGHPTLSGGGDQREAQTLDSQIQETSI
```

| PHLDA1 | Q8WV24 | HUMAN Pleckstrin homology-like domain family A member 1 |

Nucleotide Sequence (Seq ID No. 12):
>P002080_Q305_Q305p3_PHLDA1_22822_Homo sapiens pleckstrin homology-like
domain family A member 1_BC018929.2_AAH18929.3_Q8WV24_0_0_780_0_777

```
ATGCTGGAGAGTAGCGGCTGCAAAGCGCTGAAGGAGGGCGTGCTGGAGAAGCGCAGCGACGGGTTGTTGCA

GCTCTGGAAGAAAAAGTGTTGCATCCTCACCGAGGAAGGGCTGCTGCTTATCCCGCCCAAGCAGCTGCAACAC

CAGCAGCAGCAGCAACAGCAGCAGCAGCAGCAACAACAGCCCGGGCAGGGGCCGGCCGAGCCGTCCCA

ACCCAGTGGCCCCGCTGTCGCCAGCCTCGAGCCGCCGGTCAAGCTCAAGGAACTGCACTTCTCCAACATGAA

GACCGTGGACTGTGTGGAGCGCAAGGGCAAGTACATGTACTTCACTGTGGTGATGGCAGAGGGCAAGGAGAT

CGACTTTCGGTGCCCGCAAGACCAGGGCTGGAACGCCGAGATCACGCTGCAGATGGTGCAGTACAAGAATCG

TCAGGCCATCCTGGCGGTCAAATCCACGCGGCAGAAGCAGCAGCACCTGGTCCAGCAGCAGCCCCCCTCGCA

GCCGCAGCCGCAGCCGCAGCTCCAGCCCCAACCCCAGCCTCAGCCTCAGCCGCAACCCCAGCCCAATCACA

ACCCCAGCCTCAGCCCCAACCCAAGCCTCAGCCCCAGCAGCTCCACCCGTATCCGCATCCACATCCACATCCA

CACTCTCATCCTCACTCGCACCCACACCCTCACCCGCACCCGCATCCGCACCAAATACCGCACCCACACCCAC

AGCCGCACTCGCAGCCGCACGGGCACCGGCTTCTCCGCAGCACCTCCAACTCTGCC
```

TABLE 2-continued

| Protein Name | UniprotID | Description |
| --- | --- | --- |

Protein Sequence (Seq ID No. 28):
>sp|Q8WV24|PHLA1_HUMAN Pleckstrin homology-like domain family A member 1
OS = Homo sapiens OX = 9606 GN = PHLDA1 PE = 1 SV = 4
MRRAPAAERLLELGFPPRCGRQEPPFPLGVTRGWGRWPIQKRREGARPVPFSERSQEDGRGPAARSSGTLWRIR

TRLSLCRDPEPPPPLCLLRVSLLCALRAGGRGSRWGEDGARLLLLPPARAAGNGEAEPSGGPSYAGRMLESSGCK

ALKEGVLEKRSDGLLQLWKKKCCILTEEGLLUPPKQLQHQQQQQQQQQQQQQQQPGQGPAEPSQPSGPAVASLE

PPVKLKELHFSNMKTVDCVERKGKYMYFTVVMAEGKEIDFRCPQDQGWNAEITLQMVQYKNRQAILAVKSTRQKQQ

HLVQQQPPSQPQPQPQLQPQPQPQPQPQPQPQSQPQPQPQPKPQPQQLHPYPHPHPHPHSHPHSHPHPHPHPH

PHQIPHPHPQPHSQPHGHRLLRSTSNSA

PPM1A        P35813     HUMAN Protein phosphatase 1A

Nucleotide Sequence (Seq ID No. 13):
>P000364_SIG_SIG1-1_PPM1A_5494_Homo sapiens protein phosphatase 1A (formerly 2C)
magnesium-dependent alpha isoform tr_BC026691.1_AAH26691.1_P35813_53422.23_
0_1149_0_1146
ATGGGAGCATTTTTAGACAAGCCAAAGATGGAAAAGCATAATGCCCAGGGGCAGGGTAATGGGTTGCGATATG

GGCTAAGCAGCATGCAAGGCTGGCGTGTTGAAATGGAGGATGCACATACGGCTGTGATCGGTTTGCCAAGTGG

ACTTGAATCGTGGTCATTCTTTGCTGTGTATGATGGGCATGCTGGTTCTCAGGTTGCCAAATACTGCTGTGAGC

ATTTGTTAGATCACATCACCAATAACCAGGATTTTAAAGGGTCTGCAGGAGCACCTTCTGTGGAAAATGTAAAGA

ATGGAATCAGAACAGGTTTTCTGGAGATTGATGAACACATGAGAGTTATGTCAGAGAAGAAACATGGTGCAGAT

AGAAGTGGGTCAACAGCTGTAGGTGTCTTAATTTCTCCCCAACATACTTATTTCATTAACTGTGGAGACTCAAGA

GGTTTACTTTGTAGGAACAGGAAAGTTCATTTCTTCACACAAGATCACAAACCAAGTAATCCGCTGGAGAAAGAA

CGAATTCAGAATGCAGGTGGCTCTGTAATGATTCAGCGTGTGAATGGCTCTCTGGCTGTATCGAGGGCCCTTG

GGGATTTTGATTACAAATGTGTCCATGGAAAAGGTCCTACTGAGCAGCTTGTCTCACCAGAGCCTGAAGTCCAT

GATATTGAAAGATCTGAAGAAGATGATCAGTTCATTATCCTTGCATGTGATGGTATCTGGGATGTTATGGGAAAT

GAAGAGCTCTGTGATTTTGTAAGATCCAGACTTGAAGTCACTGATGACCTTGAGAAAGTTTGCAATGAAGTAGTC

GACACCTGTTTGTATAAGGGAAGTCGAGACAACATGAGTGTGATTTTGATCTGTTTTCCAAATGCACCCAAAGTA

TCGCCAGAAGCAGTGAAGAAGGAGGCAGAGTTGGACAAGTACCTGGAATGCAGAGTAGAAGAAATCATAAAGA

AGCAGGGGAAGGCGTCCCCGACTTAGTCCATGTGATGCGCACATTAGCGAGTGAGAACATCCCCAGCCTCC

CACCAGGGGGTGAATTGGCAAGCAAGAGGAATGTTATTGAAGCCGTTTACAATAGACTGAATCCTTACAAAAAT

GACGACACTGACTCTACATCAACAGATGATATGTGG

Protein Sequence (Seq ID No. 29):
>sp|P35813|PPM1A_HUMAN Protein phosphatase 1A OS = Homo sapiens OX = 9606
GN = PPM1A PE = 1 SV = 1
MGAFLDKPKMEKHNAQGQGNGLRYGLSSMQGWRVEMEDAHTAVIGLPSGLESWSFFAVYDGHAGSQVAKYCCE

HLLDHITNNQDFKGSAGAPSVENVKNGIRTGFLEIDEHMRVMSEKKHGADRSGSTAVGVLISPQHTYFINCGDSRGL

LCRNRKVHFFTQDHKPSNPLEKERIQNAGGSVMIQRVNGSLAVSRALGDFDYKCVHGKGPTEQLVSPEPEVHDIER

SEEDDQFIILACDGIWDVMGNEELCDFVRSRLEVTDDLEKVCNEVVDTCLYKGSRDNMSVILICFPNAPKVSPEAVKK

EAELDKYLECRVEEIIKKQGEGVPDLVHVMRTLASENIPSLPPGGELASKRNVIEAVYNRLNPYKNDDTDSTSTDDM

W

TCL1A        P56279     HUMAN T-cell leukemia/lymphoma protein 1A

Nucleotide Sequence (Seq ID No. 14):
>P000179_CAN_CAN1-1_TCL1A_8115_Homo sapiens T-cell leukemia/lymphoma 1A_
BC005831.2_AAH05831.1_P56279_0_0_345_0_342
ATGGCCGAGTGCCCGACACTCGGGGAGGCAGTCACCGACACCCGGACCGCCTGTGGGCCTGGGAGAAGTT

CGTGTATTTGGACGAGAAGCAGCACGCCTGGCTGCCCTTAACCATCGAGATAAAGGATAGGTTACAGTTACGG

TABLE 2-continued

| Protein Name | UniprotID | Description |
|---|---|---|

GTGCTCTTGCGTCGGGAAGACGTCGTCCTGGGGAGGCCTATGACCCCCACCCAGATAGGCCCAAGCCTGCTG

CCTATCATGTGGCAGCTCTACCCTGATGGACGATACCGATCCTCAGACTCCAGTTTCTGGCGCTTAGTGTACCA

CATCAAGATTGACGGCGTGGAGGACATGCTTCTCGAGCTGCTGCCAGATGAC

Protein Sequence (Seq ID No. 30):
>sp|P56279|TCL1A_HUMAN T-cell leukemia/lymphoma protein 1A OS = Homo sapiens
OX = 9606 GN = TCL1A PE = 1 SV = 1
MAECPTLGEAVTDHPDRLWAWEKFVYLDEKQHAWLPLTIEIKDRLQLRVLLRREDVVLGRPMTPTQIGPSLLPIMWQ

LYPDGRYRSSDSSFWRLVYHIKIDGVEDMLLELLPDD

| UBE2I | P63279 | HUMAN SUMO-conjugating enzyme UBC9 |
|---|---|---|

Nucleotide Sequence (Seq ID No. 15):
>P001344_CAG_CAGp1_UBE21_7329_Homo sapiens ubiquitin-conjugating enzyme E2I
(UBC9 homolog yeast) transcript variant 1_BC000427.2_AAH00427.1_P50550_
0_0_477_0_474
ATGTCGGGGATCGCCCTCAGCAGACTCGCCCAGGAGAGGAAAGCATGGAGGAAAGACCACCCATTTGGTTTC

GTGGCTGTCCCAACAAAAAATCCCGATGGCACGATGAACCTCATGAACTGGGAGTGCGCCATTCCAGGAAAGA

AAGGGACTCCGTGGGAAGGAGGCTTGTTTAAACTACGGATGCTTTTCAAAGATGATTATCCATCTTCGCCACCA

AAATGTAAATTCGAACCACCATTATTTCACCCGAATGTGTACCCTTCGGGGACAGTGTGCCTGTCCATCTTAGAG

GAGGACAAGGACTGGAGGCCAGCCATCACAATCAAACAGATCCTATTAGGAATACAGGAACTTCTAAATGAACC

AAATATCCAAGACCCAGCTCAAGCAGAGGCCTACACGATTTACTGCCAAAACAGAGTGGAGTACGAGAAAAGG

GTCCGAGCACAAGCCAAGAAGTTTGCGCCCTCA

Protein Sequence (Seq ID No. 31):
>sp|P63279|UBC9_HUMAN SUMO-conjugating enzyme UBC9 OS = Homo sapiens
OX = 9606 GN = UBE2I PE = 1 SV = 1
MSGIALSRLAQERKAWRKDHPFGFVAVPTKNPDGTMNLMNWECAIPGKKGTPWEGGLFKLRMLFKDDYPSSPPKC

KFEPPLFHPNVYPSGTVCLSILEEDKDWRPAITIKQILLGIQELLNEPNIQDPAQAEAYTIYCQNRVEYEKRVRAQAKKF

APS

| YARS | P54577 | HUMAN Tyrosine-tRNA ligase, cytoplasmic |
|---|---|---|

Nucleotide Sequence (Seq ID No. 16):
>P001370_CAG_CAGp2_YARS_8565_Homo sapiens tyrosyl-tRNA
synthetase_BC004151.2_AAH04151.1_P54577_0_0_1587_0_1584
ATGGGGGACGCTCCCAGCCCTGAAGAGAAACTGCACCTTATCACCCGGAACCTGCAGGAGGTTCTGGGGGAA

GAGAAGCTGAAGGAGATACTGAAGGAGCGGGAACTTAAAATTTACTGGGGAACGGCAACCACGGGCAAACCAC

ATGTGGCTTACTTTGTGCCCATGTCAAAGATTGCAGACTTCTTAAAGGCAGGGTGTGAGGTAACAATTCTGTTTG

CGGACCTCCACGCATACCTGGATAACATGAAAGCCCCATGGGAACTTCTAGAACTCCGAGTCAGTTACTATGAG

AATGTGATCAAAGCAATGCTGGAGAGCATTGGTGTGCCCTTGGAGAAGCTCAAGTTCATCAAAGGCACTGATTA

CCAGCTCAGCAAAGAGTACACACTAGATGTGTACAGACTCTCCTCCGTGGTCACACAGCACGATTCCAAGAAG

GCTGGAGCTGAGGTGGTAAAGCAGGTGGAGCACCCTTTGCTGAGTGGCCTCTTATACCCCGGACTGCAGGCTT

TGGATGAAGAGTATTTAAAAGTAGATGCCCAATTTGGAGGCATTGATCAGAGAAAGATTTTCACCTTTGCAGAGA

AGTACCTCCCTGCACTTGGCTATTCAAAACGGGTCCATCTGATGAATCCTATGGTTCCAGGATTAACAGGCAGC

AAAATGAGCTCTTCAGAAGAGGAGTCCAAGATTGATCTCCTTGATCGGAAGGAGGATGTGAAGAAAAACTGAA

GAAGGCCTTCTGTGAGCCAGGAAATGTGGAGAACAATGGGGTTCTGTCCTTCATCAAGCATGTCCTTTTTCCCC

TTAAGTCCGAGTTTGTGATCCTACGAGATGAGAAATGGGGTGGAAACAAAACCTACACAGCTTACGTGGACCTG

GAAAAGGACTTTGCTGCTGAGGTTGTACATCCTGGAGACCTGAAGAATTCTGTTGAAGTCGCACTGAACAAGTT

GCTGGATCCAATCCGGGAAAAGTTTAATACCCCTGCCCTGAAAAAACTGGCCAGCGCTGCCTACCCAGATCCC

TCAAAGCAGAAGCCAATGGCCAAAGGCCCTGCCAAGAATTCAGAACCAGAGGAGGTCATCCCATCCCGGCTGG

ATATCCGTGTGGGGAAAATCATCACTGTGGAGAAGCACCCAGATGCAGACAGCCTGTATGTAGAGAAGATTGA

TABLE 2-continued

| Protein Name UniprotID Description |
| --- |

```
CGTGGGGAAGCTGAACCACGGACTGTGGTGAGCGGCCTGGTACAGTTCGTGCCCAAGGAGGAACTGCAGGA

CAGGCTGGTAGTGGTGCTGTGCAACCTGAAACCCAGAAGATGAGAGGAGTCGAGTCCCAAGGCATGCTTCTG

TGTGCTTCTATAGAAGGGATAAACCGCCAGGTTGAACCTCTGGACCCTCCGGCAGGCTCTGCTCCTGGTGAGC

ACGTGTTTGTGAAGGGCTATGAAAAGGGCCAACCAGATGAGGAGCTCAAGCCCAAGAAGAAAGTCTTCGAGAA

GTTGCAGGCTGACTTCAAAATTTCTGAGGAGTGCATCGCACAGTGGAAGCAAACCAACTTCATGACCAAGCTGG

GCTCCATTTCCTGTAAATCGCTGAAAGGGGGGAACATTAGCC
```

Protein Sequence (Seq ID No. 32):
>sp|P54577|SYYC_HUMAN Tyrosine-tRNA ligase, cytoplasmic OS = Homo sapiens
OX = 9606 GN = YARS PE = 1 SV = 4
MGDAPSPEEKLHLITRNLQEVLGEEKLKEILKERELKIYWGTATTGKPHVAYFVPMSKIADFLKAGCEVTILFADLHAYL

DNMKAPWELLELRVSYYENVIKAMLESIGVPLEKLKFIKGTDYQLSKEYTLDVYRLSSWTQHDSKKAGAEVVKQVEH

PLLSGLLYPGLQALDEEYLKVDAQFGGIDQRKIFTFAEKYLPALGYSKRVHLMNPMVPGLTGSKMSSSEEESKIDLLD

RKEDVKKKLKKAFCEPGNVENNGVLSFIKHVLFPLKSEFVILRDEKWGGNKTYTAYVDLEKDFAAEVVHPGDLKNSV

EVALNKLLDPIREKFNTPALKKLASAAYPDPSKQKPMAKGPAKNSEPEEVIPSRLDIRVGKIITVEKHPDADSLYVEKID

VGEAEPRTVVSGLVQFVPKEELQDRLVVVLCNLKPQKMRGVESQGMLLCASIEGINRQVEPLDPPAGSAPGEHVFV

KGYEKGQPDEELKPKKKVFEKLQADFKISEECIAQWKQTNFMTKLGSISCKSLKGGNIS

---

The invention claimed is:

1. A method for manufacturing a kit for determining the health of a subject from a serum/plasma sample extracted from that subject, comprising the steps of:

for each antigen in a panel, cloning a biotin carboxyl carrier protein folding marker in-frame with a gene encoding the said antigen and expressing the resulting biotinylated antigen;

binding the biotinylated antigens to addressable locations on one or more streptavidin-coated substrates, thereby forming an antigen array;

such that the amount of autoantibodies from the sample binding to the antigens on the panel can be determined by exposing the substrate to the sample and measuring the response;

wherein the antigens comprise MAPK13 (HUMAN Mitogen-activated protein kinase kinase kinase 13, CD96 (HUMAN T-cell surface protein tactile), FKBP3 (HUMAN Peptidyl-prolyl cis-trans isomerase), PPM1A (HUMAN Protein phosphatase 1A), PHLDA1 (HUMAN Pleckstrin homology-like domain family A member 1), GLRX3 (HUMAN Glutaredoxin-3). FEN1 (HUMAN Flap endonuclease 1) and AURKA (HUMAN Aurora kinase A).

2. A composition comprising a panel of antigens for determining the health of a subject, wherein the antigens comprise MAPK13 (HUMAN Mitogen-activated protein kinase kinase kinase 13), CD96 (HUMAN T-cell surface protein tactile), FKBP3 (HUMAN Peptidyl-prolyl cis-trans isomerase), PPM1A (HUMAN Protein phosphatase 1A), PHLDA1 (HUMAN Pleckstrin homology-like domain family A member 1), GLRX3 (HUMAN Glutaredoxin-3), FEN1 (HUMAN Flap endonuclease 1) and AURKA (HUMAN Aurora kinase A), and optionally comprising one or more of UBE2I (HUMAN SUMO-conjugating enzyme UBC9), AAK1 (HUMAN AP2-associated protein kinase 1), YARS (HUMAN Tyrosine-tRNA ligase, cytoplasmic), ASPSCR1 (HUMAN Tether containing UBX domain for GLUT4), CASP10 (HUMAN Caspase-10), FHOD2 (HUMAN formin homology 2 domain), TCL1A (HUMAN T-cell leukemia/lymphoma protein 1A), and MAP4 (HUMAN Microtubule-associated protein 4) wherein the antigens are biotinylated proteins.

3. A method according to claim 1, wherein the antigens further comprise one or more of UBE2I (HUMAN SUMO-conjugating enzyme UBC9), AAK1(HUMAN AP2-associated protein kinase 1), YARS (HUMAN Tyrosine--tRNA ligase, cytoplasmic), ASPSCR1 (HUMAN Tether containing UBX domain for GLUT4), CASP10(HUMAN Caspase-10), FHOD2 (HUMAN formin homology 2 domain), TCL1A (HUMAN T-cell leukemia/lymphoma protein 1A) and MAP4 (HUMAN Microtubule-associated protein 4).

4. A method according to claim 1, wherein the substrate comprises a hydrogel-forming polymer base layer.

5. A method according to claim 1, wherein measuring the response comprises exposing the antigens to a fluorescently-tagged secondary antibody to allow the amount of any autoantibodies from the sample bound to the antigens to be determined.

6. A method according to claim 1, wherein measuring the response is performed in vitro.

7. A method according to claim 1, wherein measuring the response comprises detecting upregulation/downregulation of one or more autoantibodies from the sample.

8. A method according to claim 1, wherein the subject is aged 60 or above.

9. A composition according to claim 2, wherein each biotinylated protein is formed from a Biotin Carboxyl Carrier Protein folding marker which is fused in frame with the antigen.

10. A composition according to claim 2, wherein the biotinylated proteins are bound to a streptavidin-coated substrate.

11. A composition according to claim 10, wherein the substrate comprises a hydrogel-forming polymer base layer.

12. A composition according to claim 2, wherein the subject is aged 60 or above.

* * * * *